(12) United States Patent
Runyan et al.

(10) Patent No.: US 8,192,813 B2
(45) Date of Patent: Jun. 5, 2012

(54) CROSSLINKED POLYETHYLENE ARTICLES AND PROCESSES TO PRODUCE SAME

(75) Inventors: Gary Lee Runyan, Plano, TX (US); Bruce A. Harrinton, Houston, TX (US); Bryan R. Chapman, Annandale, NJ (US); David B. Dunaway, Houston, TX (US); Gerd Arthur Allenmann, Overijse (BE); Robert G. Russell, Sulphur Springs, TX (US); Rodney Mize, Cooper, TX (US)

(73) Assignees: ExxonMobil Chemical Patents, Inc., Baytown, TX (US); Zurn Pex, Inc., Commerce, TX (US)

(*) Notice: Subject to any disclaimer, the term of this patent is extended or adjusted under 35 U.S.C. 154(b) by 340 days.

(21) Appl. No.: 12/141,500

(22) Filed: Jun. 18, 2008

(65) Prior Publication Data

US 2008/0317990 A1 Dec. 25, 2008

Related U.S. Application Data

(63) Continuation-in-part of application No. 11/333,421, filed on Jan. 17, 2006, now Pat. No. 7,795,366, and a continuation-in-part of application No. 11/406,654, filed on Apr. 19, 2006, now Pat. No. 7,652,092, which is a continuation-in-part of application No. 10/640,435, filed on Aug. 12, 2003, now Pat. No. 7,619,026.

(60) Provisional application No. 60/649,266, filed on Feb. 2, 2005, provisional application No. 60/936,577, filed on Jun. 21, 2007, provisional application No. 61/021,277, filed on Jan. 15, 2008.

(51) Int. Cl.
*C08K 5/01* (2006.01)
*C08L 23/12* (2006.01)
*C08L 23/14* (2006.01)
*C08J 3/18* (2006.01)

(52) U.S. Cl. ....... 428/35.7; 524/491; 524/490; 524/848; 524/348; 524/348.6

(58) Field of Classification Search ................ 428/36.9, 428/35.37; 526/348.5, 352; 524/447, 451, 524/474, 543, 491, 490, 848, 348, 348.6; 525/353, 240, 333.8

See application file for complete search history.

(56) References Cited

U.S. PATENT DOCUMENTS 2,567,016 A 1/1952 Gessler et al.
(Continued)

FOREIGN PATENT DOCUMENTS

CS 215313 8/1982
(Continued)

OTHER PUBLICATIONS

Stehr, Jens; Investigation of the effects of poly(.alpha.-olefin) plasticizers on the properties of elastomers; KGK, Kautschuk Gummi Kunststoffe (2007), 60(1-2), 14-16, 18-19; Hamburg, Germany. [See English abstract.].

(Continued)

*Primary Examiner* — Rena Dye
*Assistant Examiner* — Ellen S Wood
(74) *Attorney, Agent, or Firm* — Daniel N. Lundeen; Lundeen & Lundeen, PLLC

(57) ABSTRACT

A high strength, flexible crosslinked polyethylene (PEX) material is provided wherein the base polymer is intermixed with a polymer modifier which affects the amorphous region of the polymer, leaving the crystalline portion of the base polymer virtually unaffected. Consequently, the amorphous region's density is lowered, resulting in a more flexible final product, while the crosslinked molecular structure and/or crystalline portion of the polymer, which controls the strength of the base polymer, remains strong. The polymer modifier can comprise a hydrocarbon fluid such as PAO, Group III basestocks, or a gas-to-liquid hydrocarbon. A method for producing the plastic material is also provided. The plastic material has particular utility in the production of tubing, piping, and conduits for transporting gases, liquids, and the like, as well as wire and cable coatings such as jacketing and insulation.

50 Claims, 3 Drawing Sheets

U.S. PATENT DOCUMENTS

| | | |
|---|---|---|
| 2,817,693 A | 12/1957 | Koome et al. |
| 3,149,178 A | 9/1964 | Hamilton et al. |
| 3,201,364 A | 8/1965 | Salyer |
| 3,228,896 A | 1/1966 | Canterino |
| 3,235,529 A | 2/1966 | Nagle |
| 3,239,478 A | 3/1966 | Harlan, Jr. |
| 3,262,992 A | 7/1966 | Holzer et al. |
| 3,281,390 A | 10/1966 | O'Leary, Jr. |
| 3,299,568 A | 1/1967 | Tobolsky |
| 3,308,086 A | 3/1967 | Wartman |
| 3,318,835 A | 5/1967 | Hagemeyer, Jr. et al. |
| 3,338,778 A | 8/1967 | Hutchins et al. |
| 3,361,702 A | 1/1968 | Wartman et al. |
| 3,378,606 A | 4/1968 | Kontos |
| 3,415,925 A | 12/1968 | Marans |
| 3,437,627 A | 4/1969 | Gude et al. |
| 3,439,088 A | 4/1969 | Edman |
| 3,464,949 A | 9/1969 | Wartman et al. |
| 3,475,368 A | 10/1969 | Metz |
| 3,536,796 A | 10/1970 | Rock |
| 3,541,039 A | 11/1970 | Whiton |
| 3,551,943 A | 1/1971 | Staton et al. |
| 3,563,934 A | 2/1971 | Burnett |
| 3,590,528 A | 7/1971 | Shepherd |
| 3,601,370 A | 8/1971 | Ruettener et al. |
| 3,686,385 A | 8/1972 | Rohn |
| 3,752,779 A | 8/1973 | Maciejewski |
| 3,818,105 A | 6/1974 | Coopersmith et al. |
| 3,821,148 A | 6/1974 | Makowski et al. |
| 3,828,105 A | 8/1974 | Saurano et al. |
| 3,839,261 A | 10/1974 | Aronoff et al. |
| 3,853,969 A | 12/1974 | Kontos |
| 3,860,543 A | 1/1975 | Masuda et al. |
| 3,882,197 A | 5/1975 | Fritz et al. |
| 3,888,949 A | 6/1975 | Shih |
| 3,894,120 A | 7/1975 | Frese et al. |
| 3,925,504 A | 12/1975 | Koleske et al. |
| 3,925,947 A | 12/1975 | Meyers et al. |
| 3,935,344 A | 1/1976 | Haggerty et al. |
| 3,945,975 A | 3/1976 | Strack |
| 3,957,898 A | 5/1976 | Girotti et al. |
| 3,988,276 A | 10/1976 | Kutch et al. |
| 3,999,707 A | 12/1976 | Nielsen |
| 4,006,115 A | 2/1977 | Elbert |
| 4,010,127 A | 3/1977 | Taka et al. |
| 4,016,118 A | 4/1977 | Hamada et al. |
| 4,038,238 A | 7/1977 | Cravens |
| 4,041,002 A | 8/1977 | Aboshi et al. |
| 4,041,103 A | 8/1977 | Davison et al. |
| 4,061,805 A | 12/1977 | Thompson et al. |
| 4,063,002 A | 12/1977 | Wilson, Jr. |
| 4,073,782 A | 2/1978 | Kishi et al. |
| 4,087,505 A | 5/1978 | Sugimoto et al. |
| 4,092,282 A | 5/1978 | Callan |
| 4,094,850 A | 6/1978 | Morgan et al. |
| 4,097,543 A | 6/1978 | Haag et al. |
| 4,104,216 A | 8/1978 | Clampitt |
| 4,110,185 A | 8/1978 | Williams et al. |
| 4,113,802 A | 9/1978 | Matteoli et al. |
| 4,118,359 A | 10/1978 | Brenner |
| 4,118,362 A | 10/1978 | Makowski et al. |
| 4,131,587 A | 12/1978 | Brenner |
| 4,132,698 A | 1/1979 | Gessler et al. |
| 4,136,072 A | 1/1979 | Ladish et al. |
| 4,138,378 A | 2/1979 | Doss |
| 4,147,831 A | 4/1979 | Balinth |
| 4,153,582 A | 5/1979 | Puffr et al. |
| 4,153,588 A | 5/1979 | Makowski et al. |
| 4,153,594 A | 5/1979 | Wilson, Jr. |
| 4,154,244 A | 5/1979 | Becker et al. |
| 4,154,712 A | 5/1979 | Lee, Jr. |
| 4,157,992 A | 6/1979 | Lundberg et al. |
| 4,166,057 A | 8/1979 | Takemori |
| 4,169,822 A | 10/1979 | Kutch et al. |
| 4,170,586 A | 10/1979 | Clampitt et al. |
| 4,175,069 A | 11/1979 | Brenner |
| 4,178,328 A | 12/1979 | Thiruvillakkat |
| 4,189,411 A | 2/1980 | Haaf |
| 4,206,101 A | 6/1980 | Wysong |
| 4,207,373 A | 6/1980 | Segal |
| 4,210,570 A | 7/1980 | Trotter et al. |
| 4,221,887 A | 9/1980 | Brenner et al. |
| 4,229,337 A | 10/1980 | Brenner |
| 4,237,083 A | 12/1980 | Young et al. |
| 4,274,932 A | 6/1981 | Williams et al. |
| 4,288,358 A | 9/1981 | Trotter et al. |
| 4,288,480 A | 9/1981 | Grzywinski et al. |
| 4,289,668 A | 9/1981 | Li |
| 4,304,713 A | 12/1981 | Perelman |
| 4,311,628 A | 1/1982 | Abdou-Sabet et al. |
| 4,321,334 A | 3/1982 | Chatterjee |
| 4,322,336 A | 3/1982 | Machurat et al. |
| 4,325,850 A | 4/1982 | Mueller |
| 4,327,007 A | 4/1982 | Vanderkooi, Jr. et al. |
| 4,335,026 A | 6/1982 | Balinth |
| 4,335,034 A | 6/1982 | Zuckerman et al. |
| 4,340,513 A | 7/1982 | Moteki et al. |
| 4,347,332 A | 8/1982 | Odorzynski et al. |
| 4,352,823 A | 10/1982 | Cherukuri et al. |
| 4,358,384 A | 11/1982 | Newcomb |
| 4,369,284 A | 1/1983 | Chen |
| 4,379,169 A | 4/1983 | Reggio et al. |
| 4,387,108 A | 6/1983 | Koch et al. |
| 4,399,248 A | 8/1983 | Singh et al. |
| 4,399,251 A | 8/1983 | Lee |
| 4,403,005 A | 9/1983 | Nevins et al. |
| 4,403,007 A | 9/1983 | Coughlin |
| 4,409,345 A | 10/1983 | Moteki et al. |
| 4,430,289 A | 2/1984 | McKinney et al. |
| 4,434,258 A | 2/1984 | Schumacher et al. |
| 4,438,228 A | 3/1984 | Schenck |
| 4,438,229 A | 3/1984 | Fujimori et al. |
| 4,440,829 A | 4/1984 | Gerace et al. |
| 4,450,250 A | 5/1984 | McConnell et al. |
| 4,451,589 A | 5/1984 | Morman et al. |
| 4,452,820 A | 6/1984 | D'Amelia et al. |
| 4,459,311 A | 7/1984 | DeTora et al. |
| 4,460,729 A | 7/1984 | Books |
| 4,461,872 A | 7/1984 | Su |
| 4,467,010 A | 8/1984 | Shii et al. |
| 4,467,065 A | 8/1984 | Williams et al. |
| 4,469,770 A | 9/1984 | Nelson |
| 4,483,886 A | 11/1984 | Kowalski |
| 4,483,952 A | 11/1984 | Uchiyama |
| 4,497,926 A | 2/1985 | Toy |
| 4,504,604 A | 3/1985 | Pilkington et al. |
| 4,518,615 A | 5/1985 | Cherukuri et al. |
| 4,529,666 A | 7/1985 | Salzburg et al. |
| 4,532,305 A | 7/1985 | Dickinson |
| 4,536,537 A | 8/1985 | Klingensmith et al. |
| 4,542,053 A | 9/1985 | Nevins et al. |
| 4,542,122 A | 9/1985 | Payne et al. |
| 4,551,507 A | 11/1985 | Haylock et al. |
| 4,552,801 A | 11/1985 | Odorzynski et al. |
| 4,568,663 A | 2/1986 | Mauldin |
| 4,579,901 A | 4/1986 | Allen et al. |
| 4,584,215 A | 4/1986 | Bré et al. |
| 4,592,851 A | 6/1986 | Stadtmiller et al. |
| 4,594,172 A | 6/1986 | Sie |
| 4,604,322 A | 8/1986 | Reid |
| 4,616,052 A | 10/1986 | Habibullah |
| 4,621,072 A | 11/1986 | Arntz et al. |
| 4,645,791 A | 2/1987 | Theodore et al. |
| 4,659,757 A | 4/1987 | Okamoto et al. |
| 4,663,220 A | 5/1987 | Wisneski et al. |
| 4,663,305 A | 5/1987 | Mauldin et al. |
| 4,665,130 A | 5/1987 | Hwo |
| 4,666,959 A | 5/1987 | Weissberger et al. |
| 4,666,968 A | 5/1987 | Downey et al. |
| 4,670,341 A | 6/1987 | Lundsager |
| 4,684,682 A | 8/1987 | Lee, Jr. |
| 4,693,838 A | 9/1987 | Varma et al. |
| 4,703,078 A | 10/1987 | Maehara et al. |
| 4,726,989 A | 2/1988 | Mrozinski |

| | | | | | |
|---|---|---|---|---|---|
| 4,745,143 A | 5/1988 | Mason et al. | 5,264,474 A | 11/1993 | Schleifstein et al. |
| 4,746,388 A | 5/1988 | Inaba et al. | 5,264,493 A | 11/1993 | Palate et al. |
| 4,749,734 A | 6/1988 | Williams et al. | 5,278,220 A | 1/1994 | Vermeire et al. |
| 4,764,535 A | 8/1988 | Leicht | 5,286,500 A | 2/1994 | Synosky et al. |
| 4,772,657 A | 9/1988 | Akiyama et al. | 5,290,635 A | 3/1994 | Matsumura et al. |
| 4,774,277 A | 9/1988 | Janac et al. | 5,290,886 A | 3/1994 | Ellul |
| 4,814,375 A | 3/1989 | Esposito | 5,298,561 A | 3/1994 | Cecchin et al. |
| 4,822,688 A | 4/1989 | Nogues | 5,308,395 A | 5/1994 | Burditt et al. |
| 4,824,718 A | 4/1989 | Hwang | 5,308,904 A | 5/1994 | Fujii et al. |
| 4,824,891 A | 4/1989 | Laurent et al. | 5,312,856 A | 5/1994 | Hert et al. |
| 4,827,064 A | 5/1989 | Wu | 5,324,580 A | 6/1994 | Allan et al. |
| 4,827,073 A | 5/1989 | Wu | 5,331,047 A | 7/1994 | Giacobbe |
| 4,833,172 A | 5/1989 | Schwarz et al. | 5,340,848 A | 8/1994 | Asanuma et al. |
| 4,833,192 A | 5/1989 | Lakshmanan et al. | 5,350,817 A | 9/1994 | Winter et al. |
| 4,833,195 A | 5/1989 | Adur et al. | 5,356,709 A | 10/1994 | Woo et al. |
| 4,840,988 A | 6/1989 | Nakayama et al. | 5,356,948 A | 10/1994 | Payne, Jr. et al. |
| 4,845,137 A | 7/1989 | Williams et al. | 5,356,986 A | 10/1994 | Stewart et al. |
| 4,857,646 A | 8/1989 | Jaffe | 5,360,868 A | 11/1994 | Mosier et al. |
| 4,863,785 A | 9/1989 | Berman et al. | 5,376,716 A | 12/1994 | Nayak et al. |
| 4,897,178 A | 1/1990 | Best et al. | 5,389,711 A | 2/1995 | Westbrook et al. |
| 4,897,452 A | 1/1990 | Berrier et al. | 5,397,832 A | 3/1995 | Ellul |
| 4,900,407 A | 2/1990 | Saito et al. | 5,409,041 A | 4/1995 | Yoshida et al. |
| 4,904,731 A | 2/1990 | Holden et al. | 5,412,020 A | 5/1995 | Yamamoto et al. |
| 4,906,350 A | 3/1990 | Lucien et al. | 5,415,791 A | 5/1995 | Chou et al. |
| 4,912,148 A | 3/1990 | Kim et al. | 5,424,080 A | 6/1995 | Synosky et al. |
| 4,914,145 A | 4/1990 | Tohdoh et al. | 5,437,877 A | 8/1995 | Synosky et al. |
| 4,919,992 A | 4/1990 | Blundell et al. | 5,442,004 A | 8/1995 | Sutherland et al. |
| 4,921,594 A | 5/1990 | Miller | 5,453,318 A | 9/1995 | Giacobbe |
| 4,921,749 A | 5/1990 | Bossaert et al. | 5,459,193 A | 10/1995 | Anderson et al. |
| 4,923,588 A | 5/1990 | Cody et al. | 5,462,754 A | 10/1995 | Synosky et al. |
| 4,937,399 A | 6/1990 | Wachter et al. | 5,462,981 A | 10/1995 | Bastioli et al. |
| 4,939,040 A | 7/1990 | Oreglia et al. | 5,476,914 A | 12/1995 | Ewen et al. |
| 4,943,672 A | 7/1990 | Hamner et al. | 5,482,780 A | 1/1996 | Wilkie et al. |
| 4,948,840 A | 8/1990 | Berta | 5,489,646 A | 2/1996 | Tatman et al. |
| 4,952,457 A | 8/1990 | Cartier et al. | 5,492,943 A | 2/1996 | Stempei |
| 4,957,958 A | 9/1990 | Schleifstein | 5,494,962 A | 2/1996 | Gauthy et al. |
| 4,959,285 A | 9/1990 | Hoffmann | 5,504,172 A | 4/1996 | Imuta et al. |
| 4,959,396 A | 9/1990 | Yankov et al. | 5,512,625 A | 4/1996 | Butterbach et al. |
| 4,959,402 A | 9/1990 | Williams et al. | 5,548,008 A | 8/1996 | Asanuma et al. |
| 4,960,820 A | 10/1990 | Hwo | 5,552,482 A | 9/1996 | Berta |
| 4,975,177 A | 12/1990 | Garwood et al. | 5,563,222 A | 10/1996 | Fukuda et al. |
| 4,994,552 A | 2/1991 | Williams et al. | 5,569,693 A | 10/1996 | Doshi et al. |
| 4,995,884 A | 2/1991 | Ross et al. | 5,591,817 A | 1/1997 | Asanuma et al. |
| 4,996,094 A | 2/1991 | Dutt | 5,594,074 A | 1/1997 | Hwo et al. |
| 5,026,756 A | 6/1991 | Arendt | 5,601,858 A | 2/1997 | Mansukhani et al. |
| 5,028,647 A | 7/1991 | Haylock et al. | 5,610,217 A | 3/1997 | Yarnell et al. |
| 5,049,605 A | 9/1991 | Rekers | 5,614,297 A | 3/1997 | Velazquez |
| 5,075,269 A | 12/1991 | Degnan et al. | 5,624,627 A | 4/1997 | Yagi et al. |
| 5,076,988 A | 12/1991 | Rifi | 5,624,986 A | 4/1997 | Bunnelle et al. |
| 5,079,273 A | 1/1992 | Kuroda et al. | 5,652,308 A | 7/1997 | Merrill et al. |
| 5,079,287 A | 1/1992 | Takeshi et al. | 5,663,230 A | 9/1997 | Haman |
| 5,080,942 A | 1/1992 | Yau | 5,681,897 A | 10/1997 | Silvis et al. |
| 5,091,454 A | 2/1992 | Arendt | 5,683,634 A | 11/1997 | Fujii et al. |
| 5,093,197 A | 3/1992 | Howard et al. | 5,683,815 A | 11/1997 | Leiss |
| 5,105,038 A | 4/1992 | Chen et al. | 5,688,850 A | 11/1997 | Wyffels |
| 5,106,447 A | 4/1992 | Di Rado et al. | 5,696,045 A | 12/1997 | Winter et al. |
| 5,106,899 A | 4/1992 | Maresca | 5,698,650 A | 12/1997 | Jourdain et al. |
| 5,114,763 A | 5/1992 | Brant et al. | 5,700,312 A | 12/1997 | Fausnight et al. |
| 5,116,626 A | 5/1992 | Synosky et al. | 5,723,217 A | 3/1998 | Stahl et al. |
| 5,124,384 A | 6/1992 | Goldstein | 5,726,103 A | 3/1998 | Stahl et al. |
| 5,143,978 A | 9/1992 | Berta | 5,726,239 A | 3/1998 | Maes et al. |
| 5,149,736 A | 9/1992 | Gamarra | 5,728,754 A | 3/1998 | Lakshmanan et al. |
| 5,162,436 A | 11/1992 | Davis et al. | 5,728,760 A | 3/1998 | Rose et al. |
| 5,171,628 A | 12/1992 | Arvedson et al. | 5,736,197 A | 4/1998 | Gaveske |
| 5,171,908 A | 12/1992 | Rudnick | 5,736,465 A | 4/1998 | Stahl et al. |
| 5,173,317 A | 12/1992 | Hartman et al. | 5,739,200 A | 4/1998 | Cheung et al. |
| 5,180,865 A | 1/1993 | Heilman et al. | 5,741,563 A | 4/1998 | Mehta et al. |
| 5,185,398 A | 2/1993 | Kehr et al. | 5,741,840 A | 4/1998 | Lindquist et al. |
| 5,206,276 A | 4/1993 | Lee, Jr. | 5,741,848 A * | 4/1998 | Nogata et al. ............... 524/587 |
| 5,213,744 A | 5/1993 | Bossaert | 5,747,573 A | 5/1998 | Ryan |
| 5,230,843 A | 7/1993 | Howard et al. | 5,753,773 A | 5/1998 | Langhauser et al. |
| 5,231,128 A | 7/1993 | Nakata et al. | 5,763,080 A | 6/1998 | Stahl et al. |
| 5,238,735 A | 8/1993 | Nagou et al. | 5,776,589 A | 7/1998 | Mace et al. |
| 5,240,966 A | 8/1993 | Iwasaki et al. | 5,783,531 A | 7/1998 | Andrew et al. |
| 5,250,628 A | 10/1993 | Seguela et al. | 5,786,418 A | 7/1998 | Strelow et al. |
| 5,254,378 A | 10/1993 | Krueger et al. | 5,789,529 A | 8/1998 | Matsumura et al. |
| 5,256,717 A | 10/1993 | Stauffer et al. | 5,804,630 A | 9/1998 | Heyer et al. |
| 5,258,419 A | 11/1993 | Rolando et al. | 5,834,562 A | 11/1998 | Silvestri et al. |
| 5,264,277 A | 11/1993 | Frognet et al. | 5,837,769 A | 11/1998 | Graafland et al. |

| | | |
|---|---|---|
| 5,849,806 A | 12/1998 | St. Clair et al. |
| 5,869,555 A | 2/1999 | Simmons et al. |
| 5,869,560 A | 2/1999 | Kobayashi et al. |
| 5,869,562 A | 2/1999 | Lindquist et al. |
| 5,872,183 A | 2/1999 | Bonnet et al. |
| 5,891,814 A | 4/1999 | Richeson et al. |
| 5,891,946 A | 4/1999 | Nohara et al. |
| 5,906,727 A | 5/1999 | Wittenbrink et al. |
| 5,908,421 A | 6/1999 | Beger |
| 5,910,362 A | 6/1999 | Aratake et al. |
| 5,916,953 A | 6/1999 | Jacoby et al. |
| 5,916,959 A | 6/1999 | Lindquist et al. |
| 5,925,707 A | 7/1999 | Shafer et al. |
| 5,929,147 A | 7/1999 | Pierick et al. |
| 5,939,483 A | 8/1999 | Kueppers |
| 5,948,557 A | 9/1999 | Ondeck et al. |
| 5,959,006 A | 9/1999 | Pungtrakul |
| 5,968,455 A | 10/1999 | Brickley |
| 5,969,021 A | 10/1999 | Reddy et al. |
| 5,998,547 A | 12/1999 | Hohner |
| 6,001,455 A | 12/1999 | Nishio et al. |
| 6,010,588 A | 1/2000 | Stahl et al. |
| 6,013,727 A | 1/2000 | Dharmarajan et al. |
| 6,017,615 A | 1/2000 | Thakker et al. |
| 6,017,986 A | 1/2000 | Burton |
| 6,025,448 A | 2/2000 | Swindoll et al. |
| 6,027,557 A | 2/2000 | Hayner |
| 6,027,674 A | 2/2000 | Yates |
| 6,037,384 A | 3/2000 | Kakizawa et al. |
| 6,042,902 A | 3/2000 | Kuder et al. |
| 6,045,922 A | 4/2000 | Jannssen et al. |
| 6,060,561 A | 5/2000 | Wolfschwenger et al. |
| 6,069,196 A | 5/2000 | Akao et al. |
| 6,077,899 A | 6/2000 | Yatsuyanagi et al. |
| 6,080,301 A | 6/2000 | Berlowitz et al. |
| 6,080,818 A | 6/2000 | Thakker et al. |
| 6,084,031 A | 7/2000 | Medsker et al. |
| 6,086,996 A | 7/2000 | Rancich et al. |
| 6,090,081 A | 7/2000 | Sudo et al. |
| 6,090,989 A | 7/2000 | Trewella et al. |
| 6,096,420 A | 8/2000 | Wilhoit et al. |
| 6,107,240 A | 8/2000 | Wu et al. |
| 6,111,039 A | 8/2000 | Miro et al. |
| 6,114,457 A | 9/2000 | Markel et al. |
| 6,124,428 A | 9/2000 | Schmieg et al. |
| 6,127,444 A | 10/2000 | Kadri |
| 6,133,414 A | 10/2000 | Pfaendaer et al. |
| 6,143,182 A | 11/2000 | Huang et al. |
| 6,143,846 A | 11/2000 | Herrmann et al. |
| 6,147,180 A | 11/2000 | Markel et al. |
| 6,153,703 A | 11/2000 | Lustiger et al. |
| 6,165,599 A | 12/2000 | Demeuse |
| 6,165,949 A | 12/2000 | Berlowitz et al. |
| 6,177,190 B1 | 1/2001 | Gehlsen et al. |
| 6,184,326 B1 | 2/2001 | Razavi et al. |
| 6,184,327 B1 | 2/2001 | Weng et al. |
| 6,187,449 B1 | 2/2001 | Sasaki et al. |
| 6,190,769 B1 | 2/2001 | Wang |
| 6,191,078 B1 | 2/2001 | Shlomo et al. |
| 6,194,498 B1 | 2/2001 | Anderson et al. |
| 6,197,285 B1 | 3/2001 | Kowalik et al. |
| 6,207,606 B1 | 3/2001 | Lue et al. |
| 6,207,754 B1 | 3/2001 | Yu |
| 6,225,432 B1 | 5/2001 | Weng et al. |
| 6,228,171 B1 | 5/2001 | Shirakawa |
| 6,231,936 B1 | 5/2001 | Kozimor et al. |
| 6,231,970 B1 | 5/2001 | Andersen et al. |
| 6,245,856 B1 | 6/2001 | Kaufman et al. |
| 6,245,870 B1 | 6/2001 | Razavi |
| 6,258,903 B1 | 7/2001 | Mawson et al. |
| 6,271,294 B1 | 8/2001 | Lasson et al. |
| 6,271,323 B1 | 8/2001 | Loveday et al. |
| 6,288,171 B2 | 9/2001 | Finerman et al. |
| 6,294,631 B1 | 9/2001 | Brant |
| 6,297,301 B1 | 10/2001 | Erderly et al. |
| 6,303,067 B1 | 10/2001 | Wong et al. |
| 6,310,134 B1 | 10/2001 | Templeton et al. |
| 6,316,068 B1 | 11/2001 | Masubuchi et al. |
| 6,326,426 B1 | 12/2001 | Ellul |
| 6,329,468 B1 | 12/2001 | Wang |
| 6,337,364 B1 | 1/2002 | Sakaki et al. |
| 6,340,703 B1 | 1/2002 | Kelly |
| 6,342,209 B1 | 1/2002 | Patil et al. |
| 6,342,320 B2 | 1/2002 | Liu et al. |
| 6,342,565 B1 | 1/2002 | Cheng et al. |
| 6,342,566 B1 | 1/2002 | Burkhardt et al. |
| 6,342,574 B1 | 1/2002 | Weng et al. |
| 6,348,563 B1 | 2/2002 | Fukuda et al. |
| 6,362,252 B1 | 3/2002 | Prutkin |
| 6,372,379 B1 | 4/2002 | Samii et al. |
| 6,372,847 B1 | 4/2002 | Wouters |
| 6,380,292 B1 | 4/2002 | Gibes et al. |
| 6,383,634 B1 | 5/2002 | Kornfeldt et al. |
| 6,384,115 B1 | 5/2002 | Van Gysel et al. |
| 6,388,013 B1 | 5/2002 | Saraf et al. |
| 6,399,200 B1 | 6/2002 | Sugimoto et al. |
| 6,399,707 B1 | 6/2002 | Meka et al. |
| 6,403,692 B1 | 6/2002 | Traugott et al. |
| 6,410,200 B1 | 6/2002 | Williams et al. |
| 6,413,458 B1 | 7/2002 | Pearce |
| 6,423,800 B1 | 7/2002 | Musgrave |
| 6,448,338 B1 | 9/2002 | Born et al. |
| 6,448,349 B1 | 9/2002 | Razavi |
| 6,451,915 B1 | 9/2002 | Ellul et al. |
| 6,465,109 B2 | 10/2002 | Ohtsuka |
| 6,476,135 B1 | 11/2002 | Bugada et al. |
| 6,482,281 B1 | 11/2002 | Schmidt |
| 6,498,213 B2 | 12/2002 | Jeong et al. |
| 6,500,563 B1 | 12/2002 | Datta et al. |
| 6,503,588 B1 | 1/2003 | Hayashi et al. |
| 6,509,128 B1 | 1/2003 | Everaerts et al. |
| 6,515,231 B1 | 2/2003 | Strobech et al. |
| 6,525,157 B2 | 2/2003 | Cozewith et al. |
| 6,531,214 B2 | 3/2003 | Carter et al. |
| 6,538,066 B2 | 3/2003 | Watanabe et al. |
| 6,559,232 B2 | 5/2003 | Inoue et al. |
| 6,583,076 B1 | 6/2003 | Pekrul et al. |
| 6,583,207 B2 | 6/2003 | Stanhope et al. |
| 6,610,768 B1 | 8/2003 | Jelenic et al. |
| 6,620,892 B1 | 9/2003 | Bertin et al. |
| 6,623,847 B2 | 9/2003 | Yates |
| 6,627,723 B2 | 9/2003 | Karandinos et al. |
| 6,632,385 B2 | 10/2003 | Kauschke et al. |
| 6,632,974 B1 | 10/2003 | Suzuki et al. |
| 6,635,715 B1 | 10/2003 | Cozewith et al. |
| 6,639,020 B1 | 10/2003 | Brant |
| 6,642,316 B1 | 11/2003 | Datta et al. |
| 6,653,385 B2 | 11/2003 | Wang et al. |
| 6,656,385 B2 | 12/2003 | Lynch et al. |
| 6,659,965 B1 | 12/2003 | Kensey et al. |
| 6,706,828 B2 | 3/2004 | DiMaio |
| 6,720,376 B2 | 4/2004 | Itoh et al. |
| 6,730,739 B2 | 5/2004 | Gipson |
| 6,730,754 B2 | 5/2004 | Resconi et al. |
| 6,747,114 B2 | 6/2004 | Karandinos et al. |
| 6,750,284 B1 | 6/2004 | Dharmarajan et al. |
| 6,750,292 B2 | 6/2004 | Dozeman et al. |
| 6,750,306 B2 | 6/2004 | Brant |
| 6,753,373 B2 | 6/2004 | Winowiecki |
| 6,787,593 B2 | 9/2004 | Bell et al. |
| 6,803,103 B2 | 10/2004 | Kauschke et al. |
| 6,803,415 B1 | 10/2004 | Mikielski et al. |
| 6,818,704 B2 | 11/2004 | Brant |
| 6,855,777 B2 | 2/2005 | McLoughlin et al. |
| 6,858,767 B1 | 2/2005 | DiMaio et al. |
| 6,861,143 B2 | 3/2005 | Castellani et al. |
| 6,867,253 B1 | 3/2005 | Chen |
| 6,875,485 B2 | 4/2005 | Kanai et al. |
| 6,887,941 B2 | 5/2005 | Zhou |
| 6,887,944 B2 | 5/2005 | Wakabayashi et al. |
| 6,900,147 B2 | 5/2005 | Morman et al. |
| 6,905,760 B1 | 6/2005 | Mukohara et al. |
| 6,906,160 B2 | 6/2005 | Stevens et al. |
| 6,916,882 B2 | 7/2005 | Brant |
| 6,921,794 B2 | 7/2005 | Cozewith et al. |
| 6,984,696 B2 | 1/2006 | Curry et al. |
| 6,992,131 B2 | 1/2006 | Faissat et al. |
| 6,992,146 B2 | 1/2006 | McLoughlin et al. |

| Patent No. | Date | Inventor |
|---|---|---|
| 7,015,283 B2 | 3/2006 | Schauder et al. |
| 7,037,989 B2 | 5/2006 | Kacker et al. |
| 7,049,356 B2 | 5/2006 | Itoh et al. |
| 7,153,571 B2 | 12/2006 | Allermann |
| 7,223,822 B2 | 5/2007 | Abhari et al. |
| 7,226,977 B2 | 6/2007 | Kim et al. |
| 7,238,747 B2 | 7/2007 | Brant |
| 7,271,209 B2 | 9/2007 | Li et al. |
| 7,294,681 B2 | 11/2007 | Jiang et al. |
| 7,319,077 B2 | 1/2008 | Mehta et al. |
| 7,365,137 B2 | 4/2008 | Resconi et al. |
| 7,413,784 B2 | 8/2008 | Ouhadi |
| 7,459,635 B2 | 12/2008 | Belli et al. |
| 7,470,740 B2 | 12/2008 | Givord et al. |
| 7,476,710 B2 | 1/2009 | Mehta et al. |
| 7,524,910 B2 | 4/2009 | Jiang et al. |
| 7,531,594 B2 | 5/2009 | Lin et al. |
| 7,541,402 B2 | 6/2009 | Abhari et al. |
| 7,595,365 B2 | 9/2009 | Kappes et al. |
| 7,615,589 B2 | 11/2009 | Westwood et al. |
| 7,619,026 B2 | 11/2009 | Yang et al. |
| 7,619,027 B2 | 11/2009 | Lundmark et al. |
| 7,622,523 B2 | 11/2009 | Li et al. |
| 7,629,416 B2 | 12/2009 | Li et al. |
| 7,632,887 B2 | 12/2009 | Lin et al. |
| 7,645,829 B2 | 1/2010 | Tse et al. |
| 7,652,092 B2 | 1/2010 | Tse et al. |
| 7,652,093 B2 | 1/2010 | Yang et al. |
| 7,652,094 B2 | 1/2010 | Lin et al. |
| 7,662,885 B2 | 2/2010 | Coffey et al. |
| 7,683,129 B2 | 3/2010 | Mehta et al. |
| 7,714,043 B2 | 5/2010 | Tracey et al. |
| 7,874,471 B2 | 1/2011 | Fairchild et al. |
| 2001/0007896 A1 | 7/2001 | Agarwal et al. |
| 2001/0051265 A1 | 12/2001 | Williams et al. |
| 2001/0056159 A1 | 12/2001 | Jeong et al. |
| 2002/0007696 A1 | 1/2002 | Peyre |
| 2002/0010257 A1 | 1/2002 | Templeton et al. |
| 2002/0049276 A1 | 4/2002 | Zwick |
| 2002/0050124 A1 | 5/2002 | Jaeger |
| 2002/0077409 A1 | 6/2002 | Sakaki et al. |
| 2002/0082328 A1 | 6/2002 | Yu et al. |
| 2002/0147266 A1 | 10/2002 | Rawlinson et al. |
| 2002/0155267 A1 | 10/2002 | Bader |
| 2002/0160137 A1 | 10/2002 | Varma |
| 2002/0168518 A1 | 11/2002 | Bond et al. |
| 2002/0183429 A1 | 12/2002 | Itoh et al. |
| 2002/0188057 A1 | 12/2002 | Chen |
| 2003/0004266 A1 | 1/2003 | Kitazaki et al. |
| 2003/0022977 A1 | 1/2003 | Hall |
| 2003/0032696 A1 | 2/2003 | Sime et al. |
| 2003/0035951 A1 | 2/2003 | Magill et al. |
| 2003/0036577 A1 | 2/2003 | Hughes et al. |
| 2003/0036592 A1 | 2/2003 | Longmoore et al. |
| 2003/0060525 A1 | 3/2003 | Gupta |
| 2003/0060557 A1 | 3/2003 | Tasaka et al. |
| 2003/0091803 A1 | 5/2003 | Bond et al. |
| 2003/0092826 A1 | 5/2003 | Pearce |
| 2003/0100238 A1 | 5/2003 | Morman et al. |
| 2003/0119988 A1 | 6/2003 | Johnson et al. |
| 2003/0130430 A1 | 7/2003 | Cozewith et al. |
| 2003/0134552 A1 | 7/2003 | Mehawej et al. |
| 2003/0144415 A1 | 7/2003 | Wang et al. |
| 2003/0157859 A1 | 8/2003 | Ishikawa |
| 2003/0181575 A1 | 9/2003 | Schmidt et al. |
| 2003/0181584 A1 | 9/2003 | Handlin, Jr. et al. |
| 2003/0187081 A1 | 10/2003 | Cui |
| 2003/0204017 A1 | 10/2003 | Stevens et al. |
| 2003/0213938 A1 | 11/2003 | Farley et al. |
| 2004/0030287 A1 | 2/2004 | Matthijs et al. |
| 2004/0034148 A1 | 2/2004 | Kelly et al. |
| 2004/0038058 A1 | 2/2004 | Zhou |
| 2004/0054040 A1 | 3/2004 | Lin et al. |
| 2004/0054086 A1 | 3/2004 | Schauder et al. |
| 2004/0063806 A1 | 4/2004 | Kaarnakari |
| 2004/0070653 A1 | 4/2004 | Mashita et al. |
| 2004/0091631 A1 | 5/2004 | Belli et al. |
| 2004/0106723 A1 | 6/2004 | Yang et al. |
| 2004/0116515 A1 | 6/2004 | Anderson et al. |
| 2004/0122388 A1 | 6/2004 | McCormack et al. |
| 2004/0186214 A1 | 9/2004 | Li et al. |
| 2004/0214498 A1 | 10/2004 | Webb et al. |
| 2004/0241309 A1 | 12/2004 | Garnier |
| 2004/0249046 A1 | 12/2004 | Abhari et al. |
| 2004/0260001 A1 | 12/2004 | Lin et al. |
| 2004/0266948 A1 | 12/2004 | Jacob et al. |
| 2005/0009993 A1 | 1/2005 | Morioka et al. |
| 2005/0018983 A1 | 1/2005 | Brown et al. |
| 2005/0019515 A1* | 1/2005 | Mihan et al. ............... 428/35.7 |
| 2005/0043484 A1 | 2/2005 | Wang et al. |
| 2005/0101210 A1 | 5/2005 | Bindschedler et al. |
| 2005/0106978 A1 | 5/2005 | Cheng et al. |
| 2005/0107534 A1 | 5/2005 | Datta et al. |
| 2005/0130544 A1 | 6/2005 | Cheng et al. |
| 2005/0148720 A1 | 7/2005 | Li et al. |
| 2005/0170117 A1 | 8/2005 | Cleveland et al. |
| 2005/0215717 A1 | 9/2005 | Dozeman |
| 2005/0222861 A1 | 10/2005 | Silverman et al. |
| 2005/0250894 A1 | 11/2005 | Null |
| 2005/0262464 A1 | 11/2005 | Esch, Jr. et al. |
| 2005/0271851 A1 | 12/2005 | Shibatou et al. |
| 2005/0277738 A1 | 12/2005 | Hoyweghen et al. |
| 2006/0008643 A1 | 1/2006 | Lin et al. |
| 2006/0020067 A1 | 1/2006 | Brant et al. |
| 2006/0079617 A1 | 4/2006 | Kappes et al. |
| 2006/0100347 A1 | 5/2006 | Ouhadi et al. |
| 2006/0100379 A1 | 5/2006 | Ouhadi |
| 2006/0135699 A1 | 6/2006 | Li et al. |
| 2006/0167184 A1 | 7/2006 | Waddell et al. |
| 2006/0173123 A1 | 8/2006 | Yang et al. |
| 2006/0178483 A1 | 8/2006 | Mehta et al. |
| 2006/0183860 A1 | 8/2006 | Mehta et al. |
| 2006/0189763 A1 | 8/2006 | Yang et al. |
| 2006/0189844 A1 | 8/2006 | Tien |
| 2006/0205863 A1 | 9/2006 | Lin et al. |
| 2006/0247331 A1 | 11/2006 | Coffey et al. |
| 2006/0247332 A1 | 11/2006 | Coffey et al. |
| 2006/0293460 A1 | 12/2006 | Jacob et al. |
| 2007/0021560 A1 | 1/2007 | Tse et al. |
| 2007/0021561 A1 | 1/2007 | Tse et al. |
| 2007/0021566 A1 | 1/2007 | Tse et al. |
| 2007/0100053 A1 | 5/2007 | Chapman et al. |
| 2007/0167553 A1 | 7/2007 | Westwood et al. |
| 2007/0203273 A1 | 8/2007 | Van Riel et al. |
| 2007/0240605 A1 | 10/2007 | Iyer et al. |
| 2008/0045638 A1 | 2/2008 | Chapman et al. |
| 2008/0070994 A1 | 3/2008 | Li et al. |
| 2008/0177123 A1 | 7/2008 | Blais et al. |
| 2008/0188600 A1 | 8/2008 | Westwood et al. |
| 2008/0221274 A1 | 9/2008 | Jourdain |
| 2008/0226858 A1* | 9/2008 | Walter et al. ............... 428/36.9 |
| 2008/0227919 A9* | 9/2008 | Li et al. ............... 525/240 |
| 2008/0234157 A1 | 9/2008 | Yoon et al. |
| 2008/0268272 A1 | 10/2008 | Jourdain |
| 2008/0317990 A1 | 12/2008 | Runyan et al. |
| 2009/0003781 A1 | 1/2009 | Parris et al. |
| 2009/0043049 A1 | 2/2009 | Chapman et al. |
| 2009/0062429 A9 | 3/2009 | Coffey et al. |
| 2009/0171001 A1 | 7/2009 | Lin et al. |
| 2009/0197995 A1 | 8/2009 | Tracey et al. |
| 2009/0270296 A1 | 10/2009 | Patil et al. |
| 2010/0035498 A1 | 2/2010 | Lundmark et al. |
| 2010/0036038 A1 | 2/2010 | Rogers et al. |
| 2010/0152346 A1 | 6/2010 | Yang et al. |
| 2010/0160506 A1 | 6/2010 | Wu et al. |
| 2011/0064931 A1 | 3/2011 | Tse et al. |

FOREIGN PATENT DOCUMENTS

| | | |
|---|---|---|
| DE | 1961981 | 7/1970 |
| DE | 1921649 | 11/1970 |
| DE | 2019945 | 11/1971 |
| DE | 1769723 | 2/1972 |
| DE | 2108293 | 8/1972 |
| DE | 2632957 | 1/1978 |
| DE | 3735502 | 5/1989 |
| DE | 3911725 | 10/1990 |
| DE | 4417191 | 8/1995 |
| DE | 4420991 | 12/1995 |

| | | | | | | |
|---|---|---|---|---|---|---|
| DE | 19841303 | 3/2000 | | EP | 1 028 145 | 8/2000 |
| EP | 0 210 733 | 2/1972 | | EP | 1 104 783 | 6/2001 |
| EP | 0 039 126 | 11/1981 | | EP | 1 138 478 | 10/2001 |
| EP | 0 046 536 | 3/1982 | | EP | 1 201 391 | 5/2002 |
| EP | 0046536 | 3/1982 | | EP | 1 201 406 | 5/2002 |
| EP | 0 083 049 | 7/1983 | | EP | 1 211 285 | 6/2002 |
| EP | 0 087 294 | 8/1983 | | EP | 1 214 386 | 6/2002 |
| EP | 0 097 969 | 1/1984 | | EP | 1 223 191 | 7/2002 |
| EP | 0 050 548 | 1/1985 | | EP | 1 239 004 | 9/2002 |
| EP | 0 058 331 | 6/1985 | | EP | 1 241 224 | 9/2002 |
| EP | 0 058 404 | 1/1986 | | EP | 1 252 231 | 10/2002 |
| EP | 0 168 923 | 1/1986 | | EP | 1 313 805 | 5/2003 |
| EP | 0 214 112 | 3/1987 | | EP | 1 331 258 | 7/2003 |
| EP | 0 073 042 | 10/1987 | | EP | 1 357 150 | 10/2003 |
| EP | 0 240 563 | 10/1987 | | EP | 1 366 087 | 12/2003 |
| EP | 0 217 516 | 2/1988 | | EP | 1 453 912 | 9/2004 |
| EP | 0 255 735 | 2/1988 | | EP | 1 505 181 | 2/2005 |
| EP | 0 332 802 | 3/1988 | | EP | 1 607 440 | 12/2005 |
| EP | 0 315 363 | 10/1988 | | FR | 1167244 | 11/1958 |
| EP | 0 299 718 | 1/1989 | | FR | 1536425 | 8/1968 |
| EP | 0 300 682 | 1/1989 | | FR | 1566388 | 5/1969 |
| EP | 0 300 689 | 1/1989 | | FR | 1580539 | 9/1969 |
| EP | 0 308 286 | 3/1989 | | FR | 2094870 | 3/1972 |
| EP | 0 321 868 | 6/1989 | | FR | 2110824 | 6/1972 |
| EP | 0 322 169 | 6/1989 | | FR | 2212382 | 7/1974 |
| EP | 0 315 481 | 8/1989 | | FR | 2256207 | 7/1975 |
| EP | 0 326 753 | 8/1989 | | FR | 2272143 | 12/1975 |
| EP | 0 343 943 | 11/1989 | | FR | 2602515 | 2/1988 |
| EP | 0344014 | 11/1989 | | GB | 0511319 | 8/1939 |
| EP | 0 369 164 | 5/1990 | | GB | 0511320 | 8/1939 |
| EP | 0 374 695 | 6/1990 | | GB | 0964845 | 7/1964 |
| EP | 0 389 695 | 10/1990 | | GB | 0977113 | 12/1964 |
| EP | 0 400 333 | 12/1990 | | GB | 1044028 | 9/1966 |
| EP | 0404011 | 12/1990 | | GB | 1044502 | 10/1966 |
| EP | 0 409 155 | 1/1991 | | GB | 1044503 | 10/1966 |
| EP | 0407098 | 1/1991 | | GB | 1068783 | 5/1967 |
| EP | 0 416 939 | 3/1991 | | GB | 1108298 | 4/1968 |
| EP | 0 428 153 | 5/1991 | | GB | 1134422 | 11/1968 |
| EP | 0 431 475 | 6/1991 | | GB | 1166664 | 10/1969 |
| EP | 0448259 | 9/1991 | | GB | 1252638 | 11/1971 |
| EP | 0 462 574 | 12/1991 | | GB | 1329915 | 9/1973 |
| EP | 0 464 546 | 1/1992 | | GB | 1331988 | 9/1973 |
| EP | 0 464 547 | 1/1992 | | GB | 1350257 | 4/1974 |
| EP | 0 476 401 | 3/1992 | | GB | 1352311 | 5/1974 |
| EP | 0 476 700 | 3/1992 | | GB | 1390359 | 4/1975 |
| EP | 0 477 748 | 4/1992 | | GB | 1429494 | 3/1976 |
| EP | 0 513 470 | 11/1992 | | GB | 1440230 | 6/1976 |
| EP | 0 548 040 | 6/1993 | | GB | 1452911 | 10/1976 |
| EP | 0 565 073 | 10/1993 | | GB | 1458915 | 12/1976 |
| EP | 0 583 836 | 2/1994 | | GB | 1559058 | 1/1980 |
| EP | 0 604 917 | 7/1994 | | GB | 2061339 | 5/1981 |
| EP | 0 614 939 | 9/1994 | | GB | 2187466 | 9/1987 |
| EP | 0 617 077 | 9/1994 | | GB | 2195642 | 4/1988 |
| EP | 0 618 261 | 10/1994 | | JP | 68013376 | 6/1943 |
| EP | 0 622 432 | 11/1994 | | JP | 44-029554 | 12/1969 |
| EP | 0 629 631 | 12/1994 | | JP | 74041101 | 11/1974 |
| EP | 0 629 632 | 12/1994 | | JP | 50-123148 | 9/1975 |
| EP | 0 654 070 | 5/1995 | | JP | 50-151243 | 12/1975 |
| EP | 0 664 315 | 7/1995 | | JP | 51-012842 | 1/1976 |
| EP | 0 677 548 | 10/1995 | | JP | 53-023388 | 3/1976 |
| EP | 0 682 074 | 11/1995 | | JP | 76029170 | 3/1976 |
| EP | 0 373 660 | 2/1996 | | JP | 51-144998 | 12/1976 |
| EP | 0 699 519 | 3/1996 | | JP | 53-060383 | 5/1978 |
| EP | 0 733 677 | 9/1996 | | JP | 53-102381 | 9/1978 |
| EP | 0 742 227 | 11/1996 | | JP | 54093037 | 7/1979 |
| EP | 0755970 | 1/1997 | | JP | 56020053 | 2/1981 |
| EP | 0757076 | 2/1997 | | JP | 56-045932 | 4/1981 |
| EP | 0 774 347 | 5/1997 | | JP | 56095938 | 8/1981 |
| EP | 0 801 104 | 10/1997 | | JP | 60-112439 | 6/1985 |
| EP | 0 827 526 | 3/1998 | | JP | 62-132943 | 6/1987 |
| EP | 0 886 656 | 12/1998 | | JP | 62-223245 | 10/1987 |
| EP | 0 902 051 | 3/1999 | | JP | 63-251436 | 10/1988 |
| EP | 0 909 280 | 4/1999 | | JP | 64016638 | 1/1989 |
| EP | 0 716 124 | 6/1999 | | JP | 64017495 | 1/1989 |
| EP | 0 940 433 | 9/1999 | | JP | 64066253 | 3/1989 |
| EP | 0 969 043 | 1/2000 | | JP | 01106628 | 4/1989 |
| EP | 0 990 675 | 5/2000 | | JP | 01152448 | 6/1989 |
| EP | 1 002 814 | 5/2000 | | JP | 01192365 | 8/1989 |
| EP | 1 003 814 | 5/2000 | | JP | 01282280 | 11/1989 |

| | | | | | |
|---|---|---|---|---|---|
| JP | 02038114 | 2/1990 | WO | 9719582 | 6/1997 |
| JP | 02067344 | 3/1990 | WO | 9722662 | 6/1997 |
| JP | 02080445 | 3/1990 | WO | 9733921 | 9/1997 |
| JP | 03037481 | 2/1991 | WO | 9749737 | 12/1997 |
| JP | 03269036 | 11/1991 | WO | 9832784 | 7/1998 |
| JP | 04063851 | 2/1992 | WO | 9836783 | 8/1998 |
| JP | 04214709 | 8/1992 | WO | 9842437 | 10/1998 |
| JP | 04257361 | 9/1992 | WO | 9844041 | 10/1998 |
| JP | 05098088 | 4/1993 | WO | 9846694 | 10/1998 |
| JP | 05112842 | 5/1993 | WO | 9849229 | 11/1998 |
| JP | 05202339 | 8/1993 | WO | 9907788 | 2/1999 |
| JP | 93287132 | 11/1993 | WO | 9913016 | 3/1999 |
| JP | 06001892 | 1/1994 | WO | 9919547 | 4/1999 |
| JP | 06316659 | 11/1994 | WO | 9924501 | 5/1999 |
| JP | 06345893 | 12/1994 | WO | 9924506 | 5/1999 |
| JP | 07214685 | 8/1995 | WO | 9962987 | 12/1999 |
| JP | 07216143 | 8/1995 | WO | 0000564 | 1/2000 |
| JP | 07085907 | 9/1995 | WO | 0001745 | 1/2000 |
| JP | 07118492 | 9/1995 | WO | 0037514 | 6/2000 |
| JP | 07247387 | 9/1995 | WO | 0066662 | 11/2000 |
| JP | 07292167 | 11/1995 | WO | 0069963 | 11/2000 |
| JP | 08019286 | 2/1996 | WO | 0069965 | 11/2000 |
| JP | 08019287 | 2/1996 | WO | 0069966 | 11/2000 |
| JP | 08034862 | 6/1996 | WO | 0102263 | 1/2001 |
| JP | 08246232 | 9/1996 | WO | 0109200 | 2/2001 |
| JP | 08253754 | 10/1996 | WO | 0118109 | 3/2001 |
| JP | 08269417 | 10/1996 | WO | 0143963 | 6/2001 |
| JP | 08067782 | 12/1996 | WO | 0148034 | 7/2001 |
| JP | 08333557 | 12/1996 | WO | 0181493 | 11/2001 |
| JP | 09076260 | 3/1997 | WO | 0190113 | 11/2001 |
| JP | 09077901 | 3/1997 | WO | 0210310 | 2/2002 |
| JP | 09087435 | 3/1997 | WO | 0217973 | 3/2002 |
| JP | 09104801 | 4/1997 | WO | 0218487 | 3/2002 |
| JP | 97111061 | 4/1997 | WO | 0224767 | 3/2002 |
| JP | 09176359 | 7/1997 | WO | 0230194 | 4/2002 |
| JP | 09208761 | 8/1997 | WO | 0231044 | 4/2002 |
| JP | 10017693 | 1/1998 | WO | 0236651 | 5/2002 |
| JP | 10036569 | 2/1998 | WO | 0247092 | 6/2002 |
| JP | 10158971 | 6/1998 | WO | 02051634 | 7/2002 |
| JP | 10168252 | 6/1998 | WO | 02053629 | 7/2002 |
| JP | 10279750 | 10/1998 | WO | 02062891 | 8/2002 |
| JP | 10324783 | 12/1998 | WO | 02072689 | 9/2002 |
| JP | 10325060 | 12/1998 | WO | 02074873 | 9/2002 |
| JP | 11012402 | 1/1999 | WO | 02083753 | 10/2002 |
| JP | 11020397 | 1/1999 | WO | 02088238 | 11/2002 |
| JP | 11049903 | 2/1999 | WO | 02100153 | 12/2002 |
| JP | 11060789 | 3/1999 | WO | 03021569 | 3/2003 |
| JP | 11080455 | 3/1999 | WO | 03029379 | 4/2003 |
| JP | 11239587 | 9/1999 | WO | 03040095 | 5/2003 |
| JP | 11291422 | 10/1999 | WO | 03040201 | 5/2003 |
| JP | 2000109640 | 4/2000 | WO | 03040202 | 5/2003 |
| JP | 2000154281 | 6/2000 | WO | 03040233 | 5/2003 |
| JP | 2001049056 | 2/2001 | WO | 03040442 | 5/2003 |
| JP | 2001064523 | 3/2001 | WO | 03048252 | 6/2003 |
| JP | 2001131509 | 5/2001 | WO | 03060004 | 7/2003 |
| JP | 2001233992 | 8/2001 | WO | 03066729 | 8/2003 |
| JP | 2001279031 | 10/2001 | WO | 03083003 | 10/2003 |
| JP | 2001342355 | 12/2001 | WO | 2004009699 | 1/2004 |
| JP | 3325376 | 9/2002 | WO | 2004014988 | 2/2004 |
| JP | 3325377 | 9/2002 | WO | 2004014994 | 2/2004 |
| JP | 2003003023 | 1/2003 | WO | 2004014997 | 2/2004 |
| JP | 2003155387 | 5/2003 | WO | 2004020195 | 3/2004 |
| JP | 3474677 | 12/2003 | WO | 2004031292 | 4/2004 |
| JP | 4345327 | 10/2009 | WO | 2004035681 | 4/2004 |
| SU | 455976 | 1/1975 | WO | 2004060994 | 7/2004 |
| SU | 812800 | 12/1978 | WO | 2004087806 | 10/2004 |
| SU | 857179 | 3/1979 | WO | 2004113438 | 12/2004 |
| WO | 8900028 | 1/1989 | WO | 2005010094 | 2/2005 |
| WO | 8908681 | 9/1989 | WO | 2005014872 | 2/2005 |
| WO | 9118045 | 11/1991 | WO | 2005049670 | 6/2005 |
| WO | 9214784 | 9/1992 | WO | 2005052052 | 6/2005 |
| WO | 9216583 | 10/1992 | WO | 2005080495 | 9/2005 |
| WO | 9415014 | 7/1994 | WO | 2006006346 | 1/2006 |
| WO | 9513316 | 5/1995 | WO | 2006027327 | 3/2006 |
| WO | 9604419 | 2/1996 | WO | 2006044149 | 4/2006 |
| WO | 9611231 | 4/1996 | WO | 2006083540 | 8/2006 |
| WO | 9611232 | 4/1996 | WO | 2006118674 | 11/2006 |
| WO | 9626242 | 8/1996 | WO | 2006128646 | 12/2006 |
| WO | 9710298 | 3/1997 | | | |

| WO | 2006128647 | 12/2006 |
| WO | 2007048422 | 5/2007 |
| WO | 2007145713 | 12/2007 |

OTHER PUBLICATIONS

Stehr, Jens; Investigation of the effects of poly(.alpha.-olefin) plasticizers on the properties of elastomers; KGK, Kautschuk Gummi Kunststoffe (2007), 60(1-2), 14-16, 18-19; Hamburg, Germany.

Fink et al., Ed., Ziegler Catalysts—Recent Scientific Innovations and Technological Improvements, Springer-Verlag, Berlin Heidelberg, 1995.

Chemical Additives for Plastics Industry 107-116 (Radian Corp., Noyes Data Corporation, NJ 1987).

Concise Encyclopedia of Polymer Science and Engineering 90-92 (Jacqueline I. Kroschwitz, ed., John Wiley & sons 1990).

CRC Handbook of Chemistry and Physics (David R. Lide, 60th ed.) 1986, p. E-60.

Blomenhofer et al., "Designer" Nucleating Agents for Polypropylene, Macromol., 2005, vol. 38, p. 3688-3695.

Wild, et al., Determination of Branching Distributions in Polyethylene and Ethylene Copolymers, J. Poly. Sci., Poly. Phys. Ed., vol. 20, p. 441 (1982).

Sun et al., Effect of Short chain Branching on the Coil Dimensions of Polyolefins in Dilute Solution, T. Macromol., vol. 34, No. 19, 6812-6820 (2001).

Collette et al., "Elastomeric Polypropylenes from Alumina-Supported Tetraalkyl Group IVB Catalysts, 1. Synthesis and Properties of High Molecular Weight Stereoblock Homopolymers and 2. Chain Microstructure, Crystallinity, and Morphology", Macromol., vol. 22, 3851-3866, 1989.

Bovey, Polymer Conformation and Configuration, A Polytechnic Press of the Polytechnic Institute of Brooklyn Book, Academic Press, New York, London, 1969.

Cheng et al., 13C Nuclear Magnetic Resonance Characterization of Poly(propylene) Prepared With Homogeneous Catalysts, Makromol. Chem., 1989, 190, pp. 1931-1943.

Metallocene-based Polyolefins, Preparation, properties and technology, Scheirs et al. Editors, Wiley Series in Polymer Science, vol. 2, John Wiley & Sons, Ltd., England, 2000.

Rubber Technology Handbook, Werner Hoffman, Hanser Publishers, New York, 1989, pp. 294-305.

K. Nitta et al., "Plasticizing of isotactic polypropylene upon addition of hydrocarbon oils", e-Polymers, vol. 21, 2004, pp. 1-11.

Plastics Additives and A-Z Reference, 499-504 (Geoffrey Pritchard, ed., Chapman & Hall 1998).

Plastics Processing, Technology and Health Effects, Radian Corporation, McLean, Virginia, Noyes Data Corporation, 1986.

Brandrup et al., Ed., Polymer Handbook, 4th Edition, A Wiley-Interscience Publication, 1999.

Additives for Plastics, J. Stepek, H. Daoust, Springer Verlag, New York, 1983, pp. 6-69.

Synthetic Lubricants and High-Performance Functional Fluids (Leslie R. Rudnick & Ronald L. Shubkin, ed. Marcel Dekker, Inc. 1999) p. 3-52.

Polypropylene Handbook pp. 304-348 (Edward P. Moore, Jr. ed., Hanser Publishers 1996).

Tsutsui et al., Propylene Homo- and copolymerization with ethylene using an ethylenebis(1-indenyl)zirconium dichloride and methlaluminoxane catalyst system.

Resconi et al., Selectivity in Propene Polymerization with Metallocene Catalysts, 100 Chem. Rev. 1253-1345 (2000).

Risch, Ph.D., "Swelling Interaction, Plasticization, and Antioxidant extraction Between Fiber Optic Cable Gels and Polyolefins", SPE-ANTEC, 1999, pp. 1-5.

McShane, et al., The Effect of Oil Type and Content on the Rheological, Mechanical and Thermal Proper6ties of a Polyolefinic Based Thermoplastic Elastomer, SPE ANTEC 2002, pp. 1-5.

B.J. Gedeon et al., "Use of "Clean" paraffinic Processing Oils to Improve TPE Properties", TPEs, 2000, pp. 157-170.

Wheeler et al., Gel Permeation Chromatography/Fourier Transform Infrared Interface for Polymer Analysis, Applied Spectroscopy, 1993, vol. 47, pp. 1128-1130.

Wu et al., "Plasticizing Characteristics of High-Density polyethylene", Suliao, 1988, 17 (4), 3-8 (Abstract).

Kanauzov et al., "Effect of Technological Additives on Properties of Thermoplastic vulcanizates Base don Ethylene Propylene rubber and Polyolefins", Kauchuk I Rezina, 2000, (40), 12-15 (Abstract).

J.D. Fotheringham, Polybutenes: a versatile modifier for plastics, AddCon Asia (RAPRA), International Plastics Additives and Modifiers Conference, Singapore, Oct. 28-29, 1997 (Abstract).

M.D. Nasibova et al., "Effect of Petroleum Plasticizers and Synthetic Oils on Rheological and service Properties of Polyolefins", Olefinovs Opyt. Z-dom, 1991 (14), 60-66 (Abstract).

Handbook of Plastics, Elastomers, and Composites, Charles A. Harper Editor in Chief, 2nd Edition, McGraw-Hill, Inc., 1992, pp. 1.13-1.14.

Maltby et al., "Slip Additives for Film Extrusion", Journal of Plastic Film & Sheeting, Boston, MA, Apr. 1998, vol. 14, pp. 111-120.

Encyclopedia of Polymer Science and Engineering, G. ver Strate, vol. 6, 2nd Ed., 1986, pp. 522-564.

Polypropylene Handbook, 2nd Ed., N. Pasquini, Ed. (Hanser, 2005), p. 314-330.

Polymer Blends, D.R. Paul and C.B. Bucknall, Eds. (Wiley-Interscience, 2000), vol. 2, pp. 177-224.

Maier et al., Polypropylene—The Definitive User's Guide and Databook, 1998, pp. 11-25 and 97-106.

Gande, et al. CIBA Chemicals, Improved MB Fabrics Through Innovative Vis-breaking Techn., 14th Annual TANDEC Conf., Nov. 9-Nov. 4.

Gande et al. Of CIBA Chemicals, Peroxide-Free Vis-Breaking Additive for Improved Qualities in Meltblown Fabrics, CR76 TANDEC Conference 2006.

Hawley's Condensed Chemical Dictionary, 14th Ed. (2001) p. 835.

Dharmarajan et al., Modifying Polypropylene with a Metallocene Plastomer, Plastics Engr., Aug. 1996, pp. 33-35.

Synthetic Lubricants and High-Performance Functional Fluids (Rudnick et al. ed., Marcel Dekker 1999), pp. 357-392.

Khungar, Flexible Films of Polypropylene Plasticized with Polybutenes, Amoco Chemicals, 1996, pp. 2992-2996.

Pratt et al., Control of Phase Separation and Voiding in Oil-Filled Polypropylene, Journal of Applied Polymers Science, vol. 18, 1974, pp. 3621-3631.

Synthetic Lubricants and High-Performance Functional Fluids (Rudnick et al. ed., Marcel Dekker 1999), pp. 393-411.

Hawleys Condensed Chemical Dictionary, 1997, pp. 888, 889, 903, 1097.

Nucleation of Polypropylene, Polymer Additives and Colors, Nov. 27, 2000, Provided by www.specialchem4polymers.com.

U.S. Appl. No. 60/649,107.
U.S. Appl. No. 60/649,264.
U.S. Appl. No. 61/203,523.
U.S. Appl. No. 61/203,524.
U.S. Appl. No. 12/705,835.
U.S. Appl. No. 12/012,380.

* cited by examiner

CROSSLINKED POLYETHYLENE ARTICLES AND PROCESSES TO PRODUCE SAME

PRIORITY CLAIM AND CROSS REFERENCE TO RELATED APPLICATIONS

This application is a continuation-in-part of U.S. Pat. No. 11/333,421, filed Jan. 17, 2006, now U.S. Pat. No. 7,795,366, which is a non-provisional of U.S. 60/649,266, filed Feb. 2, 2005; this application is a continuation-in-part of U.S. Ser. No. 11/406,654, filed Apr. 19, 2006, now U.S.Pat. No. 7,652,093, which is a continuation-in-part of U.S. Ser. No. 10/640,435, filed Aug. 12, 2003, now U.S. Pat. No. 7,619,026; and this application also claims the benefit of and priority to application U.S. 60/936,577 filed Jun. 21, 2007, U.S. 61/021,277, filed Jan. 15, 2008, and PCT/US2008/065177 filed May 29, 2008.

BACKGROUND OF THE INVENTION

This application relates, in general, to a plastic material often used in high pressure applications having improved flexibility and a method of manufacturing such material, and more particularly to the addition of a polymer modifier to a base polymer for increasing the flexibility of a plastic material which does not deleteriously affect the base polymer structure and/or strength of the plastic material.

A typical technique for increasing the flexibility of plastic parts is through the addition to the base resin of a relatively lower density polymer or a more amorphous polymer, such as a plastomer, to form the plastic part. Currently used plastomers, while effectively increasing the flexibility of the product, have the disadvantage of decreasing the strength of the plastic as it can deleteriously affect the base polymer structure of the plastic material. In particular, the plastomer typically decreases the strength of the plastic material due to the more amorphous structure.

Crosslinked polyethylene, sometimes referred to as PEX or XL-PE, is a well known plastic material having many common uses. PEX is commonly used in the production of tubing, conduits, and piping for use in a variety of applications such as fire protection, plumbing, heating, gas distribution, and the like. Due to the flexibility and strength of PEX at temperatures ranging from below freezing up to 93° C. (200° F.), PEX is an ideal piping material for hot and cold water plumbing systems, hydronic radiant heating systems, snow melting applications, ice rinks and refrigeration warehouses.

A common use of PEX is in the production of barrier pipes. Barrier pipes are plastic water pipes that are used in domestic heating systems. The pipe is manufactured with a barrier that prevents oxygen from penetrating the material and entering the water system, reducing the risk of corrosion. The oxygen barrier layer is usually a resin material bonded between the outer and inner layer of the pipe itself.

Another common use of crosslinked polyethylene is in wire and cable applications including coatings such as, for example, insulation or jacketing.

In the production of PEX, crosslinks between polyethylene macromolecules are formed to make the resulting molecule more durable under temperature extremes and chemical attack, and more resistant to creep deformation. It is noted that in highly filled blends, such as for wire and cable applications, for example, that the PE is not necessarily considered to strictly crosslink. Therefore, for the purpose of this invention, filled systems that couple, bond or graft, will be considered crosslinked for purposes of the description herein and included within the definition of crosslinked polyethylene.

When attempting to increase the flexibility of PEX pipes for certain uses, such as barrier pipes, to reach a particular flexibility goal, the load levels of previously used plastomers had to be high, usually in excess of 20 percent by weight of the total material composition. These high loadings of plastomer diluted the base PEX polymer structure. Consequently, the finished pipes have poor pressure holding capability, typically fail the required pressure tests and often have impaired high temperature properties.

Semi-crystalline materials such as, for example, polyolefins, are characterized as having an amorphous phase and a crystalline phase. Much of their properties are derived from the amount and morphology of these two phases. Hardness and strength, as examples, are increased with increasing crystallinity whereas flexibility and toughness, as examples, are increased with decreasing crystallinity. This is generally true for high-crystalline materials like plastics, intermediate materials like plastomers and low-crystalline materials like elastomers or rubbers.

In many semi-crystalline materials, and particularly in semi-crystalline polyolefin plastics, the strength and hardness arise from the crystalline phase of the polymer. The crystallinity acts as hard-block crosslink points with interconnecting chains. The overall network formed resists deformation on strain. In plastics this results in high hardness and improved strength. The flexibility and toughness of the semi-crystalline polyolefin arises from the amorphous phase where the chains are entangled randomly. Freedom of the entangled chains to move provides a mechanism for the polymer to absorb impact and flex. There is a balance of desired properties in many polymer applications where better toughness or flexibility is achieved by reducing the crystallinity. However, lowering crystallinity reduces the strength and hardness of the polymer. Conversely, stronger, harder semi-crystalline materials are achieved by increasing the crystallinity at the expense of toughness and flexibility.

One way to extend this balance of properties and increase the strength or hardness without sacrificing toughness or flexibility is to crosslink the chains in the amorphous portion of the polymer. This creates a higher crosslink network density without increasing the crystallinity or hardness of the polyethylene. In ethylene homopolymers and copolymers the chains can be crosslinked in a number of ways including the free-radical chemistry of peroxides, silane chemistry, radical formation from high-energy radiation such as e-beams, and other methods.

To further affect the balance of properties, the addition of modifiers or plasticizers to the polymer is often used to soften the material and improve flexibility. It is understood that the modifiers need to be compatible with the host polymer and that they are generally excluded from the crystalline phase and reside predominantly in the amorphous phase of the host polymer. Typical modifiers can be high Mw, low density copolymers such as plastomers, reactor copolymers (R-CO-PO's), as well as low molecular weight fluid modifiers like mineral oil, white oil and paraffinic oils.

However, as the semi-crystalline polyolefins become more crystalline and plastic-like, it becomes more difficult to modify them. One reason for this is that there is much less amorphous phase for the modifier to occupy and another is that the compatibility with the host polymer often becomes low.

One way previously used to modify the properties of PE, including HD, metallocene, LD and LL in both thermoplastic blends or PEX, was to add lower density ethylene copolymers such as reactor copolymer (R-COPO) or ethylene butene (EB) or ethylene octene (EO) plastomers. When added to HDPE, these materials are incompatible and often form separate rubber domains within the amorphous phase of the host polymer. The resulting two phase morphology can provide impact resistance, in some cases, but these high Mw polymer modifiers also bring undesirable properties such as poor processing, loss of crosslinking efficiency and reduced toughness. They are often more difficult to blend, have reduced cut-through resistance, require a fine control of morphology and often have compatibility issues with the host polymer. In addition, adding a softer polymer modifier will generally reduce the tensile properties, but in an ineffective way. Often it requires a significant amount of rubber modifier to make a tensile property change in the host polymer. Overall, using rubber modifiers to improve flexibility is ineffective.

Another way to modify the properties of thermoplastic PE or PEX is to add fluid modifiers such as mineral oils, white oils and paraffinic oils. However, one problem encountered when using typical plasticizers in crosslinked polyolefin applications is that they act to reduce the efficiency of the cure systems. To counter this effect one must either limit the amount of fluid modifier used, or increase the amount of curative used to achieve the desired crosslink density and physical properties.

Another problem encountered with typical mineral oil modifiers is the compatibility with the host polymer. Since typical modifiers have broad molecular weight distribution (MWD) and a complex composition there are polar components and low molecular weight species that bloom to the surface of the host polymer. As the modifier migrates to the surface, its concentration in the host polymer is reduced over time, and the polymer properties can change significantly. In this example the modifier is said to have low permanence.

DE 1769723 discloses crosslinked PE compositions blended with various oils, apparently for use in electrical cables.

WO 2004/014988, WO 2004/014997, US 2004/0054040, US 2005/0148720, US 2004/0260001, US 2004/0186214, disclose blends of various polyolefins with non-functionalized plasticizers for multiple uses.

US 2006/0247331 and US 2006/0008643 disclose blends of polypropylene and non-functionalized plasticizers for multiple uses.

WO 2006/083540 discloses blends of polyethylene and non-functionalized plasticizers, but do not show specific blends of PE-X and non-functionalized plasticizers for multiple uses.

Silane crosslinked polyethylene for wire and cable applications is disclosed in U.S. Pat. No. 7,153,571.

Other references of interest include U.S. 2001/0056159, U.S. Pat. No. 5,728,754, EP 030 757076 A1, EP 0 755 970 A1, U.S. Pat. Nos. 5,494,962, 5,162,436, EP 0 407 098 B1, EP 0 404 011 A2, EP 0 344 014 A2, U.S. Pat. Nos. 3,415,925, 4,536,537, 4,774,277, JP 56095938 A, EP 0 046 536 B1, and EP 0 448 259 B1.

SUMMARY OF THE INVENTION

Surprisingly, it has been found that the use of certain liquid hydrocarbon modifiers in crosslinked polyethylene (PEX) do not reduce cure efficiency, and have exceptionally high permanence and compatibility in PEX, providing excellent property modification over time without reducing the crosslinked network density.

The present invention employs a polymer modifier added to a base polymer to increase the flexibility of the plastic material, wherein this modifier does not deleteriously interfere with the crosslinking or affect the base polymer structure and/or strength of the plastic material in undesirable ways. It is theorized that the polymer modifier in an embodiment only affects the amorphous regions of the polymer and does not interfere with the crosslinked molecular structure and/or the crystalline portion of the base polymer.

In one embodiment, the present invention provides a method of forming a crosslinked polyethylene article. The method can include: (1) blending a polyethylene resin with a flexibilizing amount of a non-functionalized plasticizer (NFP); (2) processing the blend into a shape of an article; and (3) crosslinking the blend to form the crosslinked polyethylene article. The NFP can have a viscosity index greater than 120, kinematic viscosity of from 3 to 300 cSt at 100° C., pour point less than −20° C., specific gravity less than 0.86, and flash point greater than 200° C., wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP.

In an embodiment of the method, the polyethylene resin can include an ethylene based polymer comprising at least 50 mole % ethylene units and having less than 20 mole % propylene units. The polyethylene resin can be selected from the group consisting of low density polyethylene, high density polyethylene and combinations thereof.

In an embodiment of the method, the blend in the processing step can have a continuous, homogeneous matrix phase of a mixture of the polyethylene resin and the NFP. Alternatively or additionally, the blend can comprise at least 95 weight percent of the polyethylene resin by weight of polymer components of the blend.

In an embodiment of the method, the NFP comprises from about 0.5 to about 10 weight percent by weight of the polyethylene resin, preferably 0.5 to 5 weight percent. The NFP can be selected from poly-alpha-olefins (PAOs), Group III basestocks or mineral oils, high purity hydrocarbon fluids derived from a gas-to-liquids process (GTLs) and combinations thereof. In an embodiment, the NFP can comprise oligomers of $C_5$ to $C_{14}$ olefins. In an embodiment, the NFP can comprise a Group III basestock and have a kinematic viscosity at 100° C. of 4 to 50 cSt, a number average molecular weight (Mn) of 400 to 1,000 g/mole, or a combination thereof. In an embodiment, the NFP can comprise a paraffinic composition derived from Fischer-Tropsch hydrocarbons and/or waxes, including wax isomerate lubricant oil basestocks and gas-to-liquids basestocks, having a kinematic viscosity at 100° C. of about 3 cSt to about 500 cSt.

In an embodiment of the method, the blending can comprise blending in a melt stream. In some embodiments, the NFP is added to the polyethylene outside the melt stream, and in other embodiments the NFP is added into the melt stream. The melt blending can comprise compounding in a single screw extruder.

In an embodiment of the method, the blending can comprise introducing a cure system to the blend. The cure system can comprise an organic peroxide introduced into the blend at a temperature below a decomposition point of the peroxide, and the crosslinking can comprise heating the blend to a temperature above the decomposition point of the peroxide. The crosslinking in an embodiment can include a continuous vulcanization process downstream from an extruder. The crosslinking in another embodiment can comprise an Engel process wherein after the peroxide is introduced, the blend is rammed through a head maintained above the decomposition temperature of the peroxide to form a crosslinked extrudate.

In an embodiment of the method, the cure system can comprise a moisture curable silane compound and the blend can be cured by exposing the shaped article to moisture. The moisture exposure can include contacting the shaped article with steam and/or hot water above a temperature of 40° C., or alternately, the moisture can be in the form of water at a temperature of 15° C. or less, e.g., a chilled water bath (10° C. or less) or ice. In another embodiment the moisture or humidity in the air can cure the silane. The silane compound can be introduced as a copolymerized comonomer in a reactor copolymer in the polyethylene resin. The blending can include introducing a masterbatch comprising moisture-curing catalyst into the blend. Alternatively or additionally, the silane compound can be grafted onto the polyethylene resin by reactive extrusion, and the graft resin can be mixed with a masterbatch comprising moisture-curing catalyst. In an embodiment, the method can comprise a one step process wherein the silane compound and a crosslinking catalyst are introduced into the blend in a single extruder. Alternatively or additionally, the method can comprise a two-step process wherein the silane compound and the crosslinking catalyst are serially introduced into the blend in separate extrusions.

In an embodiment of the method, the crosslinking can comprise electron beam irradiation of the shaped article.

In another embodiment, the present invention provides a crosslinked polyethylene article produced by the method described above. The crosslinked polyethylene article can be a tubular. Alternatively or additionally the crosslinked polyethylene article can be selected from pipes, conduits, tubes, wire insulation and jacketing, and cable insulation and jacketing, and so forth. The crosslinked polyethylene article in an embodiment can be an extrudate.

In another embodiment, the present invention provides a composition having utility as a tubular. The composition can comprising at least one layer consisting essentially of PEX blended with from about 0.5 to about 10 percent by weight of the layer of an NFP. The NFP can have a viscosity index greater than 120, kinematic viscosity of from 3 to 300 cSt at 100° C., pour point less than −20° C., specific gravity less than 0.86, flash point greater than 200° C. The NFP can contain less than 0.1 weight percent of functional groups selected from hydroxide, aryls, substituted aryls, halogens, alkoxys, carboxylates, esters, acrylates, oxygen, nitrogen, and carboxyl, based upon the weight of the NFP. The number of carbons of the NFP involved in olefinic bonds can be less than 5% of the total number of carbon atoms in the NFP. In an embodiment, the NFP can be selected from PAOs, Group III basestocks or mineral oils, GTLs and combinations thereof.

In an embodiment, the composition can be in the form of a pipe. The pipe can comprise a plurality of layers, and the PEX can comprise one layer. In an embodiment, the composition can be in the form of tubing. In an embodiment, the composition can comprise insulation or jacketing for wire or cable.

In an embodiment, the composition can comprise a tubular present in a structure selected from hot and cold water plumbing systems, hydronic radiant heating systems, snow melting equipment, ice rink plumbing and wiring, refrigeration warehouse plumbing and wiring, and the like. The tubular can have a flexibility at least 10 percent greater than the corresponding non-flexibilized tubular without the NFP.

In an embodiment of the composition, the NFP can comprise oligomers of $C_5$ to $C_{14}$ olefins. Alternatively or additionally, the NFP can comprise a Group III basestock and have a kinematic viscosity at 100° C. of 4 to 50 cSt, a number average molecular weight (Mn) of 400 to 1,000 g/mole, or a combination thereof. Alternatively or additionally, the NFP can comprise a paraffinic composition derived from Fischer-Tropsch hydrocarbons and/or waxes, including wax isomerate lubricant oil basestocks and gas-to-liquids basestocks, having a kinematic viscosity at 100° C. of about 3 cSt to about 500 cSt.

In an embodiment of the composition, the crosslinked polyethylene can be obtained by crosslinking a blend of the NFP in a polyethylene resin comprising an ethylene based polymer comprising at least 50 mole % ethylene units and having less than 20 mole % propylene units. The polyethylene resin can be selected from low density polyethylene, high density polyethylene, and the like, and combinations thereof. The blend can have a continuous, homogeneous matrix phase of a mixture of the polyethylene resin and the NFP. The blend can comprise at least 95 weight percent of the polyethylene resin by weight of polymer components of the blend.

In an embodiment of the composition, the blend can be crosslinked with an organic peroxide. Alternatively or additionally, the blend can be crosslinked with a silane compound and moisture curing. The blend can comprise an intimate admixture with a masterbatch comprising moisture-curing catalyst. Alternatively or additionally, the polyethylene resin can comprise a reactor copolymer comprising a copolymerized silane compound. Alternatively or additionally, the blend can comprise a silane compound grafted onto the polyethylene resin by reactive extrusion and a masterbatch comprising moisture-curing catalyst in intimate admixture therewith. Alternatively or additionally, the blend can be crosslinked by electron beam irradiation.

DEFINITIONS

Figure 1:
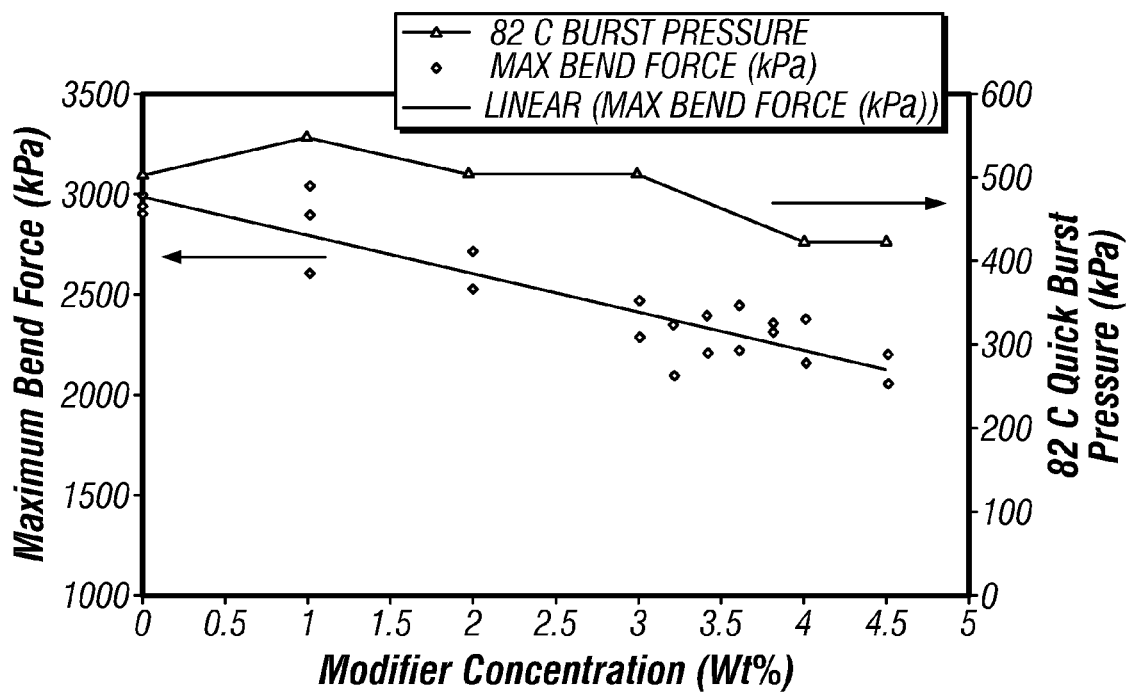
FIG. 1 plots the bend force and burst pressure of a crosslinked polyethylene (PEX) containing from 0.5 to 4.5 wt % modifier according to an embodiment of the invention as described in Examples 2-4 below.

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more chemically distinct monomers types. Thus, as used herein, the terms "polyethylene," "ethylene polymer," and "ethylene based polymer" mean a polymer or copolymer comprising at least 50 mole % ethylene units (preferably at least 70 mole % ethylene units, more preferably at least 80 mole % ethylene units, even more preferably at least 90 mole % ethylene units, even more preferably at least 95 mole % ethylene units or 100 mole % ethylene units); and having less than 20 mole % propylene units (preferably less than 15 mole %, preferably less than 10 mole %, preferably less than mole %, preferably 0 mole % propylene units), which precludes an ethylene copolymer from being an ethylene propylene rubber (EPR) as defined below. Furthermore, the term "polyethylene composition" means a blend containing one or more polyethylene components.

For purposes of this invention an oligomer is defined to have a number-average molecular weight (Mn) of 10,000 g/mole or less.

For purposes of this invention and the claims thereto, an ethylene polymer having a density of 0.86 g/cm$^3$ or less is referred to as an ethylene elastomer or elastomer, an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene (LDPE), including linear low density polyethylene (LLDPE) which refers to ethylene polymers in this density range made using a heterogeneous catalyst, as well as ethylene polymers in this density range made in a high pressure process using a free radical catalyst; and an ethylene polymer having a density of more than 0.940 g/cm$^3$ is referred to as a high density polyethylene (HDPE).

For purposes of this invention and the claims thereto an EP rubber or EPR is defined to be a copolymer of ethylene and propylene, and optionally diene monomer(s), chemically crosslinked (i.e., cured) or not, where the ethylene content is from 35 to 80 weight %, the diene content is 0 to 15 weight %, and the balance is propylene; and where the copolymer has a Mooney viscosity, ML(1+4) @ 125° C. (measured according to ASTM D1646) of 15 to 100. For purposes of this invention and the claims thereto an EPDM or EPDM rubber is defined to be an EPR having diene present.

For the purposes of this invention a liquid is defined to be a fluid that has no distinct melting point above 0° C., preferably no distinct melting point above −20° C.; and has a kinematic viscosity at 100° C. of 3000 cSt or less, preferably 1000 cSt or less and/or a kinematic viscosity at 40° C. of 35,000 cSt or less, preferably 10,000 cSt or less.

For purposes of this invention and the claims thereto Group I, II, and III basestocks are defined to be mineral oils having the following properties:

| Basestock | Saturates (wt %) | Sulfur (wt %) | Viscosity Index |
|---|---|---|---|
| Group I | <90 and/or | ≧0.03 and | ≧80 and <120 |
| Group II | ≧90 and | ≦0.03 and | ≧80 and <120 |
| Group III | ≧90 and | ≦0.03 and | ≧120 |

Wt % saturates, wt % sulfur, and Viscosity Index are measured following ASTM D2007, ASTM D2622, and ASTM D2270, respectively.

For purposes of this invention and the claims thereto Group IV basestocks are defined to be polyalphaolefins (PAO's), which are hydrocarbon liquids manufactured by the catalytic oligomerization or polymerization of linear alpha-olefins having 5 or more carbon atoms, preferably 6 or more carbon atoms, preferably 8 or more carbon atoms. The PAO's may be characterized by any degree of tacticity, including isotacticity or syndiotacticity, and/or may be atactic. In another embodiment the PAO has more than 50% meso dyads as measured by $^{13}$C NMR, preferably more than 60%. In another embodiment the PAO has more than 50% racemic dyads as measured by $^{13}$C NMR, preferably more than 60%, as measured according to or as described in WO2007011459A1.

For purposes of the present invention and the claims thereto, the term mineral oil includes any petroleum-based oil; derived from petroleum crude oil that has been subjected to refining steps (such as distillation, solvent processing, hydroprocessing, and/or dewaxing) to achieve the final oil. This also includes petroleum-based oils that are extensively purified and/or modified through severe processing treatments. For purposes of this invention and the claims thereto synthetic oils are those oils that have been manufactured by combining monomer units using catalysts and/or heat.

For purposes of this invention and the claims thereto when melting point is referred to and there is a range of melting temperatures, the melting point is defined to be the peak melting temperature from a differential scanning calorimetry (DSC) trace, and when there is more than one melting peak, it refers to the peak melting temperature for the largest peak among principal and secondary melting peaks, as opposed to the peak occurring at the highest temperature, thereby reflecting the largest contribution to the calorimetric response of the material.

For purposes of this invention and claims thereto, relative flexibility is determined by taking the ratio of the inverse of the bend test values as described herein. For example, a crosslinked polyethylene (PEX) pipe specimen containing an NFP with a bend test value of 0.454 MPa is 10 percent more flexible than the same PEX pipe specimen without NFP having a bend test value of 0.5 MPa.

DETAILED DESCRIPTION OF THE INVENTION

Accordingly, the present invention is directed in one embodiment to crosslinked polyethylene (PEX), wherein the base polymer is intermixed with a polymer modifier which affects the amorphous region of the polymer, leaving the crystalline portion of the base polymer unaffected or substantially unaffected. Consequently, the density of the amorphous region is lowered, resulting in a more flexible final product, while the crosslinked molecular structure and/or crystalline portion of the polymer, which controls the strength of the base polymer, and the final product remains strong. In one non-limiting embodiment, the modifier comprises a non-functionalized plasticizer (NFP) as defined herein.

One embodiment of a method for producing the plastic material can comprise mixing the NFP with the base polymer, preferably outside of the melt stream in a single screw extruder. Additional embodiments of the methods include introduction of the NFP into the melt stream and, optionally, utilizing multiple screw extruders or injection molding plasticizing units. Introduction of the NFP using a pre-compounded carrier such as porous pellets can also be employed according to an embodiment. The NFP/base resin mixtures are then formed into the shape of the desired article and crosslinked.

The present application has particular utility in the production of PEX tubulars, e.g. tubing, conduits, piping, and wire and cable applications such as insulation or jacketing and the like. This tubing can be used in a variety of environments, such as fire protection, plumbing, heating, gas distribution, and the like. The tubing also is particularly useful in the production of barrier pipes for domestic heating systems. However, the invention is not limited to use with tubulars, but can be practiced with any polymeric article.

The NFP modifier can be used in low levels without changing the final crosslink gel levels of the polymer. This results in benefits unmatched in any other polymer additive or plastomer. As discussed above, the previously used polymer enhancers changed the base characteristics of the polymer and reduced the overall pipe performance. Often, to obtain the desired flexibility, loading levels of other additives had to exceed 20-25%. This resulted in a pipe that would not pass the hydrostatic requirements of ASTM F876. As used herein, the term consisting essentially of is intended to refer to embodiments excluding components other than the ethylene polymer and NFP modifier to an extent that a pipe made from the material would not pass the PEX specifications, especially the hydrostatic requirements of ASTM F876.

In an embodiment, the polyethylene/modifier composition is made into an article that can have improved dimensional stability. For pipes and tubes, the improved dimensional stability can provide a more consistent wall thickness, which can have a surprisingly profound affect on burst strength and crack resistance. Although the invention is not limited by theory, it is believed the dimensional stability of the polyethylene/modifier composition is due to faster relaxation of the polyethylene in the presence of the modifier and improved mobility in the polymer matrix that can lead to a more random orientation of the chains. This lack of orientation provides better overall strength and improved isotropy, rather than, for example, high strength in the machine direction and low strength in the transverse direction that would otherwise be obtained with highly oriented polymers. According to an embodiment of the invention, a tube or pipe made of the polyethylene/modifier composition has less internal stress and/or less polymer orientation, compared to other polyethylene compositions with slower relaxation times that result in more variation in the wall thickness.

This invention relates in an embodiment to crosslinked polyethylene compositions comprising one or more ethylene polymers crosslinked in a blend with or otherwise in the presence of one or more modifiers, preferably liquid modifier(s).

Typically, the ethylene polymer(s) are present in the compositions of the present invention at 50 weight % (wt %) or more, preferably from 50 to 99.9 wt % in another embodiment, and from 60 to 99.5 wt % in yet another embodiment, and from 70 to 99 wt % in yet another embodiment, and from 80 to 99 wt % in yet another embodiment, and from 90 to 99 wt % in yet another embodiment, and from 95 to 99 wt % in yet another embodiment, wherein a desirable range may be any combination of any upper wt % limit with any lower wt % limit described herein and the wt % is based on the weight of the composition.

In another embodiment the ethylene polymer(s) is present at 80 to 99.99 wt %, alternately 90 to 99.5 wt %, alternately 95 to 99 wt %, and the modifier is present at 20 to 0.01 wt %, alternately 10 to 0.5 wt %, alternately 5 to 1 wt %, based upon the weight of the ethylene polymer(s) and the modifier(s).

In another embodiment, the ethylene polymers are present in the compositions in an amount of at least 50 wt %, alternately at least 60 wt %, alternately at least 70 wt %, alternately at least 80 wt %, alternately at least 90 wt %, alternately at least 95 wt %, alternately at least 97 wt %, alternately at least 98 wt %, alternately at least 99 wt %, alternately at least 99.5 wt %, alternately at least 99.9 wt %, by weight of the total polymer components in the composition (exclusive of the modifier, fillers and other non-polymeric additives or components).

In another embodiment the modifier(s) are present in the compositions of the present invention at 0.1 wt % or more, preferably at 1 wt % or more, and from less than 20 to 0.1 wt % in another embodiment, and from 10 to 0.5 wt % in another embodiment, and from 5 to 1 wt % in yet another embodiment, wherein a desirable range may be any combination of any upper wt % limit with any lower wt % limit described herein and the wt % is based on the weight of the composition.

Preferred compositions of the present invention can be characterized in that the weight of the modified composition decreases less than 3%, preferably less than 2%, preferably less than 1%, preferably less than 0.5%, preferably less than 0.1%, preferably less than 0.05%, preferably less than 0.01%, when plasticizer permanence is determined by ASTM D1203 (0.25 mm thick sheet, 300 hours in dry 70° C. oven). Weight loss here refers to the reduction in weight in excess of that measured for the unmodified crosslinked polyethylene under the same test conditions.

In one or more embodiments, the composition contains less than 10 wt %, propylene polymer, preferably less than 7 wt %, preferably less than 5 wt %, preferably less than 4 wt %, preferably less than 3 wt %, preferably less than 2 wt %, preferably less than 1 wt %, based upon the weight of the composition. A propylene polymer is a polymer having at least 50 mole % propylene. In another embodiment, the composition is essentially free of propylene polymer, alternately the composition comprises 0% propylene polymer.

Alternately, in one or more embodiments, the compositions comprises less than 10 wt % (preferably less than 5 wt %, preferably less than 4 wt %, preferably less than 3 wt %, preferably less than 2 wt %, preferably less than 1 wt %) of a propylene polymer having a melting point of 40° C. or more. In another embodiment, the composition is essentially free of propylene polymer having a melting point of 40° C. or more, alternately the composition comprises 0% propylene polymer having a melting point of 40° C. or more.

In another embodiment, the crosslinked polyethylene/modifier compositions of this invention comprise less than 10 wt % (preferably less than 5 wt %, preferably less than 4 wt %, preferably less than 3 wt %, preferably less than 2 wt %, preferably less than 1 wt %) of EP rubber, based upon the total weight of the composition. In another embodiment, the composition is essentially free of EP rubber, alternately the composition comprises 0% EP rubber.

In an alternate embodiment, the compositions comprise less than 10 wt % (preferably less than 5 wt %, preferably less than 4 wt %, preferably less than 3 wt %, preferably less than 2 wt %, preferably less than 1 wt %) of a butene polymer (a butene polymer is a polymer having at least 50 mole % butene monomer), based upon the total weight of the composition. In another embodiment, the composition is essentially free of butene polymer, alternately the composition comprises 0% butene polymer.

In another embodiment, the ethylene polymer(s) comprises 0% diene. In another embodiment the total diene content of all ethylene polymers present in the composition is 0%. In another embodiment the ethylene polymer(s) comprise less than 30 weight % diene, preferably less than 20 wt %, preferably less than 10 wt %, preferably less than 5 weight % diene, preferably less than 2.5 weight %, preferably less than 1 weight % (based upon the weight of the ethylene polymer) and preferably has a density greater than 0.86 g/cm³, preferably greater than 0.87 g/cm³.

In another embodiment the crosslinked polyethylene/modifier compositions comprise less than 50 weight % of ethylene elastomer(s), preferably less than 40 wt %, preferably less than 30 wt %, preferably less than 20 wt %, preferably less than 10 wt %, more preferably less than 5 wt %, more preferably less than 1 wt %, based upon the weight of the composition. In another embodiment, the composition is essentially free of ethylene elastomer, alternately the composition comprises 0% ethylene elastomer.

In another embodiment the modifier is used to replace some or all of the elastomer and/or plastomer in a crosslinked polyethylene/elastomer composition comprising up to 25 wt % total elastomer, plastomer or combination thereof, by weight of the composition. In one embodiment, the crosslinked polyethylene/modifier compositions of this invention comprise elastomer and/or plastomer in an amount of from at least 0.1 total weight % up to less than 25 total weight %, preferably less than 20 total weight %, preferably less than 10 total weight %, preferably less than 5 total weight %, and preferably less than 1 total weight %, of elastomer and/or plastomer, based upon the weight of the composition. In another embodiment, the composition is essentially free of elastomer and plastomer, or alternately the composition comprises 0% elastomer and plastomer. In one embodiment the polyethylene/modifier composition comprises at least one polyethylene base polymer optionally selected from HDPE, LDPE, LLDPE, VLDPE or a mixture thereof, an NFP modifier; and at least one ethylene elastomer or plastomer optionally selected from the group consisting of EPR, EPDM, EP, EB, EH EO, or a combination thereof. In one embodiment, a tubular (pipe or tube) made of a crosslinked polyethylene-modifier-elastomer and/or -plastomer composition passes the hydrostatic requirements of ASTM F876.

In another embodiment, the crosslinked polyethylene/modifier compositions may further comprise a copolymer or co-oligomer of ethylene and one or more alpha-olefin(s), such as those disclosed in U.S. Pat. No. 6,639,020.

In another embodiment, the crosslinked polyethylene/modifier compositions of this invention comprise less than 20 weight %, preferably less than 10 weight %, preferably less than 1 weight %, of a liquid homopolymer or copolymer of isoprene or butadiene having a kinematic viscosity at 40° C. of 10,000 cSt or less, based upon the weight of the composition. In another embodiment, the composition is essentially free of liquid homopolymer or copolymer of isoprene and or butadiene having a kinematic viscosity at 40° C. of 10,000 cSt or less, alternately the composition comprises 0% liquid homopolymer or copolymer of isoprene and or butadiene having a kinematic viscosity at 40° C. of 10,000 cSt or less. In another embodiment, the crosslinked polyethylene/modifier compositions of this invention comprise less than 20 weight %, preferably less than 10 weight %, preferably less than 1 weight %, of a liquid homopolymer or copolymer of isoprene and or butadiene having a kinematic viscosity at 40° C. between 2,000 cSt and 20 cSt. In another embodiment, the composition is essentially free of liquid homopolymer or copolymer of isoprene and or butadiene having a kinematic viscosity at 40° C. between 2,000 cSt and 20 cSt, alternately the composition comprises 0% liquid homopolymer or copolymer of isoprene and or butadiene having a kinematic viscosity at 40° C. between 2,000 cSt and 20 cSt.

The modifiers described herein are blended with at least one ethylene polymer to prepare the crosslinked polyethylene compositions of this invention. In one aspect of the invention, the ethylene polymer base resin is selected from ethylene homopolymer, ethylene copolymers, and blends thereof. Useful copolymers comprise one or more comonomers in addition to ethylene and can be a random copolymer, a statistical copolymer, a block copolymer, and/or blends thereof. In particular, the ethylene polymer blends described as the base resin herein may be physical blends or in situ blends of more than one type of ethylene polymer or blends of ethylene polymers with polymers other than ethylene polymers where the ethylene polymer component is the majority component (e.g. greater than 50 wt %). The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment the ethylene polymers are made by the catalysts, activators and processes described in U.S. Pat. Nos. 6,342,566, 6,384,142, WO 03/040201, WO 97/19991 and U.S. Pat. No. 5,741,563. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al.; and I, II METALLOCENE-BASED POLYOLEFINS (Wiley & Sons 2000).

Preferred ethylene polymers and copolymers that are useful as the base resin in this invention include those sold by ExxonMobil Chemical Company in Houston Tex., including those commercially available under the trade designations ExxonMobil HDPE, ExxonMobil LLDPE, and ExxonMobil LDPE; and those sold under the trade designations EXACT™, EXCEED™, ESCORENE™, ESCOR™, PAXON™, and OPTEMA™.

Preferred ethylene homopolymers and copolymers useful as the base resin in this invention typically have: (1) a weight-average molecular weight (Mw) of 20,000 to 2,000,000 g/mole, preferably 30,000 to 1,000,000, more preferably 40,000 to 200,000, as measured by size exclusion chromatography; and/or (2) a molecular weight distribution (Mw/Mn or MWD or PDI) of 1 to 40, preferably 1.6 to 20, more preferably 1.8 to 10, more preferably 1.8 to 4, preferably 8 to 25 as measured by size exclusion chromatography; and/or (3) a melting temperature (Tm) (first melt peak) of 30° to 150° C., preferably 30° to 140° C., preferably 50° to 140° C., more preferably 60° to 135° C., as determined by the DSC method; and/or (4) a crystallinity of 5 to 80%, preferably 10 to 70, more preferably 20 to 60% as measured by the DSC method; and/or (5) a heat of fusion of 300 J/g or less, preferably 10 to 260 J/g, more preferably 20 to 200 J/g as measured by the DSC method; and/or (6) a crystallization temperature (Tc) of 150 to 130° C., preferably 20° to 120° C., more preferably 25° to 110° C., preferably 60° to 125° C.; and/or (7) a heat deflection temperature of 30° to 120° C., preferably 40° to 100° C., more preferably 50° to 80° C.; and/or (8) a Shore hardness (D scale) of 10 or more, preferably 20 or more, preferably 30 or more, preferably 40 or more, preferably 100 or less, preferably from 25 to 75 (as measured by ASTM D 2240); and/or (9) a percent crystallinity of at least 30%, preferably at least 40%, alternatively at least 50%, as determined by the DSC method; and/or (10) a percent amorphous content of at least 50%, alternatively at least 60%, alternatively at least 70%, even alternatively between 50% and 95%, or 70% or less, preferably 60% or less, preferably 50% or less as determined by subtracting the percent crystallinity from 100, and/or (11) a branching index (g') of 0.2 to 2.0, preferably 0.5 to 1.5, preferably 0.7 to 1.1; and/or (12) a density of 0.85 to 0.97 g/cm$^3$, preferably 0.86 to 0.965 g/cm$^3$, preferably 0.88 to 0.96 g/cm$^3$, alternatively between 0.860 and 0.910 g/cm$^3$, alternatively between 0.910 and 0.940 g/cm$^3$ or alternatively between 0.94 to 0.965 g/cm$^3$.

The polyethylene base resin may be an ethylene homopolymer, such as HDPE. In another embodiment the ethylene homopolymer has an MWD of up to 40, preferably ranging from 1.5 to 20, and from 1.8 to 10 in another embodiment, and from 1.9 to 5 in yet another embodiment, and from 2.0 to 4 in yet another embodiment. In another embodiment, the 1% secant flexural modulus falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers used as the base resin range from 0.05 to 800 dg/min in one embodiment, and from 0.1 to 100 dg/min in another embodiment, as measured according to ASTM D1238 (190° C., 2.16 kg). Preferably the MI of the base resin is at least 1 dg/min.

In another embodiment of the invention, the ethylene polymer base resin is an ethylene copolymer, either random, or block, of ethylene and one or more comonomers selected from $C_3$ to $C_{20}$ α-olefins, typically from $C_3$ to $C_{10}$ α-olefins in another embodiment. Preferably the comonomers are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_3$ to $C_{20}$ α-olefins derived units in any combination of any upper wt % limit with any lower wt % limit described herein. Preferably the ethylene copolymer will have an Mw of from greater than 8,000 g/mole in one embodiment, and greater than 10,000 g/mole in another embodiment, and greater than 12,000 g/mole in yet another embodiment, and greater than 20,000 g/mole in yet another embodiment, and less than 1,000,000 g/mole in yet another embodiment, and less than 800,000 g/mole in yet another embodiment, wherein a desirable copolymer may comprise any upper molecular weight limit with any lower molecular weight limit described herein.

In another embodiment the ethylene copolymer of the base resin comprises ethylene and one or more other monomers selected from the group consisting of ethylene and $C_3$ to $C_{20}$ linear, branched or cyclic monomers, and in some embodiments is a $C_3$ to $C_{12}$ linear or branched α-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 weight %, preferably from 0 to 40 weight %, more preferably from 0.5 to 30 weight %, more preferably from 2 to 30 weight %, more preferably from 5 to 20 weight %.

Preferred linear α-olefins useful as comonomers for the ethylene copolymers useful as the base polyethylene resins in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Comonomers containing non-aromatic cyclic groups are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mole). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the ethylene polymer of the base resin at up to 10 weight %, preferably at 0.00001 to 2 weight %, preferably 0.002 to 1 weight %, even more preferably 0.003 to 0.5 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment of the present invention, the base resin comprises ethylene polymers have an Mw within the range having an upper limit of 5,000,000 g/mole, 1,000,000 g/mole, or 500,000 g/mole, and a lower limit of 10,000 g/mole, 20,000 g/mole, or 80,000 g/mole.

Preferred ethylene polymers for the base resins of the present invention have an MWD ranging from 1.5 to 20, and from 1.6 to 15 in another embodiment, and from 1.7 to 10 in yet another embodiment, and from 1.8 to 5 in yet another embodiment, and from a lower limit of 1.5, 1.8, or 2.0 to an upper limit of 40, 20, 10, 5, or 4.5 in yet another embodiment.

The MI of preferred ethylene polymers in the base resins, as measured according to ASTM D1238 (190° C., 2.16 kg), ranges from 0.02 dg/min to 800 dg/min in one embodiment, from 0.05 to 500 dg/min in another embodiment, and from 0.1 to 100 dg/min in another embodiment. In another embodiment of the present invention, the polyethylene has a MI of 20 dg/min or less, 7 dg/min or less, 5 dg/min or less, or 2 dg/min or less, or less than 2 dg/min. In yet another embodiment, the polymer has a Mooney viscosity, ML(1+4) (125° C. (measured according to ASTM D1646), of 100 or less, 75 or less, 60 or less, or 30 or less.

In yet another embodiment, the 1% secant flexural modulus of preferred ethylene polymers in the base resin (prior to crosslinking) ranges from 5 to 1000 MPa, and from 10 to 800 MPa in another embodiment, and from 5 to 200 MPa in yet another embodiment, wherein a desirable polymer may exhibit any combination of any upper flexural modulus limit with any lower flexural modulus limit.

The crystallinity of preferred ethylene polymers useful in the base resins herein may be expressed in terms of heat of fusion. Embodiments of the present invention include polymers having a heat of fusion, as determined by DSC, ranging from a lower limit of 0.1 J/g, or preferably 1.0 J/g, to an upper limit of 260 J/g, or preferably 240 J/g.

The crystallinity of the base resin polymer may also be expressed in terms of percent crystallinity. The percent crystallinity is determined according to the following formula: X %=((Hf-Pe J/g)/(290 J/g))×100, where by X % is percent crystallinity, Hf-PE is the heat of fusion of the ethylene polymer in questions as obtained by the DSC method described herein. Preferably, the polymer has a crystallinity of from 25 to 90%, preferably 40 to 85%, more preferably 50 to 80%.

The level of crystallinity may be reflected in the melting point. In one embodiment of the present invention, the ethylene polymer in the base resin has a single melting point. Typically, a sample of ethylene copolymer will show secondary melting peaks adjacent to the principal peak, which are considered together as a single melting point. The highest of these peaks is considered the melting point. The polymer preferably has a melting point by DSC ranging from an upper limit of 150° C., 130° C., 100° C., 80° C., or 60° C., to a lower limit of 0° C., 20° C., 25° C., 30° C., 35° C., 40° C., or 45° C.

The polyolefin compositions in one embodiment of the present invention include at least one non-functionalized plasticizer (NFP) used to modify the polyethylene base resin and resulting crosslinked polyethylene. As used herein, an NFP is a hydrocarbon liquid, which does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent," it is meant that these groups and compounds comprising these groups are not deliberately added to the NFP, and if present at all, are present in embodiments at less than 5 percent by weight of the NFP, or less than 4, 3, 2, 1, 0.7, 0.5, 0.3, 0.1, 0.05, 0.01, or 0.001 wt %, based upon the weight of the NFP.

In one embodiment, aromatic moieties (including any compound whose molecules have the ring structure characteristic of benzene, naphthalene, phenanthrene, anthracene, etc.) are substantially absent from the NFP. In another embodiment, naphthenic moieties (including any compound whose molecules have a saturated ring structure such as would be produced by hydrogenating benzene, naphthalene, phenanthrene, anthracene, etc.) are substantially absent from the NFP. By "substantially absent," it is meant that these compounds are not added deliberately to the compositions and if present at all, are present at less than 0.5 wt %, preferably less than 0.1 wt % by weight of the NFP.

In another embodiment, the NFP does not contain olefinic unsaturation to an appreciable extent. By "appreciable extent of olefinic unsaturation" it is meant that the carbons involved in olefinic bonds account for less than 10% of the total number of carbons in the NFP, preferably less than 8%, 6%, 4%, 2%, 1%, 0.7%, 0.5%, 0.3%, 0.1%, 0.05%, 0.01%, or 0.001%. In some embodiments, the percent of carbons of the NFP involved in olefinic bonds is between 0.001 and 10% of the total number of carbon atoms in the NFP, preferably between 0.01 and 5%, preferably between 0.1 and 2%, more preferably between 0.1 and 1%.

Particularly preferred NFPs include poly-alpha-olefins (PAO's), Group III basestocks, and high purity hydrocarbon fluids derived from a so-called gas-to-liquids process (GTL), having a viscosity index greater than 100, pour point less than −20° C., specific gravity less than 0.86, and flash point greater than 200° C. In various embodiments, the NFP comprises or preferably consists essentially of paraffins having from 6 to 200 carbon atoms, 8 to 100 carbon atoms, 20 to 1500 carbon atoms, 25 to 500 carbon atoms, 30 to 500 carbon atoms, 40 to 500 carbon atoms, 40 to 250 carbon atoms, 30 to 150 carbon atoms, or 20 to 100 carbon atoms. In a preferred embodiment, the NFP comprises oligomers of $C_5$ to $C_{24}$ olefins.

In another embodiment of the present invention, the NFP comprises a PAO liquid with a pour point (as measured by ASTM D 97) of −10° C. or less and a kinematic viscosity at 100° C. (measured by ASTM D 445) of 3 cSt or more. PAO liquids are described in, for example, U.S. Pat. No. 3,149,178; U.S. Pat. No. 4,827,064; U.S. Pat. No. 4,827,073; U.S. Pat. No. 5,171,908; and U.S. Pat. No. 5,783,531 and in SYNTHETIC LUBRICANTS AND HIGH-PERFORMANCE FUNCTIONAL FLUIDS (Leslie R. Rudnick & Ronald L. Shubkin, ed. Marcel Dekker, Inc. 1999), p. 3-52.

PAO liquids may be conveniently prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one embodiment, the PAO comprises $C_{20}$ to $C_{1500}$ (preferably $C_{30}$ to $C_{800}$, more preferably $C_{35}$ to $C_{400}$, most preferably $C_{40}$ to $C_{250}$) oligomers of α-olefins. These oligomers are dimers, trimers, tetramers, pentamers, etc. of $C_3$ to $C_{24}$ (preferably $C_5$ to $C_{18}$, more preferably $C_6$ to $C_{14}$, even more preferably $C_8$ to $C_{12}$, most preferably $C_{10}$) branched or linear α-olefins, provided that $C_3$ and $C_4$ α-olefins are present at 10 wt % or less. In another embodiment, the PAO comprises $C_3$ to $C_{24}$ (preferably $C_5$ to $C_{18}$, more preferably $C_6$ to $C_{14}$, most preferably $C_8$ to $C_{12}$) linear α-olefins (LAOs), provided that $C_3$ and $C_4$ LAOs are present at 10 wt % or less. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred.

In one embodiment, a single LAO is used to prepare the oligomers. In this case, a preferred embodiment involves the oligomerization of 1-decene, and the PAO is a mixture of oligomers, including, for example, dimers, trimers, tetramers, pentamers, and higher, of 1-decene. In another embodiment, the PAO comprises oligomers of two or more $C_3$ to $C_{18}$ LAOs, to make bipolymer or terpolymer or higher-order copolymer combinations, provided that $C_3$ and $C_4$ LAOs are present at 10 wt % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene terpolymer.

In another embodiment, the PAO comprises oligomers of a single alpha-olefin species having a carbon number of 5 to 24 (preferably 6 to 18, more preferably 8 to 12, most preferably 10). In another embodiment, the NFP comprises oligomers of mixed alpha-olefins (i.e., involving two or more alpha-olefin species), each alpha-olefin having a carbon number of 3 to 24 (preferably 5 to 24, more preferably 6 to 18, most preferably 8 to 12), provided that alpha-olefins having a carbon number of 3 or 4 are present at 10 wt % or less. In a particularly preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In another embodiment, the PAO comprises oligomers of one or more α-olefin with repeat unit formulas of —[CHR—CH$_2$]— where R is a $C_3$ to $C_{18}$ saturated hydrocarbon branch. In a preferred embodiment, R is constant for all oligomers. In another embodiment, there is a range of R substituents covering carbon numbers from 3 to 18. Preferably, R is linear, i.e., R is $(CH_2)_n CH_3$, where n is 3 to 17, preferably 4 to 11, and preferably 5 to 9. Optionally, R may contain one methyl or ethyl branch, i.e., R is $(CH_2)_m[CH(CH_3)](CH_2)_z CH_3$ or R is $(CH_2)_x[CH(CH_2CH_3)](CH_2)_y CH_3$, where (m+z) is 1 to 15, preferably 1 to 9, preferably 3 to 7, and (x+y) is 1 to 14, preferably 1 to 8, preferably 2 to 6. Preferably m>z; more preferably m is 0 to 15, more preferably 2 to 15, more preferably 3 to 12, more preferably 4 to 9; and n is 0 to 10, preferably 1 to 8, preferably 1 to 6, preferably 1 to 4. Preferably x>y; more preferably x is 0 to 14, more preferably 1 to 14, more preferably 2 to 11, more preferably 3 to 8; and y is 0 to 10, preferably 1 to 8, preferably 1 to 6, preferably 1 to 4. Preferably, the repeat units are arranged in a head-to-tail fashion with minimal heat-to-head connections.

The PAO may be atactic, isotactic, or syndiotactic. In one embodiment, the PAO has essentially the same population of meso and racemic dyads, on average, making it atactic. In another embodiment, the PAO has more than 50% (preferably more than 60%, preferably more than 70%, preferably more than 80%, preferably more than 90%) meso dyads (i.e., [m]) as measured by $^{13}$C-NMR. In another embodiment, the PAO has more than 50% (preferably more than 60%, preferably more than 70%, preferably more than 80%, preferably more than 90%) racemic dyads (i.e., [r]) as measured by $^{13}$C-NMR. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

The PAO liquid may be comprised of one or more distinct PAO components. In one embodiment, the NFP is a blend of one or more PAOs with different compositions (e.g., different α-olefin(s) were used to make the oligomers) and/or different physical properties (e.g., kinematic viscosity, pour point, viscosity index, and/or glass transition temperature).

In another preferred embodiment, the PAO or blend of PAOs has a Viscosity Index of 120 or more (preferably 130 or more, preferably 140 or more, preferably 150 or more, preferably 170 or more, preferably 190 or more, preferably 200 or more, preferably 250 or more, preferably 300 or more). In another embodiment, the PAO or blend of PAOs has a viscosity Index of 120 to 350 (preferably 130 to 250).

In yet another preferred embodiment, the PAO or blend of PAOs has a pour point of −10° C. or less (preferably −20° C. or less, preferably −25° C. or less, preferably −30° C. or less, preferably −35° C. or less, preferably −40° C. or less, preferably −50° C. or less). In another embodiment, the PAO or blend of PAOs has a pour point of −15° to −70° C. (preferably −25° to −60° C.).

In yet another preferred embodiment, the PAO or blend of PAOs has a glass transition temperature (Tg) of −40° C. or less (preferably −50° C. or less, preferably −60° C. or less, preferably −70° C. or less, preferably −80° C. or less). In another embodiment, the PAO or blend of PAOs has a $T_g$ of −50° to −120° C. (preferably −60° to −100° C., preferably −70° to −90° C.).

In yet another preferred embodiment, the PAO or blend of PAOs has a flash point of 200° C. or more (preferably 210° C. or more, preferably 220° C. or more, preferably 225° C. or more), preferably between 240° C. and 290° C.

In yet another preferred embodiment, the PAO or blend of PAOs has a specific gravity (15.6/15.6° C.) of 0.86 or less (preferably 0.855 or less, preferably 0.85 or less, preferably 0.84 or less).

In yet another preferred embodiment, the PAO or blend of PAOs has a Noack volatility of less than N* where N*=60e$^{-0.4(KV100° C.)}$ with N* in units of % and KV100° C. of the fluid in question in units of cSt.

In another embodiment, the PAO or blend of PAOs has a solubility parameter at 25° C. of 8 or more (preferably 8 to 10) cal$^{1/2}$ cm$^{3/2}$.

Preferred blends of PAOs include blends of two or more PAOs where the ratio of the highest KV100° C. to the lowest KV100° C. is at least 1.5 (preferably at least 2, preferably at least 3, preferably at least 5). Also preferred are blends of two or more PAOs wherein at least one PAO has a Noack volatility of less than N* as defined above; preferably all the PAOs in a blend have a Noack volatility of less than N*. In an additional embodiment, KV100° C. of the PAOs are less than 300 cSt, preferably less than 150 cSt, preferably less than 100 cSt, preferably less than 40 cSt, preferably less than 25 cSt, preferably less than 10 cSt, preferably less than 8 cSt.

Preferred blends of PAO also include: blends of two or more PAOs where at least one PAO has a KV100° C. of 40 cSt or more and at least one PAO has a KV100° C. of less than 40 cSt (preferably 25 cSt or less, preferably 10 cSt or less, preferably 8 cSt or less); blends of two or more PAOs where at least one PAO has a KV100° C. of 10 cSt or more and at least one PAO has a KV100° C. of less than 10 cSt (preferably 8 cSt or less, preferably 6 cSt or less, preferably 4 cSt or less); blends of two or more PAOs where at least one PAO has a KV100° C. of 8 cSt or more and at least one PAO has a KV100° C. of less than 8 cSt (preferably 6 cSt or less, preferably 4 cSt or less); and blends of two or more PAOs where at least one PAO has a KV100° C. of 6 cSt or more and at least one PAO has a KV110° C. of less than 6 cSt (preferably 4 cSt or less).

Particularly preferred PAOs and blends of PAOs are those having A) a flash point of 200° C. or more (preferably 210° C. or more, preferably 220° C. or more, preferably 225° C. or more); and B) a pour point less than −20° C. (preferably less than −25° C., preferably less than −30° C., preferably less than −35°, preferably less than −40° C.) and/or a kinematic viscosity at 100° C. of 4 cSt or more (preferably 6 cSt or more, preferably 8 cSt or more, preferably 10 cSt or more).

Desirable PAOs are commercially available as Spectra-Syn™ and SpectraSyn Ultra™ from ExxonMobil Chemical in Houston, Tex. (previously sold under the SHF and Super-Syn™ tradenames by ExxonMobil Chemical Company), some of which are summarized in Table A. Other useful PAOs include those sold under the tradenames Synfluid™ available from ChevronPhillips Chemical Company (Pasedena, Tex.), Durasyn™ available from Innovene (Chicago, Ill.), Nexbase™ available from Neste Oil (Keilaniemi, Finland), and Synton™ available from Chemtura Corporation (Middlebury, Conn.). For PAOs, the percentage of carbons in chain-type paraffinic structures ($C_P$) is close to 100% (typically greater than 98% or even 99%).

TABLE A

SpectraSyn ™ Series Polyalphaolefins

| | KV @ 100° C., cSt | KV @ 40° C., cSt | VI | Pour Point, ° C. | Specific gravity | Flash Point, ° C. | APHA Color |
|---|---|---|---|---|---|---|---|
| SpectraSyn 4 | 4 | 19 | 126 | −66 | 0.820 | 220 | 10 |
| SpectraSyn Plus 4 | 4 | 17 | 122 | −60 | 0.820 | 228 | 10 |
| SpectraSyn 6 | 6 | 31 | 138 | −57 | 0.827 | 246 | 10 |
| SpectraSyn Plus 6 | 6 | 30 | 140 | −54 | 0.827 | 246 | 10 |
| SpectraSyn 8 | 8 | 48 | 139 | −48 | 0.833 | 260 | 10 |
| SpectraSyn 10 | 10 | 66 | 137 | −48 | 0.835 | 266 | 10 |
| SpectraSyn 40 | 39 | 396 | 147 | −36 | 0.850 | 281 | 10 |
| SpectraSyn 100 | 100 | 1240 | 170 | −30 | 0.853 | 283 | 60 |
| SpectraSyn Ultra 150 | 150 | 1,500 | 218 | −33 | 0.850 | >265 | 10 |
| SpectraSyn Ultra 300 | 300 | 3,100 | 241 | −27 | 0.852 | >265 | 20 |
| SpectraSyn Ultra 1000 | 1,000 | 10,000 | 307 | −18 | 0.855 | >265 | 30 |

In a preferred embodiment, the NFP comprises a GTL base stock or oil. GTL base stocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is syngas (synthesis gas, essentially CO and $H_2$) derived from a suitable source, such as natural gas, naphtha and/or coal. GTL base stocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL base stocks and oils may further comprise other hydroisomerized base stocks and base oils. Particularly preferred GTL base stocks or oils are those comprising mostly hydroisomerized F-T waxes and/or other liquid hydrocarbons obtained by a F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant base stock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350, often used in conjuction with a Group VIII metal such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluid-ized-bed, or slurry type process at high temperatures and pressures in the presence of hydrogen.

Useful catalysts, processes, and compositions for GTL base stocks and oils, Fischer-Tropsch hydrocarbon derived base stocks and oils, and wax isomerate hydroisomerized base stocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents EP 324528, EP 532116, EP 532118, EP 537815, EP 583836, EP 666894, EP 668342, EP 776959; WIPO patent applications WO 97/31693, WO 99/20720, WO 99/45085, WO 02/64710, WO 02/64711, WO 02/70627, WO 02/70629, WO 03/33320; and British Patents 1,350,257; 1,390,359; 1,429,494; and 1,440,230. Particularly favorable processes are described in European Patent Applications EP 464546 and EP 464547. Processes using Fischer-Tropsch wax feeds are described in U.S. Pat. Nos. 4,594,172; 4,943,672; 6,046,940; 6,103,099; 6,332,974; 6,375,830; and 6,475,960.

This invention also relates to flexibilized crosslinked polyethylene compositions comprising one or more polyethylene base resins crosslinked in the presence of one or more non-functionalized plasticizers, where one or more NFP's is a high purity hydrocarbon fluid derived from a GTL process comprising a mixture of paraffins of carbon number ranging from about $C_{20}$ to $C_{100}$, a molar ratio of isoparaffins:n-paraffins greater than about 50:1, the percentage of carbons in paraffinic structures ($C_P$) of 98% or more, a pour point ranging from about −20° to −60° C., and a kinematic viscosity at 100° C. ranging from about 6 to 20 cSt.

As used herein, the following terms have the indicated meanings: "naphthenic" describes cyclic (mono-ring and/or multi-ring) saturated hydrocarbons (i.e., cycloparaffins) and branched cyclic saturated hydrocarbons; "aromatic" describes cyclic (mono-ring and/or multi-ring) unsaturated hydrocarbons and branched cyclic unsaturated hydrocarbons; "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

In another embodiment, the NFP comprises a Group III hydrocarbon oil (also called a Group III lubricant base stock or Group III mineral oil). Preferably the NFP has a saturates levels of 90% or more (preferably 92% or more, preferably 94% or more, preferably 95% or more, preferably 98% or more); and a sulfur content less than 0.03% (preferably between 0.001 and 0.01%); and a VI of 120 or more (preferably 130 or more). Preferably the Group III hydrocarbon oil has a kinematic viscosity at 100° C. of 3 to 50, preferably 4 to 40 cSt, preferably 6 to 30 cSt, preferably 8 to 20; and/or a number average molecular weight of 300 to 5,000 g/mol, preferably 400 to 2,000 g/mol, more preferably 500 to 1,000 g/mol. Preferably the Group III hydrocarbon oil has a pour point of −10° C. or less, a flash point of 200° C. or more, and a specific gravity (15.6° C./15.6° C.) of 0.86 or less.

Desirable Group III basestocks are commercially available from a number of sources and include those described in Table B. The percentage of carbons in chain-type paraffinic structures ($C_P$) in such liquids is greater than 80%.

TABLE B

Commercially available Group III Basestocks

| | KV @ 100° C., cSt | VI | Pour Point, ° C. | Specific gravity | Flash Point, ° C. |
|---|---|---|---|---|---|
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 | |
| VHVI 8[5] | 8.0 | 127 | −12 | 0.850 | 248 |
| Visom 4[6] | 4.0 | | | | 210 |
| Visom 6[6] | 6.6 | 148 | −18 | 0.836 | 250 |

[1]Available from ChevronTexaco (USA).
[2]Available from Neste Oil (Finland).
[3]Available from SK Corp (South Korea).
[4]Available from ConocoPhillips (USA)/S-Oil (South Korea).
[5]Available from PetroCanada (Canada).
[6]Available from ExxonMobil (USA).

In preferred embodiments, the NFP has a kinematic viscosity at 100° C. ($KV_{100}$) of 4 cSt or more, preferably 5 cSt or more, preferably 4 to 300 cSt, preferably 6 to 200 cSt, preferably 8 to 150 cSt.

In preferred embodiments, the NFP has a pour point of −10° C. or less, preferably −20° C. or less, preferably −30° C. or less, preferably −40° C. or less, preferably −45° C. or less, preferably −50° C. or less, preferably −10° to −100° C., preferably −15° to −80° C., preferably −15° to −75° C., preferably −20° to −70° C., preferably −25° to −65° C., preferably greater than −120° C., wherein a desirable range may be any combination of any lower pour point limit with any upper pour point limit described herein. In another embodiment, the NFP has a pour point of less than −30° C. when the kinematic viscosity at 40° C. is from 0.5 to 200 cSt. Most mineral oils, which typically include aromatic moieties and other functional groups, have a pour point of from 10° to −20° C. in the same kinematic viscosity range.

In a preferred embodiment, the NFP has a glass transition temperature ($T_g$) of −40° C. or less (preferably −50° C. or less, preferably −60° C. or less, preferably −70° C. or less, preferably −80° C. or less, preferably −45° to −120° C., preferably −65° to −95° C., wherein a desirable range may be any combination of any lower $T_g$ limit with any upper $T_g$ limit described herein.

In preferred embodiments, the NFP has a Viscosity Index (VI) of 90 or more, preferably 100 or more, preferably 110 or more, preferably 120 or more, preferably 130 or more, preferably 115 to 350, preferably 135 to 300, preferably 140 to 250, preferably 150 to 200, preferably 125 to 180, wherein a desirable range may be any combination of any lower VI limit with any upper VI limit described herein.

In preferred embodiments, the NFP has a flash point of 200° C. or greater, preferably 210° C. or greater, preferably 230° C. or greater, preferably 200° C. to 350° C., preferably 210° C. to 300° C., preferably 215° C. to 290° C., preferably 220° C. to 280° C., preferably 225° C. to 280° C., wherein a desirable range may be any combination of any lower flash point limit with any upper flash point limit described herein.

In preferred embodiments, the NFP has a specific gravity of 0.86 or less, preferably 0.855 or less, preferably 0.84 or less, preferably 0.78 to 0.86, preferably 0.79 to 0.855, preferably 0.80 to 0.85, preferably 0.81 to 0.845, preferably 0.82 to 0.84, wherein a desirable range may be any combination of any lower specific gravity limit with any upper specific gravity limit described herein.

In preferred embodiments, the NFP has an Mn of 250 g/mol or more, preferably 300 g/mol or more, preferably 400 g/mol or more, preferably 500 g/mol or more, preferably 300 to 21,000 g/mol, preferably 300 to 10,000 g/mol, preferably 400 to 5,000 g/mol, preferably 450 to 3,000 g/mol.

In preferred embodiments, the NFP has a low degree of color, such as typically identified as "water white," "prime white," "standard white," or "bright and clear," preferably an APHA color of 100 or less, preferably 80 or less, preferably 60 or less, preferably 40 or less, preferably 20 or less, as determined by ASTM D1209.

In other embodiments, any NFP may have an initial boiling point (ASTM D1160) of from 300 to 600° C. in one embodiment, and from 350° to 500° C. in another embodiment, and greater than 400° C. in yet another embodiment.

Any of the NFP's for use in the present invention may be described by any embodiment described herein, or any combination of the embodiments described herein. For example, in one embodiment, the NFP is a $C_6$ to $C_{200}$ paraffin having a pour point of less than −25° C. Alternately, the NFP comprises an aliphatic hydrocarbon having a kinematic viscosity of from 0.1 to 1000 cSt at 100° C. Alternately, the NFP is selected from isoparaffins and PAOs and blends thereof having from 8 to 25 carbon atoms.

In another embodiment, the NFP of the present invention comprises $C_{25}$ to $C_{1500}$ paraffins, and $C_{30}$ to $C_{500}$ paraffins in another embodiment, and has a flash point of 200° C. or more and a pour point of –10° C. or less and a viscosity index of 120 or more. Alternately the NFP comprises $C_{25}$ to $C_{1500}$ paraffins, preferably $C_{30}$ to $C_{500}$ paraffins, and has a flash point of 200° C. or more and a pour point of –20° C. or less. Alternately the NFP comprises $C_{25}$ to $C_{1500}$ paraffins, preferably $C_{30}$ to $C_{500}$ paraffins, and has a flash point of 200° C. or more and a kinematic viscosity at 100° C. of 35 cSt or more. In another embodiment, the NFP consists essentially of $C_{35}$ to $C_{300}$ paraffins, preferably the NFP consists essentially of $C_{40}$ to $C_{250}$ paraffins, and has a flash point of 200° C. or more and a pour point of –10° C. or less and a viscosity index of 120 or more. Alternately the NFP consists essentially of $C_{35}$ to $C_{300}$ paraffins, preferably $C_{40}$ to $C_{250}$ paraffins, and has a flash point of 200° C. or more and a pour point of –20° C. or less. Alternately the NFP consists essentially of $C_{35}$ to $C_{300}$ paraffins, preferably $C_{40}$ to $C_{250}$ paraffins, and has a flash point of 200° C. or more and a kinematic viscosity at 100° C. of 35 cSt or more. Alternately the NFP has a flash point of 200° C. or more and a pour point of –20° C. or less. Alternately the NFP has a flash point of 200° C. or more and a kinematic viscosity at 100° C. of 35 cSt or more.

In a preferred embodiment, any NFP described herein has a flash point of 200° C. or more (preferably 210° C. or more) and a pour point of –20° C. or less (preferably –25° C. or less, more preferably –30° C. or less, more preferably –35° C. or less, more preferably –45° C. or less, more preferably –50° C. or less).

In another preferred embodiment, the NFP has a flash point of 220° C. or more (preferably 230° C. or more) and a pour point of –10° C. or less (preferably –25° C. or less, more preferably –30° C. or less, more preferably –35° C. or less, more preferably –45° C. or less, more preferably –50° C. or less).

In another preferred embodiment, the NFP has a kinematic viscosity at 100° C. of 4 cSt or more (preferably 6 cSt or more, preferably 8 cSt or more) and a specific gravity (15.6/15.6° C.) of 0.87 or less (preferably 0.865 or less, preferably 0.86 or less, preferably 0.855 or less) and a flash point of 200° C. or more (preferably 225° C. or more).

In another preferred embodiment, the NFP has a) a flash point of 200° C. or more, b) a specific gravity of 0.86 or less, and c1) a pour point of –10° C. or less and a viscosity index of 120 or more, or c2) a pour point of –20° C. or less, or c3) a kinematic viscosity at 100° C. of 4 cSt or more.

In another preferred embodiment, the NFP has a specific gravity (15.6/15.6° C.) of 0.85 or less (preferably between 0.80 and 0.85) and a kinematic viscosity at 100° C. of 3 cSt or more (preferably 4 or more, preferably 5 cSt or more, preferably 8 cSt or more) and/or a number-average molecular weight ($M_n$) of at least 280 g/mol.

In another preferred embodiment, the NFP has a specific gravity (15.6/15.6° C.) of 0.86 or less (preferably between 0.81 and 0.855, preferably between 0.82 and 0.85) and a kinematic viscosity at 100° C. of 4 cSt or more (preferably 6 or more, preferably 8 cSt or more) and/or a number-average molecular weight ($M_n$) of at least 420 g/mol.

In another preferred embodiment, the NFP has a pour point of –25° C. or less, preferably between –30° C. and –90° C., and a kinematic viscosity in the range of from 20 to 5000 cSt at 40° C. In another preferred embodiment, the NFP has a pour point of –25° C. or less and a Mn of 400 g/mol or greater. Most mineral oils, which typically include functional groups, have a pour point of from 10° C. to –25° C. at the same viscosity and molecular weight ranges.

In another preferred embodiment the NFP has a glass transition temperature ($T_g$) that cannot be determined by ASTM E 1356 or, if it can be determined, then the $T_g$ according to ASTM E 1356 is less than 0° C., preferably less than –10° C., more preferably less than –20° C., more preferably less than –30° C., more preferably less than –40° C., and, preferably, also has one or more of the following properties: (1) an initial boiling point as determined by ASTM D 1160 greater than 300° C., preferably greater than 350° C., preferably greater than 400° C.; and/or (2) a pour point of –10° C. or less, preferably –15° C. or less, preferably –25° C. or less, preferably –35° C. or less, preferably –45° C. or less; and/or (3) a specific gravity (ASTM D 4052, 15.6/15.6° C.) of less than 0.88, preferably less than 0.86, preferably less than 0.84, preferably from 0.80 to 0.88, preferably from 0.82 to 0.86; and/or (4) a final boiling point as determined by ASTM D1160 of from 300° C. to 800° C., preferably from 400° C. to 700° C., preferably greater than 500° C.; and/or (5) an Mw between 30,000 and 400 g/mol preferably between 15,000 and 450 g/mol; and/or (6) an Mn between 10,000 and 400 g/mol, preferably between 5,000 and 450 g/mol; and/or (7) a flash point as measured by ASTM D 92 of 200° C. or greater.

In a preferred embodiment, the percentage of carbons in chain-type paraffins ($C_P$) for any NFP is at least 80% (preferably at least 85%, more preferably at least 90%, even more preferably at least 95%, even more preferably at least 98%, most preferably at least 99%).

Preferred compositions of the present invention can be characterized in that the crosslinked polyethylene composition decreases less than 3% (preferably less than 2%, preferably less than 1%) in weight when permanence of the NFP is determined by ASTM D1203 (0.25 mm thick sheet, 300 hours in dry 70° C. oven). Weight loss here refers to the reduction in weight in excess of that measured for the unplasticized composition under the same test conditions.

Preferred NFP's of this invention are characterized in that, when blended with the polyethylene base resin to form a plasticized composition prior to crosslinking the polyethylene, the NFP is miscible with the polyethylene as indicated by no change in the number of tan-delta peaks in the Dynamic Mechanical Thermal Analysis (DMTA) trace as compared to the unplasticized polyolefin DMTA trace (the "trace" is the plot of tan-delta vs. temperature). Lack of miscibility is indicated by an increase in the number of tan-delta peaks in DMTA trace over those in the unplasticized polyolefin.

In one embodiment of the invention, the NFP can comprise a blend of two or more of the NFP species described herein. By selectively combining two or more NFP modifiers with different attributes, it is possible to obtain benefit from each of them. For example, a combination of a relatively low Mw NFP and a relatively high Mw modifier may provide improved permanence while at the same time maintaining improved flexibility. For another example, a combination of low pour point NFP and a high Mw NFP may provide improved permanence while at the same time maintaining sufficient low temperature impact properties. Those skilled in the art will appreciate that the inventive modifiers with higher viscosities and ones with better compatibility with the host polymer generally exhibit better permanence and retention of properties, while the modifiers with lower viscosities generally exhibit better processing ease, better flexibility and better low temperature impact properties when compounded in a PEX.

The polyethylene base resins suitable for use in the present invention can be in any physical form when used to blend with the modifier of the invention for crosslinking. In one embodiment, reactor granules, defined as the granules of polymer that are isolated from the polymerization reactor prior to any processing procedures, are used to blend with the modifier of the invention. The reactor granules typically have an average diameter of from 50 µm to 10 mm in one embodiment, and from 10 µm to 5 mm in another embodiment. In another embodiment, the base resin is in the form of pellets, such as, for example, having an average diameter of from 1 mm to 10 mm that are formed from melt extrusion of the reactor granules or the polymerization reactor effluent.

The polyethylene base resins, modifiers and other components blended for crosslinking in the present invention can be blended by any suitable means, and are typically blended to yield an intimately mixed composition which may be a homogeneous, single phase mixture. For example, they may be blended in a static mixer, batch mixer, extruder, or a combination thereof, which is sufficient to achieve an adequate dispersion of modifier in the base resin.

The mixing step may involve first dry blending using, for example, a tumble blender, where the base resin and modifier are brought into contact first, without intimate mixing, which may then be followed by melt blending in an extruder and crosslinking. Another method of blending the components is to melt blend the base resin pellets with the modifier directly in an extruder or batch mixer. It may also involve a master batch approach, where the final modifier concentration is achieved by combining neat polymer with an appropriate amount of plasticized polymer that had been previously prepared at a higher modifier concentration. The mixing step may take place as part of a processing method used to crosslink the blend and fabricate articles, such as in the extruder or an injection molding machine in a polyethylene processing and/or crosslinking line.

In one aspect of the invention, the ethylene polymer and modifier are melt blended in an apparatus such as an extruder, such as a single or twin screw extruder, or batch mixer. The ethylene polymer may also be dry blended with the modifier using a tumbler, double-cone blender, ribbon blender, or other suitable blender. In yet another embodiment, the ethylene polymer and modifier are blended by a combination of approaches, for example a tumbler followed by an extruder. A preferred method of blending is to include the final stage of blending in a continuous gravimetric blender just prior to the introduction into the extruder used to melt and convey the composition for cure system mixing, grafting and/or crosslinking. Alternatively or additionally, in an embodiment blending can include direct injection of the modifier into the extruder or injection molding machine, either before or after the polyethylene is fully melted.

The type of single screw used in an extruder can make a difference in how well the composition is mixed and the rate the at which the composition can be made. Although any single screw could be used under some conditions, in some embodiments certain screws are better at mixing fluids and solid polymers. Screw designs for the composition of the invention can vary depending upon the materials being processed and the amount of pre-mixing that has taken place prior to extrusion. Preferably, the screw geometry includes good solids conveying coupled with optimized mixing elements to provide good homogenization. Both distributive and dispersive mixing elements can be used to provide the uniform output required. One example of preferred mixing screw geometry includes a barrier flight screw, often referred to in the art as a "Maillefer" screw. This screw design can be combined with other mixing elements if additional mixing is required. Designs can be optimized for both smooth and grooved bore barrels. In one embodiment, single screws with Madox mixing sections or Madox and Barrier mixing sections can be used. Conventional screw extruders can be used in a peroxide crosslinking process available under the trade designation PEXLINK from iNOEX GmbH, in which the extrudate from a conventional screw extruder, rather than a ram extruder, is crosslinked downstream by infrared radiation at line speeds of up to 30 m/min. Extrusion technology for polyethylene is described in more detail in, for example, PLASTICS EXTRUSION TECHNOLOGY 26-37 (Friedhelm Hensen, ed. Hanser Publishers 1988).

In another aspect of the invention, the polyethylene base resin may be blended in solution by any suitable means, by using a solvent that dissolves both components to a significant extent. The blending may occur at any temperature or pressure where the modifier and the ethylene polymer base resin remain in solution. Preferred conditions include blending at high temperatures, such as 10° C. or more, preferably 20° C. or more over the melting point of the ethylene polymer. Such solution blending would be particularly useful in processes where the ethylene polymer is made by solution process and the modifier is added directly to the polymerization reactor or to the finishing train, rather than added to the dry polymer in another blending step altogether. Such solution blending would also be particularly useful in processes where the ethylene polymer is made in a bulk or high pressure process where the both the polymer and the modifier were soluble in the monomer. As with the solution process the modifier is added directly to the finishing train, rather than added to the dry polymer in another blending step altogether.

Thus, in the cases of polyethylene crosslinking and the fabrication of crosslinked polyethylene articles using methods that involve an injection molding machine or an extruder, such as one step or two step moisture curing processes, peroxide crosslinking, and e-beam crosslinking, any means of combining the polyethylene and modifier to achieve the desired blends for crosslinking serve equally well as fully formulated pre-blended pellets, since the forming process includes a re-melting and mixing of the raw material; example combinations include simple blends of neat polymer pellets and modifier, of neat polymer granules and modifier, of neat polymer pellets and pre-blended pellets, and neat polymer granules and pre-blended pellets. Here, "preblended pellets" means pellets of a polyethylene composition comprising ethylene polymer and modifier at some concentration.

In the process of compression molding, however, little mixing of the melt components occurs, and pre-blended pellets would be preferred over simple blends of the constituent pellets (or granules) and modifier. Those skilled in the art will be able to determine the appropriate procedure for blending of the polymers to balance the need for intimate mixing of the component ingredients with the desire for process economy.

In the present invention polyethylene is crosslinked according to one of several polyethylene crosslinking techniques and on equipment well known to those skilled in the art. In embodiments, polyethylene is crosslinked in the presence of NFP using peroxides, moisture curing systems, irradiation or the like. Peroxide crosslinking uses an organic peroxide to initiate a free radical reaction in the polymer and the resulting free radicals abstract hydrogen ions from the polymer chains, enabling them to form covalent bonds between the chains. Crosslinking preferably occurs in the presence of a free-radical initiator selected from the group consisting of organic peroxides, organic peresters, and azo compounds. Examples of such compounds include benzoyl peroxide, dichlorobenzoyl peroxide, dicumyl peroxide, ditert-butyl peroxide, 2,5-dimethyl-2,5-di(peroxybenzoate) hexyne-3,1,4-bis(tert-butylperoxyisopropyl)benzene, lauroyl peroxide, tert-butyl peracetate, 2,5-dimethyl-2,5-di(tert-butylperoxy)hexyne-3,2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate and tert-butyl perdiethylacetate, azoisobutyronitrile, dimethyl azoisobutyrate. Suitable organic peroxides for crosslinking the polyethylene/NFP blends according to the present invention are available commercially under the trade designation LUPEROX, (preferably 2,5-dimethyl-2,5-di(tert-butylperoxy)hexane, sold under the tradename LUPEROX® 101).

The peroxide is typically melt compounded into the polyethylene at temperatures below the decomposition point of the peroxide, and after the final product is formed, the temperature is increased to initiate the crosslinking reaction. In a wire extrusion embodiment, post-extrusion curing can be achieved by a continuous vulcanization process wherein wire exiting the die goes into a high-pressure steam tube which may be 100 meters long or more where the insulation is cured on the wire by the heat supplied from the steam. In a pipe extrusion embodiment, the Engel method can be used wherein the peroxide is melt compounded cold into the polyethylene blend and the blend is then rammed through a high pressure, high temperature head to exit as a cross-linked pipe. Peroxide crosslinking achieves relatively high crosslinking densities with low raw material costs, but requires relatively expensive equipment, has relatively slow production rates and is energy intensive.

Irradiation crosslinking uses ionizing radiation such as from a high-energy electron accelerator. The polyethylene/NFP blend, which may include additives to accelerate the crosslinking process, is made using conventional thermoplastic processing equipment at relatively high speeds, finished into its desired shape, and then cured off-line by exposing it to the electron beam. In an embodiment, the tubular product can be taken up on a large coil or reel of the pipe or jacketed wire or cable, and rewound through the electron beam unit. Depending on the thickness of the wall of the tubular, it may be necessary for repeated runs through the electron beam unit to obtain the desired crosslinking density.

In moisture cure embodiments, a copolymer of ethylene and vinyl silane reacts with water, usually in the presence of a catalyst, to effect crosslinking. The product is made on conventional thermoplastic processing equipment and then cured off-line by exposing it to moisture. The cure rate depends on moisture level, temperature and wall thickness, and can be accelerated by contact with low-pressure steam or hot water, but crosslinking under ambient conditions may also be possible.

The polyethylene copolymers are capable of being crosslinked by a reactive unsaturated silane compound. Silane crosslinking processes well-known in the art include the commercially available MONOSIL process developed by Maillefer and BICC, and the SIOPLAS process developed by Dow Corning. In the SIOPLAS, or two-step process, a polyethylene is first graft-modified in a compounding mixer or extruder with a reactive silane compound and a free radical initiator, such as dicumyl peroxide, for example, to produce a silane-grafted polyethylene that can be pelletized and shipped or stored for subsequent processing. The silane-grafted polyethylene is then compounded with a silanol condensation catalyst and melt-extruded in the desired form, such as a pipe or a wire coating layer, followed by curing (crosslinking) by heat and moisture, such as in a water bath or a steam bath. In warm and humid climates, curing can take place under ambient conditions. Polyethylene crosslinking compounding materials are available from a number of manufacturers who supply silane pre-grafted base resins and catalyst masterbatches that can be mixed in the proper proportions, e.g. 95/5 or 50/50 by weight grafted PE resin/catalyst masterbatch, to produce a material curable by exposure to steam at 70° C.-90° C. or ambient moisture. For example, SIOPLAS PEX system components are available from Padanaplast USA under the trade designation PEXIDAN® (PEXIDAN® V/T, PEXIDAN® X/T, PEXIDAN® U/T, PEXIDAN® R/T, PEXIDAN® H/T, PEXIDAN® L/T) that include a silane pregraft (designated A-1001) and a catalyst masterbatch (designated CAT-010FR, CAT-005FR, CAT-008, CAT-009, CAT-012FR, CAT-003, respectively). Other SIOPLAS PEX system suppliers include AEI Compounds Ltd. (SX704 silane pregraft PE and CM488 catalyst masterbatch); Silon Compounds Ltd. (TA1108 HD silane pregraft PE and TA 2125 HD catalyst masterbatch).

In the MONOSIL or one-step process, the polyethylene, reactive silane compound, free radical initiator and silanol condensation catalyst are all fed into an extruder and melt extruded in a desired form, such as a pipe or a wire coating layer, followed by curing by heat and moisture, as in the two-step process.

The reactive silane compound can be an unsaturated silane compound having one or more hydrolyzable groups. Typical reactive silane compounds include an alkenyl group such as vinyl, allyl, isopropenyl, butenyl, cyclohexenyl, or γ-(meth)acryloxy allyl, and a hydrolyzable group such as a hydrocarbyloxy, hydrocarbonyloxy or hydrocarbylamino group. Specific examples of hydrolyzable groups include methoxy, ethoxy, formyloxy, acetoxy, propionyloxy, and alkylamino or acrylamino groups.

A suitable reactive silane is vinyl trimethoxysilane, available as SILQUEST® from OSi Specialties or DYNASYLAN VTMO available from Hüls. Other silane compound suppliers include Momentive Performance Materials (formerly GE Silicons/OSi Witco) (SILCAT R and XL-PEARL 60); Wacker Chemie (XL 11 VP); Silon Compounds Ltd. (SILMIX). The amount of silane used is readily determined by one skilled in the art, based on the processing conditions, the specific silane used, and other well known factors. Typical amounts of silane compound are from about 0.5 to about 5 phr, where the units "phr" denote parts by weight per hundred parts by weight of the polyethylene resin.

The free radical initiator can be a peroxide or azo compound which decomposes to form peroxyl or azyl radicals at temperatures suitable for polyethylene pelletization, or can be ionizing radiation. Typical peroxides include, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide and tert-butyl peracetate. A suitable azo compound is azobisisobutyl nitrite. A particular peroxide compound is dicumyl peroxide, available commercially as DICUP®R from Hercules. The amount of free radical initiator is readily determined by one skilled in the art, and is typically from about 0.04 to about 0.15 phr. Some suppliers provide the reactive silane compound containing a proportioned amount of peroxide, for example, blends of vinyltrimethoxysilane with peroxide, and/or with antioxidants and copper stabilizers, are available under the DYNASYLAN SILFIN trade designations The silanol condensation catalyst can be any compound that promotes the condensation crosslinking reaction, such as organic bases, carboxylic acids, and organometallic compounds including organic titanates and complexes or carboxylates of lead, cobalt, iron, nickel, zinc or tin. Specific catalysts include, for example, dibutyl tin dilaurate, dioctyl tin maleate, dibutyl tin diacetate, dibutyl tin dioctoate, dibutyl tin didodecanoate, stannous acetate, stannous octoate, lead naphthenate, zinc caprylate, and cobalt naphthenate. A particular tin carboxylate is dibutyl tin didodecanoate, available commercially as STANCLERE®TL from Akzo Chemie. The catalyst is used in a catalytically effective amount, readily determined by one skilled in the art. Typical catalyst amounts are from about 0.01 to about 0.1 phr.

The peroxide-initiated reaction of vinyl trimethoxysilane and polyethylene yields a grafted polymer having a polyethylene backbone structure with pendant ethyltrimethoxysilyl moieties. In the crosslinking reaction, methoxy groups are hydrolyzed to form methanol and pendant ethyldimethoxysilanolyl groups, which undergo condensation reactions with other ethyldimethoxysilanolyl groups to eliminate water and form an Si—O—Si linkage between the pendant silyl moieties.

One or more crosslinking agents are preferably used in the compositions, especially when silica is the primary filler, or is present in combination with another filler. More preferably, the crosslinking/coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof.

In one embodiment, bis-(3-triethoxysilypropyl)tetrasulfide (sold commercially as Si69 by Degussa) is employed. Sigma Aldrich, Aceto Corp, Kenrich Petrochemicals, Inc., Witco all sell silane coupling/crosslinking agents.

In the one-step MONOSIL process, the grafting, mixing and finished product extrusion can be simultaneous, e.g. polyethylene resin can be fed into the extruder and a solution of silane, initiator and catalyst can be injected, soaked or added through gravimetric dosing systems into the barrel. Alternately, the silane, initiator and catalyst can be absorbed into a porous or amorphous polyethylene resin used as a masterbatch, for example DRY-SIL. Porous polyethylene pellets can also be used to absorb the silane in-line, so that a dry blend is introduced to the extruder, e.g. SPHERSIL P material in the SPHERSIL PROCESS from Silon Compounds. The grafting reaction occurs during the extrusion and the material is coated onto wire or cable as it exits the die, or extruded into a pipe or tube. The one-step process can require a different screw design, commonly with a length to diameter ratio from 24 to 30, and a longer extruder than required in the peroxide or two-step moisture curing process. Care must also be exercised in the selection of stabilizers, antioxidants, flame retardants and other additives so that they will not interfere with the grafting reaction.

In one embodiment of the present invention, conventional plasticizers such as are commonly used for poly(vinyl chloride) are substantially absent from the crosslinked polyethylene compositions. In particular, plasticizers such as phthalates, adipates, trimellitate esters, polyesters, and other functionalized plasticizers as disclosed in, for example, U.S. Pat. Nos. 3,318,835; 4,409,345; WO 02/31044 A1; and PLASTICS ADDITIVES 499-504 (Geoffrey Pritchard, ed., Chapman & Hall 1998) are substantially absent. By "substantially absent," it is meant that these compounds are not added deliberately to the compositions and if present at all, are present at less than 0.5 wt %.

In some embodiments, naphthenic mineral oils and aromatic mineral oils are substantially absent; i.e., present at less than 0.5 wt % of the inventive composition. In another embodiment, if such oils are present in the composition, the aggregate of such oils is at most 5 wt % of the total liquid modifier in the composition. Also, aromatic moieties and carbon-carbon unsaturation are substantially absent from the modifiers used in the present invention in yet another embodiment. Aromatic moieties include a compound whose molecules have the ring structure characteristic of benzene, naphthalene, phenanthrene, anthracene, etc. By "substantially absent," it is meant that these aromatic compounds or moieties are not added deliberately to the compositions, and if present, are present to less than 0.5 wt % of the composition.

The crosslinked polyethylene compositions of the present invention may also contain other additives. Those additives include antioxidants, nucleating agents, acid scavengers, stabilizers, anticorrosion agents, blowing agents, other UV absorbers such as chain-breaking antioxidants, etc., quenchers, antistatic agents, slip agents, pigments, dyes and fillers and cure agents such as peroxides and silanes mentioned above. Dyes and other colorants common in the industry may be present from 0.01 to 10 wt % in one embodiment, and from 0.1 to 6 wt % in another embodiment, based upon the weight of the composition.

In particular, antioxidants and stabilizers such as organic phosphites, hindered amines, and phenolic antioxidants may be present in the crosslinked polyethylene compositions of the invention from 0.001 to 2 wt %, based upon the weight of the composition, in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and di(2,4-di-tert-butylphenyl) pentaerythritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl)propionate (IRGANOX 1010); and 1,3,5-tri(3,5-di-tert-butyl-4-hydroxybenzyl-isocyanurate (IRGANOX 3114).

Fillers may be present from 0.001 to 50 wt % in one embodiment, and from 0.01 to 25 wt %, based upon the weight of the composition, in another embodiment, and from 0.2 to 10 wt % in yet another embodiment. Desirable fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesite, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the modifier of the invention pre-contacted, or pre-absorbed into the filler prior to addition to the ethylene polymer in one embodiment.

More particularly, in one embodiment of the present invention, the modifier, or some portion of the modifier, may be blended with a filler, desirably a porous filler. The modifier and filler may be blended by, for example, a tumbler or other wet blending apparatus. The modifier and filler in this embodiment are blended for a time suitable to form a homogenous composition of modifier and filler, desirably from 1 minute to 5 hours in one embodiment. This modifier/filler blend may then be blended with the ethylene polymer base resin useful in the invention for plasticization of the ethylene polymer base resin and flexibilization of the crosslinked polyethylene. In another embodiment, a porous filler may be contacted with the modifier, or some portion thereof, prior to contacting the filler with the ethylene polymer base resin. In another embodiment, the porous filler, ethylene polymer and modifier are contacted simultaneously (or in the same blending apparatus). In any case, the filler may be present from 0.1 to 60 wt % of the composition, and from 0.2 to 40 wt % in another embodiment, and from 0.3 to 20 wt % in yet another embodiment.

Metal salts of fatty acids may also be present in the crosslinked polyethylene compositions of the present invention. Such salts may be present from 0.001 to 1 wt % of the composition in one embodiment, and from 0.01 to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals including Li, Na, Mg, Ca, Sr, Ba, Zn, Cd, Al, Sn, Pb and so forth. Preferable metal salts of fatty acids are magnesium stearate, calcium stearate, sodium stearate, zinc stearate, calcium oleate, zinc oleate, and magnesium oleate.

In a preferred embodiment, slip additives may be present in the compositions of this invention. Preferably the slip additives are present at 0.001 to 1 wt % (10 to 10,000 ppm), more preferably 0.01 to 0.5 wt % (100 to 5000 ppm), more preferably 0.1 to 0.3 wt % (1000 to 3000 ppm), based upon the weight of the composition.

Desirable slip additives include but are not limited to saturated fatty acid amides (such as palmitamide, stearamide, arachidamide, behenamide, stearyl stearamide, palmityl palmitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-erucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof.

Preferred slip additives are unsaturated fatty acid amides, which are commercially available from Crompton (KEKAMIDE™ grades), Croda Universal (CRODAMIDE™ grades), and Akzo Nobel Amides Co. Ltd. (ARMOSLIP™ grades). Particularly preferred slip agents include unsaturated fatty acid amides having the chemical structure $CH_3(CH_2)_7CH=CH(CH_2)_xCONH_2$ where x is 5 to 15. Preferred versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In another embodiment, stearamide is also useful in this invention. Other preferred slip additives include those described in WO 2004/005601A1.

In some embodiments the polyethylene base resins used for crosslinking according to this invention may be blended with one or more other polymers, including but not limited to, thermoplastic polymer(s) and/or elastomer(s).

By thermoplastic polymer(s) is meant a polymer that can be melted by heat and then cooled without appreciable change in solid-state properties before and after heating. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising ethylene copolymerized with one or more $C_3$ to $C_{40}$ olefins, preferably a $C_3$ to $C_{20}$ alpha olefin, more preferably $C_3$ to $C_{10}$ alpha-olefins. A particularly preferred example is polybutene. The most preferred polyolefin is polypropylene. Other preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene, butene, hexene, and/or octene.

By elastomers is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SEBS, SI, SIS, SB, SBS, SIBS and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the blend comprising the modifier which is crosslinked according to the present invention may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene.

Tackifiers may be blended with the polyethylene base resins of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. "Non-polar" means that the tackifier is substantially free of monomers having polar groups. Preferably the polar groups are not present, however if they are preferably they are not present at more that 5 weight %, preferably not more that 2 weight %, even more preferably no more than 0.5 weight %, based upon the weight of the tackifier.) In some embodiments the tackifier has a softening point (Ring and Ball, as measured by ASTM E-28) of 80° C. to 140° C., preferably 100° C. to 130° C. The tackifier, if present, is typically present at about 1 weight % to about 50 weight %, based upon the weight of the blend, more preferably 10 weight % to 40 weight %, even more preferably 20 weight % to 40 weight %. Preferably however, tackifier is not present, or if present, is present at less than 10 weight %, preferably less than 5 weight %, more preferably at less than 1 weight %.

In another embodiment the crosslinked polyethylenes of this invention, and/or the modifier-base resin blends, further comprise typical additives known in the art such as fillers, cavitating agents, antioxidants, surfactants, adjuvants, block, antiblock, color masterbatches, pigments, dyes, processing aids, UV stabilizers, neutralizers, lubricants, waxes, and/or nucleating agents. The additives may be present in the typically effective amounts well known in the art, such as 0.001 weight % to 10 weight %, based upon the weight of the composition. Preferred antioxidants include phenolic antioxidants, such as Irganox 1010, Irganox, 1076 both available from Ciba-Geigy. Preferred fillers, cavitating agents and/or nucleating agents include titanium dioxide, calcium carbonate, barium sulfate, silica, silicon dioxide, carbon black, sand, glass beads, mineral aggregates, talc, clay and the like.

In a barrier pipe embodiment of the invention, the crosslinked polyethylenes of this invention are used in conjunction with at least one barrier layer that is used to reduce the rate that oxygen can permeate through the pipe wall. The barrier layer can be a thin layer of a barrier resin applied as a layer on an inside or outside surface of the crosslinked polyethylene tube, or sandwiched as an internal layer between inner and outer crosslinked polyethylene layers, with or without an adhesive tie layer between the opposing surfaces of the crosslinked polyethylene and the barrier resin. Representative non-limiting examples of barrier materials include ethylene vinyl alcohol (EVOH) copolymers and polyamides (Nylon), or in some instances a blend of the two materials. Suitable barrier resins are available commercially under the trade designations SELAR PA (Dupont), SOARNOL EVOH (Soarus L.L.C) and EVAL EVOH (Eval Co.).

A tie layer facilitate bonding together the dissimilar resins in the multilayer construction of the barrier pipes of the invention. The tie layer in one embodiment can be an adhesive resin, e.g. a polyolefin modified with functional groups designed to bond to a variety of resins, such as Nylon and/or EVOH, as well as the crosslinked polyethylene. Suitable adhesive resins are available commercially under the trade designations ADMER (Mitsui Chemical), BYNEL (Dupont) and PLEXAR (MSI Technology).

The crosslinked tubes in an embodiment can be coextrusion coated with an intermediate adhesive tie layer and an outer oxygen barrier layer. The tie layer can have any suitable thickness for desired adhesion, for example from 0.01 to 0.05 mm (0.5-2.0 mils), and the barrier layer can have any thickness suitable for inhibiting oxygen permeability, for example from 0.02-0.1 mm (0.8-4 mils). Further, the barrier layer should not be so thick as to adversely affect the flexibility or other desirable properties of the crosslinked polyethylene tube.

A similar multilayer barrier tube construction is available in another embodiment, where the moisture curable polyethylene resin is coextruded, e.g. in a single step, with the barrier and tie layers sandwiched between layers of the polyethylene resin, and where the polyethylene resin is crosslinked following the coextrusion step. The multilayer barrier pipes have excellent flexibility and processability from the presence of the NFP, but surprisingly, in contrast to some other flexibilizing materials where the modifier must be crosslinked or bonded to the resin to prevent blooming to the surface and poor adhesion, there is no significant loss of adhesion to the tie layer when the essentially inert modifier of the present invention is employed. Moreover, the barrier pipes of the present invention have the desired oxygen barrier properties.

In a preferred embodiment, the crosslinked blends of this invention (particularly those useful in pipe and tubing applications) have a stress at yield of least 10 MPa or more, preferably 15 MPa or more, preferably 20 MPa or more.

In a preferred embodiment, the crosslinked blends of this invention (particularly those useful in pipe and tubing applications) have an average bend test of less than 0.5 MPa, preferably less than 0.3 MPa, preferably less than 0.1 MPa.

In a preferred embodiment, the crosslinked blends of this invention (particularly those useful in pipe and tubing applications) have a burst pressure at 82° C. burst of 2 MPa or more, preferably 2.5 MPa or more, preferably 3.0 MPa or more.

In a preferred embodiment, the crosslinked blends of this invention (particularly those useful in pipe and tubing applications) have a melt index (ASTM 1238, 190° C. 2.16 kg) that is at least 25% higher than the exact same crosslinked blend without the NFP, preferably at least 50% higher, preferably at least 100% higher.

In a preferred embodiment, the crosslinked blends of this invention (particularly those useful in wire and cable applications) have a melt index (ASTM 1238, 190° C., 2.16 kg) of 6 dg/min or less, preferably 5 dg/min or less.

In a preferred embodiment, the crosslinked blends of this invention (particularly those useful in wire and cable applications) have a tensile at break of 5 MPa or more, preferably 6 MPa or more, preferably 7 MPa or more, preferably 7.5 MPa or more.

In a preferred embodiment, the crosslinked blends of this invention (particularly those useful in wire and cable applications) have an elongation at break of 300% or less, preferably 275% or less.

In a preferred embodiment, the crosslinked blends of this invention containing filler (preferably at least 20 wt % filler) have a die pressure energy improvement of at least 5%, preferably at least 10%, preferably at least 15% as compared to the same blend on the same equipment without the NFP. Die Pressure energy improvement is defined to be the die pressure at exit of the NFP containing blend divided by the die pressure at exit of the same blend absent the NFP.

In a preferred embodiment, the crosslinked blends of this invention containing filler (preferably at least 20 wt % filler) have a torque energy improvement of at least 5%, preferably at least 10%, preferably at least 15% as compared to the same blend on the same equipment without the NFP. Torque energy improvement is defined to be the torque need to extrude the NFP containing blend divided by the torque need to extrude the same blend absent the NFP.

In a preferred embodiment, the crosslinked blends of this invention have a torque energy improvement of at least 20%, preferably at least 40%, preferably at least 60% as compared to the same blend on the same equipment without the NFP.

In a preferred embodiment, the crosslinked blends of this invention have a die pressure energy improvement of at least 10%, preferably at least 20%, preferably at least 30% as compared to the same blend on the same equipment without the NFP.

Test Methods

Hardness: The hardness tests were measured in accordance with ASTM D 2240-05 (EN ISO 868) or ASTM D 785, *Test Method for Rockwell Harness of Plastics and Electrical Insulating materials*, in event of conflict ASTM D 785 shall control.

Young's Modulus or E Modulus: The Young's modulus tests were performed according to either ASTM D 638/T4 or ISO 572-2/1B for Type 1B Dumbells, *Tensile Properties on Type IV and 1B Dumbells at Room Temperature*, in event of conflict ASTM D 638/T4 shall control.

Melt Flow Rate (MFR): MFR was determined according to ASTM D 1238, *Standard Test Method for Flow Rates of Thermoplastics by Extrusion Plastometer*. Measurements were taken in accordance with Procedure B using temperatures and weights suggested for polyethylene polymers (190° C. and 2.16 kg).

Bend Test: The bend test measures the force required to bend a 1.27 cm (½ inch) tube to 90° around a mandrel with radius 8 times the outside diameter of the tube. The outside tube diameter in this case was 1.59 cm (⅝ inch), and the mandrel radius was 12.7 cm (5 inches). A similar procedure was used for 1.90 cm (¾-in.) pipe.

Tensile Stress @ Yield and Ultimate Elongation: The tensile and elongation tests were performed according to a ASTM D 638, *Test Method for Tensile Properties of Plastics by Use of Microtensile Specimens*. In these examples the procedure was modified for test speed condition C as defined in the ASTM procedure, and some sample specimens were 12.7 mm (0.5 in.) inside diameter, 15.9 mm (0.625 in.) outside diameter tubes rather than microtensile bars.

Quick Burst Test: The 82° C. (180° F.) burst tests were measured according to a modified ASTM D1599, *Test Method for a Short Time Hydraulic Failure Pressure of Plastic Pipe, Tubing and Fittings*. The standard test method specifies a constant, uniform increase in pressure to a failure or burst in 60-70 seconds, whereas the modified test increased the pressure quickly to the minimum Quick Burst Pressure specified in the standard for the tube, i.e. ASTM F 876 in the case of PEX tubes, and held this pressure for 1 minute, after which the internal pressure was then increased until the sample burst.

Average % Gels: The gel tests measure the percent of crosslinked, un-dissolvable material in a polymer sample. These tests were performed and measured according to ASTM D2765, *Test Method for Determination of Gel Content and Swell Ratio of Crosslinked Ethylene Plastics*. In some cases the data are reported on a normalized basis, meaning that the percent gel is by weight of the polymeric components only by accounting for the presence of low molecular weight compounds such as NFPs which are assumed to dissolve in the solvent used in the tests. For example, a crosslinked polyethylene specimen comprising 3 wt % NFP containing 65.8 wt % gel is normalized to 65.8/(1-0.03)=67.8 wt % gel on a polymer basis.

Oxidative Induction Time (OIT): The OIT tests were performed at 210° C. according to ASTM D 3895, *Test Method for Oxidative-Induction Time of Polyolefins by Differential Scanning Calorimetry*.

Limited Oxygen Index (LOI): The LOI test was performed according to ASTM D 2863 Rev. A, *Standard Test Method for Measuring the Minimum Oxygen Concentration to Support Candle-like Combustion of Plastics (Oxygen Index)*.

Hot Knife Test: The hot knife test is an official test used in the wire and cable industry, and was performed in accordance with BS/EN 60811-3-1 (1995).

Thermogravimetric Analysis (TGA): For the TGA test, polymer samples were analyzed using a thermogravimetric analyzer. The weight loss of samples of constant weight (70-74 mg) and thickness 1.93 mm (76 mils) were tested isothermally at temperatures of 175° C. and 200° C. under a nitrogen flow rate of 60 mL/minute. Sample mass was monitored as a function of time over a period of eight hours. The percent modifier loss was calculated by subtracting the total weight loss of the polymer-only control from the total weight loss of samples containing the inventive modifiers and dividing by the total modifier content.

Mean Dissolved Oxygen Difference (MDOD): The MDOD test was done as an indication of the affect on microorganism growth. Glass was used as a negative control and wax as the positive control. A water solution containing a number of test samples with and without modifier was compared to the controls. Samples that supported microorganism growth had their oxygen depleted over time, which led to a large MDOD. Samples that did not support microorganism growth maintained constant oxygen concentration over time and had low MDOD. The test method used to determine MDOD was British Standard (BS) 6920:2000—Testing of Non-metallic Materials For Use With Drinking Water, Growth of Aquatic Microorganisms.

Acronyms used in the following examples include:
BP Boiling Point
CS Cure System
EB Ethylene Butene Plastomer
EO Ethylene Octene Plastomer
EPM Ethylene Propylene Rubber
EPDM Ethylene Propylene Diene Modified Rubber
EVA Ethylene Vinyl Acetate Copolymer
FR Flame Retardant
HD High Density
KV Kinematic Viscosity
LD Low Density
LLD Linear Low Density
LOI Limited Oxygen Index
MB Master Batch
MDOD Mean Dissolved Oxygen Difference
OIT Oxidative Induction Time
PAO Polyalphaolefin
PE Polyethylene
PEX Crosslinked Polyethylene
R-COPO Reactor Copolymers
TGA Thermogravimetric Analysis
Tm Melting Point
VI Viscosity Index

EXAMPLES

Trials using an NFP modifier were performed using commercial crosslinked polyethylene (PEX) equipment modified for injection of the NFP into the mix chamber of an INOEX gravimetric blender. Pipes of nominal 1.27 cm diameter (0.5 in.) and 1.90 cm (¾-in.) were made for evaluation. The process was allowed to stabilize at steady state before pipe samples were collected. In general, lower drive amp readings were present on the extruder as the NFP loadings were increased. This showed that the viscosity changes translate into reduced energy consumption and/or improved throughput rates at the same amperage loads. In general, the results also showed that the NFP as described herein did not interfere with the crosslinking of the PEX base resins, or with the antioxidant package in the pipe. Burst testing also showed that samples of the NFP-modified PEX passed with burst pressure well above the minimum requirements. In fact, even the samples with 5 wt % loading had burst test results comparable to the reference sample. Hydrostatic pressure testing (HDS) was performed and also showed initial results indicating an estimated HDS rating of 760 psi. The results generally show that the addition of the NFP modifier to PEX base resins improved the flexibility and maintained most of the strength of the pipe samples.

Description of Raw Materials: This invention describes a way to improve the properties of crosslinked polyethylene polymers and copolymers through the use of polymer modifiers. The invention is generally applicable to all cured Ziegler-Natta and metallocene PE materials including HDPE, LDPE, LLDPE, and plastomers. A list of inventive and comparative PE materials used in the examples of this invention is provided in Table 1.

have high permanence, good compatibility with polyethylenes and ethylene copolymers, and narrow molecular weight distribution (Mw/Mn or MWD). As a result, applications using the inventive modifiers have a surprising combination of desired properties including high cure efficiency, improved flexibility and toughness and easy processing. In addition, they display excellent surface properties and exceptional retention of properties over time. A list of inventive and comparative modifiers used in the examples of this invention is provided in Table 2.

TABLE 2

Properties of Inventive Modifiers Used in the Examples

| Mod # | Type | KV, 100° C. (cSt) | Viscosity Index (VI) | Pour Point (° C.) | Tg (° C.) | Flash Point (° C.) |
|---|---|---|---|---|---|---|
| M1 | Neat | 4 | 125 | −60 | −95 | 226 |
| M2 | Neat | 8 | 139 | −51 | −86 | 255 |
| M3 | Neat | 40 | 151 | −42 | −74 | 286 |
| M4 | MB | Liquid modifier used has 30 wt % M5 in PE masterbatch | | | | |
| M5 | Neat | 10 | 137 | −48 | | 266 |

Although polymer modifiers and fluid modifiers have been used to affect PE materials before, the typical polymer modifiers and even fluid modifiers like mineral oils, white oils, or paraffinic oils often act to reduce the crosslink efficiency in

TABLE 1

List of Polyethylene Materials Used in the Examples

| PE # | Polyethylene ID | Description | Source |
|---|---|---|---|
| PE1 | HD6706 | HDPE, ~6.7 g/10 min. Melt Index, 0.952 g/cc density, 132° C. $T_m$ | ExxonMobil Chemical Co. |
| PE2 | HD6706 MONOSIL Compound | HD6706 blended with an MB containing a one-step silane cure system and an AO and UV package. | Zurn Pex, Inc. |
| PE3 | SIOPLAS Compound | SIOPLAS two-step silane cure system in a 95/5 blend ratio and used in heating pipe applications | Padanaplast |
| PE4 | | A metallocene PE with 0.4 dg/min MI and 0.920 g/cc density made according to the general procedure in U.S. Pat. No. 7,179,876. | |
| PE5 | Thermo Plastic HFFR Compound 1 | 70 phr HDPE 105-1 (0.5 MI, 0.967 g/cc) + 30 phr LL1001XV (1.0 MI, 0.918 g/cc) + 160 phr Martinal OL 107LE flame retardant + Silquest FR 693 cure agent + AO package | ExxonMobil Chemical Co. |
| PE6 | Thermo Plastic HFFR Compound 2 | 70 phr HDPE 105-1 (0.5 MI, 0.967 g/cc) + 30 phr LL1001XV (1.0 MI, 0.918 g/cc) + 160 phr Martinal OL 107LE flame retardant + Silquest FR 693 cure agent + AO package | ExxonMobil Chemical Co. |
| PE7 | HD6704 | HDPE, ~4.5 g/10 min. Melt Index, 0.952 g/cc density, 132° C. $T_m$ | ExxonMobil Chemical Co. |
| PE8 | HD7800P | HDPE, 0.35 g/10 min. Melt Index, 0.953 g/cc density | ExxonMobil Chemical Co. |
| PE9 | HD7925.30 | HDPE, 2.5 g/10 min. Melt Index, 0.965 g/cc density | ExxonMobil Chemical Co. |

The liquid modifiers used in this invention are specialty polymer modifiers comprising hydrogenated $C_8$ to $C_{12}$ PAO's that have been found to be especially useful in crosslinked PE applications because they are naturally inert and do not affect the cure chemistry as do conventional modifiers like mineral oil, white oil and paraffinic oils. Similarly, the liquid modifiers in an embodiment herein do not affect other chemistries, such as, for example, antioxidant chemistry, filler chemistry, adhesion chemistry or the like, and do not react with other additives in general. As a result, some standard additive concentrations, including antioxidant packages, can be reduced when the NFP modifiers are used in an embodiment and still achieve the same affect. In addition, the inventive modifiers PEX systems, either causing a loss of polymer properties or requiring higher amounts of crosslinking agents to maintain the desired properties. Additionally, they are often inefficient at delivering desired attributes such as flexibility, or do so with significant drawback, e.g., reduced mechanical properties or poor processing. Surprisingly, the NFP modifiers described herein were found to have no detrimental effect on the cure system, or on bonding, grafting or coupling systems. Crosslink systems used to cure PEs include silane systems, peroxide systems and e-beam treated systems to name a few. A list of exemplary cure systems and cure processes used in the examples of this invention is provided in Table 3. Peroxide is another exemplary cure system.

TABLE 3

List of Cure Systems and Cure Processes used in the Examples

| Cure # | Cure Package ID | Description | Chemistry |
|---|---|---|---|
| CS1 | MONOSIL | A single step process wherein the silane is added directly with the other additives and base polymer. | Single step silane process |
| CS2 | SIOPLAS | A two step process for crossliniking PE with silane. The silane is added first and catalyst and activator are added in a second step. | Two-step silane process |
| CS3 | SILFIN 63 | A three component MONOSIL process made up of a silane, peroxide and catalyst. | Single step silane process |
| CS4 | SILQUEST FR 693 | A process for grafting between polymer and filler used in flame retardant compounds with high filler content. | Binds through radical silane chemistry and through functional groups. |
| CS5 | EB | Surface radiation. No additives or enhancers used | Electron Beam Radiation |

Sample Preparation Methods

Piping and Tubing Examples: Some of the examples provided in the present invention involved with piping and tubing production utilize crosslinked polyethylene (PEX) with silane cure systems. The inventive modifiers can be added to extrusion processes in a number of ways without affecting the results. In one embodiment the fluid modifiers can be added directly to the process during extrusion using, for example, pumps. To minimize process affects and enable processing of fluid modified PE without major modification to existing commercial tube and piping processes, the NFP fluid modifiers were added to the base resin outside the melt stream in a single screw extruder. Alternatively, the inventive fluid modifiers were injected into the mix chamber of an Inoex gravimetric blender before feeding to the process extruders.

Wire and Cable Examples: Some of the examples provided in the present invention developed for wire and cable production that would utilize a curing system that must not activate during the initial construction of the cable. As a result, initial cable extrusion would be done at low temperatures, below the activation point of the cure system, before later curing at high temperatures, e.g. in a continuous vulcanization line. The low temperature extrusion would require additional energy due to the high polymer viscosity at these low temperatures.

In another embodiment silane cure systems are used to crosslink the PE. The inventive modifiers have been found to enhance PE properties in a number of different silane systems including a one-step MONOSIL processes and in two-step SIOPLAS processes. Some samples were made on a small HAAKE lab extruder, formed into strips and then moisture cured. Testing was performed on the strips.

In addition, some of the wire and cable examples in the present invention are flame retardant. Often flame retardant formulations have high levels of additives or fillers that would cause additional difficulty in processing. For these reasons flame retardant, cured wire and cable formulations are very difficult to process and depend heavily on process enhancing modifiers.

Examples 1-4

High Cure Efficiency in Piping and Tubing Applications:

Examples 1-4 in Table 4 show the inventive modifiers were not detrimental to crosslinked PE cure systems. Data for two different silane cure systems were obtained. The test used to measure crosslink density is an extraction test where a weighed sample of the crosslinked PE is put into a sock of a Soxhlet Extractor and the amorphous phase is extracted with boiling dodecanaphthalene (BP=190° C.) for 6 hours. The un-dissolved portion is dried and weighed. The weight is reported as a percent of the original sample weight. The actual percent measured is reported along with the normalized percent calculated after compensating for the 3% modifier added to the inventive examples (percent×1.03=normalized percent). The reported values are within about +/−2% of the control values suggesting that no significant loss of cure efficiency is caused by the inventive modifiers.

TABLE 4

Cure Efficiency in Crosslinked Polyethylenes (PEX)

| | Comparative Example C1 | Example 1 | Comparative Example C2 | Example 2 | Example 3 | Example 4 |
|---|---|---|---|---|---|---|
| Polymer | PE2 | PE2 | PE3 | PE3 | PE3 | PE3 |
| Modifier | | 3.0% M2 | | 3.0% M2 | 3.0% M1 | 3.0% M3 |
| Cure System | CS1 | CS1 | CS2 | CS2 | CS2 | CS2 |
| Avg. % Gels | 69.6 | 65.8 | 70.4 | 67.2 | 68.2 | 69.7 |
| Norm. % Gel | | 67.8 | | 69.2 | 70.2 | 71.8 |
| Cure Eff. (%) | | −2.58 | | −1.70 | −0.28 | +1.99 |

Examples 1-4

Tensile Properties in Piping and Tubing Applications

In examples 1-4 the PEX material was a hard, high-density plastic used in piping applications. Modifiers are often used to improve the flexibility of piping but when conventional, high Mw polymer modifiers such as plastomers are used to improve the flexibility, it is generally found that all the tensile properties are reduced significantly resulting in a weaker pipe. When typical fluid modifiers are used to modify PEX, it is generally found that the cure efficiency is reduced, and as a result the strength and toughness are reduced as well.

Surprisingly, it has been found that PEX with the inventive modifiers display significant reduction in flexural modulus (improvement in flexibility) but a much lesser reduction in tensile strength and burst strength (a measure of toughness). This allows one to construct high strength, durable pipe with excellent flexibility. In addition, the desired properties obtained can be maintained over time due to the excellent compatibility with the host polymer, the higher Mw (compared to typical fluid modifiers) and the narrow molecular weight distribution of the inventive modifiers. In combination, these properties of the inventive modifiers provide high permanence in the host polymer and retain properties over time.

Table 5 displays the tensile properties of Examples 1-4. The pipe bend test used a 1.27 cm pipe and measured the force required to bend it 90°. A lower force signified a more flexible pipe. The stress at yield was a measure of the strength at the deformation point and the Quick Burst test measured the internal pressure required to burst a pipe at a given temperature. For example, M2 in PE2 cured using CS1 (Example 1) showed a 36% improvement in flexibility, but only a 10% loss in burst strength at 180° C. and remained within the required specification for this application.

TABLE 5

Tensile Properties in Crosslinked Polyethylenes (PEX)

| | Comparative Example C1 | Example 1 | Comparative Example C2 | Example 2 | Example 3 | Example 4 |
|---|---|---|---|---|---|---|
| Polymer | PE2 | PE2 | PE3 | PE3 | PE3 | PE3 |
| Modifier | | M2 | | M2 | M1 | M3 |
| Cure System | CS1 | CS1 | CS2 | CS2 | CS2 | CS2 |
| Avg. Bend Test, MPa (% change) | 0.473 | 0.305 (−36%) | 0.466 | 0.369 (−21%) | 0.354 (−24%) | 0.412 (−12%) |
| Stress @ Yield, MPa (% change) | 22.15 | 17.13 (−23%) | 21.06 | 17.06 (−19%) | 18.15 (−14%) | 19.15 (−9%) |
| Strain @ Break, MPa (% change) | 230 | 214 (−7%) | 260 | 244 (−6%) | 267 (+3%) | 193 (−26%) |
| Quick Burst @ 82° C., MPa (% change) | 308 | 2.76 (−10%) | 3.36 | 2.76 (−18%) | 2.88 (−15%) | 2.76 (−18%) |

In addition, this unusual effect is not limited to just one PE or one cure system, but is applicable to many polyethylenes and a variety of other cure systems. Examples 2-4 in Table 5 show a similar improvements obtained in flexibility with lesser reductions in the other tensile properties for different PE's and different silane cure processes using a variety of inventive modifiers. This general applicability would allow compounders and manufacturers to use a convenient array of raw materials and permit the flexibility to fine tune the properties of their products.

Examples 5-8:

Table 6 suggests that this effect is also applicable to systems crosslinked using e-beam. Example 5 showed a 31% increase in flexibility and only a 20% loss in strength as reflected in both the stress at yield and the burst test.

Table 6 also shows how this effect is applicable to other host polyethylenes with a variety of properties that include a very high Mw PE (Example 7) and a very high density PE (Example 8). The high Mw (low MI) example showed a modest improvement in flexibility despite the slightly higher density with the addition of the inventive modifier while the burst strength remains almost unaffected. The very high density sample displayed very little change in bend strength (flexibility) and stress at yield, but showed modest improvement in high temperature burst strength and significant improvement in room temperature burst strength. With this knowledge the skilled artisan can design a compound with the desired tensile properties through the judicious choice of PE host polymer and then fine tune the flexibility, toughness or strength through the right choice of inventive modifier.

TABLE 6

Tensile Properties In Crosslinked Polyethylenes (PEX) 2

| | Comparative Example C1 | Example 5 | Example 6 | Example 7 | Example 8 |
|---|---|---|---|---|---|
| Polymer | PE2 | PE1 | PE7 | PE8 | PE9 |
| Modifier | | M2 | M2 | M2 | M2 |
| Cure System | CS1 | CS5 | CS1 | CS1 | CS1 |
| Density (g/cc) | 0.952 | 0.952 | 0.952 | 0.953 | 0.965 |
| MI (dg/min.) | 6.7 | 6.7 | 4.5 | 0.35 | 2.5 |
| Avg. Bend Test, MPa (% change) | 0.473 | 0.328 (−31%) | 0.341 (−28%) | 0.423 (−10.6%) | 0.490 (3.5%) |
| Stress @ Yield, MPa (% change) | 22.15 | 17.64 (−20%) | 18.95 (−14.4%) | 19.74 (−10.9%) | 22.18 (0.1%) |
| Quick Burst @ 82° C., MPa (% change) | 3.08 | 2.53 (−18%) | 2.76 (−10%) | 2.43 (−4.7%) | 3.22 (4.5%) |
| Quick Burst @ 21° C., MPa (% change) | 7.12 | 5.84 (−18%) | 7.08 (−0.5%) | 7.40 (3.7%) | 3.32 (14.4%) |

Figure 2:
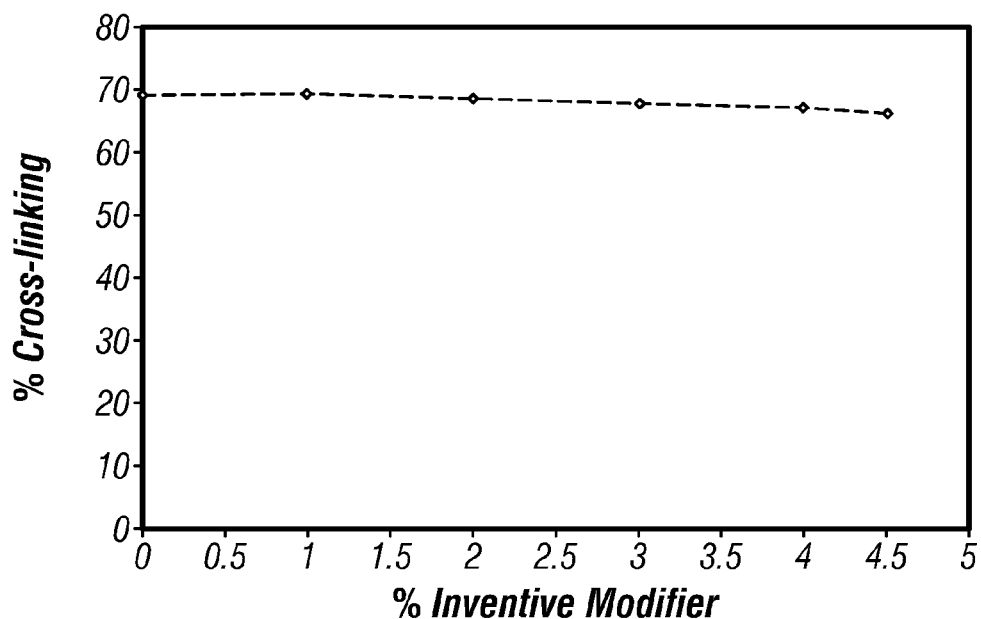
FIG. 2 shows the gel content, which is a measure of the crosslink efficiency, of a PEX containing from 0.5 to 4.5 wt % modifier according to an embodiment of the invention as described in Examples 2-4 below.

Even more remarkable is that to some extent the amount of flexibility could be controlled by increasing or reducing the amount of modifier used in the compound, but the other tensile properties such as burst strength at 82° C. (180° F.) remain relatively constant with increasing modifier content. FIG. 1 makes the point using a typical PEX pipe formulation like that of Examples 2-4. Adding between 0 and 4.5 wt % inventive modifier improved flexibility by reducing the bend force from 0.483 MPa (70 psi) to 0.276 MPa (40 psi), while the burst pressure remained constant at around 2.76 MPa (400 psi). FIG. 2 shows the gel content, which is a measure of the crosslink efficiency. It too remained flat over the composition range indicating the modifier did not interfere with the cure chemistry even at higher concentrations.

Examples 9-10:

In addition to the inventive modifier showing a lack of interference with a number of PEX cure systems and its surprising enhancement of flexibility without significant loss of tensile or toughness properties, the modifiers act to improve the ease of processing PEX even under very difficult to process conditions. Table 7 provides some data for process improvements in piping and tubing applications. It shows the magnitude of the process improvements associated with using between 3 and 4 wt % inventive modifier in typical piping and tubing formulation. Example 1 with 3.0 wt % M2 showed 5.5% lower load and a 34% lower die pressure at constant screw speed. Examples 9 and 10 were similar to Example 2 with slightly higher modifier load. These examples used a different PE and cure system at two different screw speeds and each showed better process performance. Example 10 had 26% lower load and a 8% lower die pressure using 4.0% M2 at 26 rpm.

TABLE 7

Process Improvements in PEX Applications - Piping and Tubing.

| | Comp. Example C1 | Example 1 | Comp. Example C2 | Example 9 | Comp. Example C2 | Example 10 |
|---|---|---|---|---|---|---|
| Polymer | PE2 | PE2 | PE3 | PE3 | PE3 | PE3 |
| Modifier | | 3.0% M2 | | 3.4% M2 | | 4.0% M2 |
| Cure System | CS1 | CS1 | CS2 | CS2 | CS2 | CS2 |
| Screw Speed, rpm | 36 | 36 | 31 | 31 | 26 | 26 |
| Load, % (% change) | 36 | 34 (−5.5%) | 40 | 28 (−30%) | 34 | 25 (−26%) |
| Die Pressure, MPa, (% change) | 12.78 | 8.41 (−34%) | 8.51 | 8.05 (−5.4%) | 8.99 | 7.82 (−8.1%) |

Examples 11-12:

The process improvements seen in the piping and tubing application above were also seen in other processes.

Examples 11-12 in Table 8 show process data for a silane crosslinked PEX in a wire and cable formulation. At equivalent melt temperatures a PE with 2.9% of the inventive modifier had an extruder torque 44% less than that of the base PE alone, and the extruder torque dropped 68% in a similar crosslinked silane formulation. In addition the surface appearance improved from very rough shark skin-like appearance to a smooth appearance.

TABLE 8

Process Data for PEX in a Wire & Cable Application
Temperature Profile: 100° C./160° C./220° C./200° C. Tm = 209° C.

|  | Comparative Example 3 | Example 11 | Example 12 |
|---|---|---|---|
| Polymer | PE4 | PE4 | PE4 |
| Modifier | — | M4 9.7% | M4 9.7% |
| Cure System | — | — | CS3 |
| Extruder Torque (Nm) | 80 | 45 | 26 |
| Energy Reduction (%) |  | −44% | −68% |
| Surface Appearance | Rough | Improved | Improved |

Examples 13-14:

Very similar improvements were achieved in Examples 13 and 14 made at slightly higher extruder temperatures as shown in Table 9. Comparing Tables 8 and 9, it is seen that the greatest improvement in processing ease is obtained under most demanding conditions. So, the colder, more viscous processes and the ones with the highest filler loads, seem to enjoy the most benefit from employment of the inventive fluid modifiers.

TABLE 9

Process Data for PEX in a Wire & Cable Application
Temperature Profile: 160° C./200° C./200° C./185° C. Tm = 192° C.

|  | Comparative Example 4 | Example 13 | Example 14 |
|---|---|---|---|
| Polymer | PE4 | PE4 | PE4 |
| Modifier | — | M1 | M4 9.7% |
| Cure System | CS3 | CS3 | CS3 |
| Extruder Torque (Nm) | 59 | 31 | 33 |
| Energy Reduction (%) |  | −47% | −44% |
| Surface Appearance | Rough, FIG. 2A | Improved, FIG. 2B | Improved, FIGS. 2C and 2D |

Figure 3A:
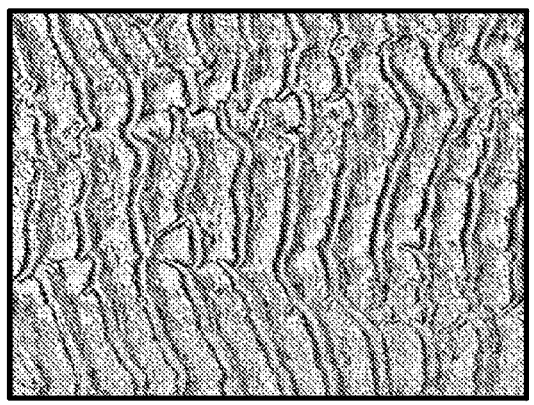
FIG. 3A is a photomicrograph showing the rough surface appearance of a wire and cable PEX formulation without a liquid modifier with an extruder rpm of 80 and a temperature profile of 140° C./180° C./200° C./185° C. for comparative purposes as described in Comparative Example 4.
Figure 3B:
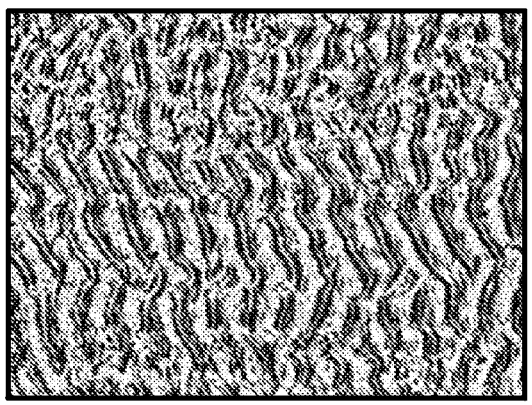
FIG. 3B is a photomicrograph showing the relatively smoother surface appearance of a wire and cable PEX formulation of Example 14 (2.7 wt % modifier) using the same temperature profile and rpm as described in Example 14 according to an embodiment of the invention.
Figure 3C:
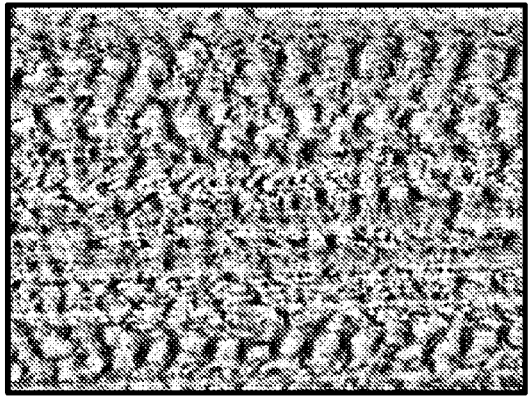
FIG. 3C is a photomicrograph showing further improvement of surface profile obtained when the material of FIG. 3B is cured according to an embodiment of the invention.
Figure 3D:
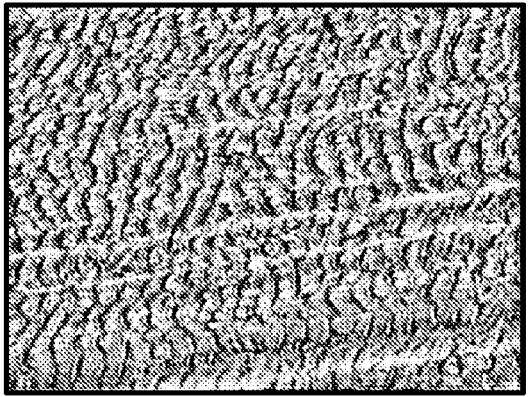
FIG. 3D is a photomicrograph showing more improvement of the surface profile obtained from the FIG. 3C material using the temperature profile 100° C./160° C./220° C./200° C. according to an embodiment of the invention.

FIGS. 3A-3D show the improvement in surface properties when using the inventive modifiers. FIG. 3A shows significant shark skin on the neat PE4 (Comparative Example 4) that was improved remarkably in FIG. 3B when 10% masterbatch was added (Example 14). 10% MB provided an overall concentration of 2.9 wt % fluid modifier. FIG. 3C shows another step improvement when the system was cured, and FIG. 3D shows exceptionally smooth surface when the compound was extruded and cured at slightly higher temperatures using the temperature profile 100° C./160° C./220° C./200° C.

Consistent with the % gels data measured in the extraction test run on tubing and piping XLPE (PEX) compounds, the hot set data measured on wire and cable PEX compounds found a similar lack of interference with the cure chemistry. The hot set test measures creep of PEX at elevated temperatures, i.e., increase of elongation of PEX at elevated temperatures under specific load. The hot set value records the percent permanent deformation at 200° C. after a force of 0.2 MPa is applied for 15 minutes. The lower the percentage, the higher the crosslink density or cure efficiency. For example, at constant screw speed of 80 rpm, PE4 cured with CS4 at temperature profile T1 showed a 25% increase of elongation in the Hot Set test, while PE4 with 10% M4 masterbatch (2.9 wt % inventive fluid modifier), cured with CS4 at temperature profile T1 showed a similar value of 30% increase in the same test under the same conditions indicating that the cure efficiencies were very similar and the cure chemistry unaffected by the inventive modifiers.

Examples 15-17:

One of the materials most demanding on the extruder is found in flame retardant wire and cable compounds. Flame retardant compounds can have more than 60% additive and fillers used to suppress flammability. That much solid additive in a viscous melt is difficult to extrude. In addition, the temperature must remain low so the crosslinking agent is not activated during the initial construction of the cable. For these reasons polymer modifiers that can ease processing without affecting the cure chemistry and without affecting tensile properties are often desired in flame retardant compounds.

Examples 15-17 in Table 10 show how the inventive modifier reduced the energy requirements for processing a Halogen-Free Flame Retardant (HFFR) wire and cable compound. For example, adding 1.87% modifier to an HFFR formulation dropped the extruder torque by around 10% and lowered die pressure around 15%. This was achieved in part by almost doubling the compound MI from 2.8 to around 5.0 dg/min (Comparative Example 5 and Example 15).

TABLE 10

Process Data for PEX in a Flame Retardant Wire & Cable Application
Temperature Profile: 140° C./150° C./160° C./155° C. Tm = 170° C.

|  | Comparative Example 5 | Example 15 | Example 16 | Example 17 |
|---|---|---|---|---|
| Polymer | PE5 | PE5 | PE5 | PE5 |
| Modifier | — | M1 | M5 | M3 |
| Cure System | CS4 | CS4 | CS4 | CS4 |
| Extruder Torque (Nm) | 35 | 31 | 32 | 31 |
| Energy Reduction (%) | — | −11 | −9 | −11 |
| Die Pressure (MPa) | 16.6 | 14.0 | 14.3 | 14.5 |
| Pressure Reduction (%) | — | −16 | −14 | −13 |
| MI (21.6 Kg, 190° C.) dg/min | 2.8 | 5.0 | 5.1 | 4.5 |

Looking at the product properties of Examples 15-17 there was, once again, a profound improvement in flexibility accompanied by slight reductions in tensile, hot knife and LOI. Table 11 summarizes the HFFR wire and cable product data. For example, the Flex modulus improved by up to 28% and the elongation about 5% to 8%, while the tensile strength was reduced only about 6%. There were slight increases in the hot knife test which is an indication of reduced toughness and the LOI dropped about 2 percentage points indicating that the material was slightly more flammable, but these were minor changes and the compound remained within the specifications.

TABLE 11

Product Data for PEX in a Flame Retardant Wire & Cable Application
Temperature Profile: 140° C./150° C./160° C./155° C. Tm = 170° C.

|  | Comparative Example 5 | Example 15 | Example 16 | Example 17 |
|---|---|---|---|---|
| Polymer | PE5 | PE5 | PE5 | PE5 |
| Modifier | — | M1 | M5 | M3 |
| Cure System | CS4 | CS4 | CS4 | CS4 |
| Tensile at Break (psi) | 8.2 | 7.7 | 7.6 | 7.8 |
| Reduced Tensile (%) |  | −6.1% | −7.3% | −4.9% |
| Elongation at Break (%) | 235 | 256 | 243 | 245 |
| Increase Elongation (%) |  | 8% | 3% | 4% |
| Flex Modulus (MPa) | 36 | 26 | 27 | 31 |
| Improved Flexibility (%) |  | 28% | 25% | 11% |
| LOI (% $O_2$) | 35 | 32 | 33 | 33 |
| Hot Knife (4 h, 90° C., %) | 70 | 74 | 82 | 76 |

Example 18:

The pipe PEX compounds of Examples 1-10 are formed into barrier pipes. In one example, the crosslinked tubes are coextrusion coated with an intermediate adhesive tie layer such as 0.01-0.05 mm (0.5-2.0 mils) ADMER (Mitsui Chemical), BYNEL (Dupont), or PLEXAR (MSI Technology) adhesive resin and an outer oxygen barrier layer such as 0.02-0.1 mm (0.8-4 mils) SELAR PA (Dupont), SOARNOL EVOH (Soarus L.L.C), and EVAL EVOH (Eval Co.) barrier resin. In another example, the barrier tube is coextruded in a single step with the moisture curable compounds of Examples 1-10 in inner and outer layers and the barrier resin sandwiched between intermediate adhesive resin tie layers, followed by moisture curing of the outer layers to PEX. The pipes have excellent flexibility as noted above, there is no significant loss of adhesion to the tie layer as experienced with modifiers other than the NFP described herein that is essentially inert in the crosslinking reactions, and the pipes have oxygen barrier properties conferred by the layer of barrier resin.

Example 19:

The dramatic reduction in flexural modulus found above in Examples 1-4 using 1.27 cm OD (½-in.) pipe is not limited to small diameter pipe. Larger diameter pipe is inherently stiffer and more difficult to flexibilize. However, a similar improvement in flexibility was found when the modifier was used in a formulation for fabricating larger pipe such as 1.9 cm (¾-in.) pipe. The tensile properties for the larger pipe (Example 19) are contrasted in Table 13 with those of 1.27 cm (Comparative Example C1) and 1.9 cm pipe (Comparative Example C3) without the modifier.

TABLE 13

Tensile Properties In Crosslinked Polyethylenes (PEX).

|  | Comparative Example C1 (1.27 cm pipe) | Comparative Example C6 (1.90 cm pipe) | Example 19 (1.90 cm pipe) |
|---|---|---|---|
| Polymer | PE2 | PE2 | PE3 |
| Modifier |  |  | 3.0% M2 |
| Cure System | CS1 | CS1 | CS2 |
| Density (g/cc)* | 0.944 | 0.944 | 0.944 |
| MI (dg/min.) | 6.7 | 6.7 | na |
| Avg. Bend Test (MPa) | 0.473 | 0.773 | 0.570 −26% |
| Stress @ Yield (MPa) | 22.15 | 20.09 | 17.33 −13.7 |
| Strain @ Break (%) | 230 | 253 | na |

*Fully formulated and after crosslinking
na, Not Available

Table 13 shows that the bend force of the 1.90 cm pipe (Example 19) displays a 26% reduction in flexural modulus when 3% M2 modifier is added compared to a similar crosslinked pipe with similar compound density and no modifier (C6).

Examples 20-22:

Pipe samples with and without the inventive modifiers were held at constant elevated temperature under a nitrogen purge to measure the sample weight loss over time using TGA. Table 12 summarizes the data at constant temperatures of 175° C. and 200° C. over 8 hours for three different modifiers.

TABLE 14

Permanence in Crosslinked Polyethylenes (PEX)

|  | Comparative Example C7 | Example 20 | Example 21 | Example 22 |
|---|---|---|---|---|
| Polymer | PE3 | PE3 | PE3 | PE3 |
| Modifier |  | M2 | M1 | M3 |
| Cure System | CS2 | CS2 | CS2 | CS2 |
| 175° C. Total Wt Loss after 8 hours (wt %) | 0.13 | 0.32 | 1.25 | 0.27 |
| 175° C. % Modifier Loss after 8 hours** |  | 6.2 | 38.2 | 6.8 |
| 200° C. Total Wt Loss after 8 hours (wt %) | 0.18 | 0.66 | 2.16 | 0.36 |
| 200° C. % Modifier Loss after 8 hours** |  | 16.1 | 68.3 | 9.6 |

**Corrected for PEX Control weight loss (No Modifier)

Figure 4:
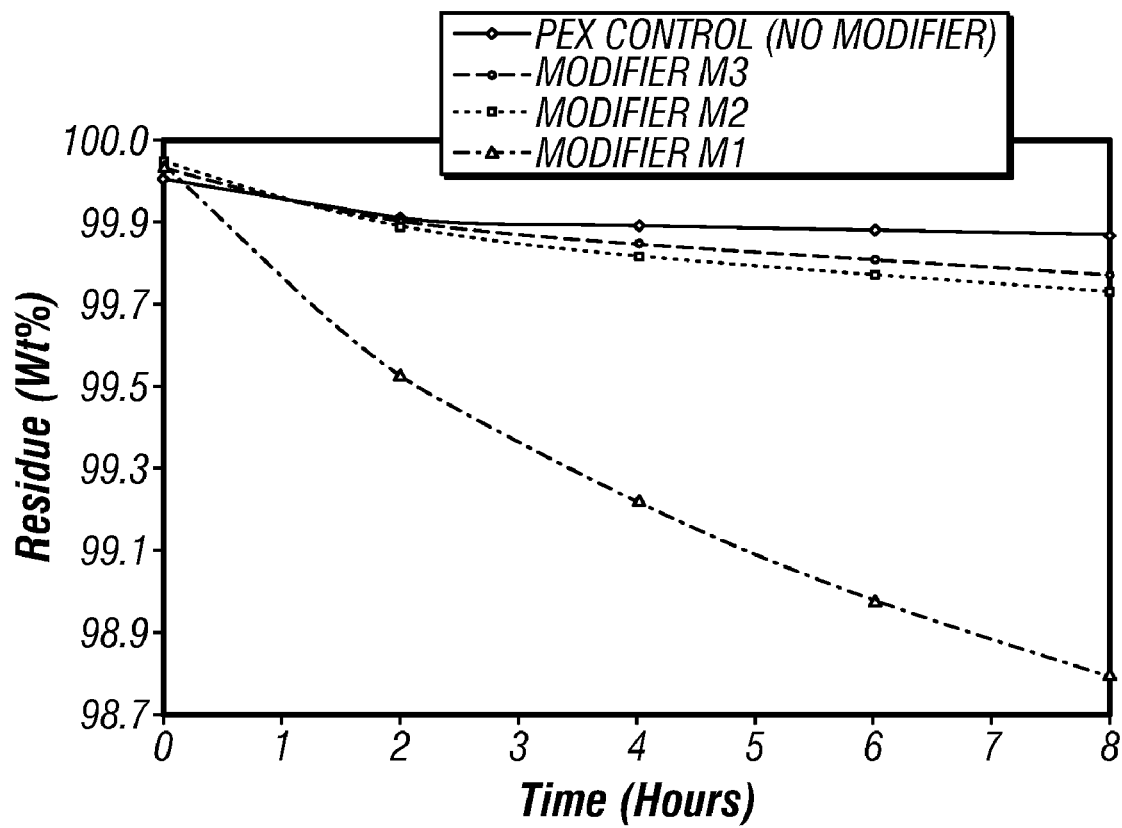
FIG. 4 plots the weight loss versus time in PEX pipe with and without modifier according to the present invention as described in Examples 21-23 below.

Examples of inventive modifiers with the right combination of compatibility and molecular weight are expected to show very little weight loss over time indicating high permanence, and as a result, better retention of properties. Examples with poor compatibility or insufficient molecular weight would show higher weight loss over time and indicate poor permanence. As mentioned before, the desired composition properties obtained when using the inventive modifiers can be maintained over time due to the excellent compatibility with the host polymer, the higher Mw relative to typical fluid modifiers, and the narrow molecular weight distribution of the inventive modifiers. In combination, these properties of the inventive modifiers provide high permanence in the host polymer and retain properties over time. To exemplify this point, M2 and M3 (Examples 20 and 22) show very low weight loss under these condition and are examples of inventive modifiers that show excellent permanence under these conditions in PEX pipe. M1 (Example 21) has the lowest molecular weight of the samples tested here and it exhibits more weight loss under these conditions. FIG. 4 plots the 175° C. loss data at intermediate times.

Example 23:

The MDOD of a water solution containing a number of pipe samples with and without modifier were compared to inert controls like glass and active controls like wax, in a manner consistent with BS 6920:2000. Samples that supported microorganism growth had their oxygen depleted over time, which led to a large MDOD. Samples that did not support microorganism growth maintained constant oxygen concentration over time and had low MDOD. Table 15 displays the results for a number of inventive modifiers in PEX pile sample.

TABLE 15

Growth of Aquatic Microorganisms at 30° C.

| Sample | Description | MDOD* Between Weeks 5 and 7 (mg/L) | Comments** |
|---|---|---|---|
| Comparative Example C2 | PE3 and CS2, No Modifier | 0.5 | Pass |
| Example 2 | PE3, CS2 and 3% M2 | 0.3 | Pass |
| Example 3 | PE3, CS2 and 3% M1 | 0.3 | Pass |
| Example 4 | PE3, CS2 and 2% M3 | 0.5 | Pass |
| Example 5 | PE2, CS1 and 3% M2 | 0.5 | Pass |
| Negative Reference | Glass | 0.2 | |
| Positive Reference | Wax | 7.0 | |
| Negative Control (mg/L) | Measured Mean Dissolved Oxygen Content | 7.7 | |

*The Mean Dissolved Oxygen Difference (MDOD) is a measure of the ability of the product to support the growth of microorganisms consistent with BS6920:2000. Reported MDOD are the mean value of measurements taken in weeks 5, 6 and 7.
**Pass = Conforms to the requirements of British Standard (BS) 6920-2000 - Testing of Non-metallic Materials For Use With Drinking Water, Growth of Aquatic Microorganisms (MDOD between the test sample and the Negative Control must be <2.4 mg/L).

Examples 24-25:

In another embodiment, the inventive modifiers are found to reduce the recoil effect of coiled and crosslinked tubing and piping. One of the challenges of coiled PEX pipe is that the pipe tends to "remember" or return to the shape it had during curing. When the tubing is cured on small rolls, as is usually desired for commercial sale, the small tube is difficult to unwind and hold straight since it wants to recoil to the small-roll shape. To avoid this problem the tube is often cured on very large rolls, which are then recoiled onto smaller coils after the cure process completes. This double rolling effort adds process steps and cost. The inventive modifiers help alleviate this problem by making the tubing more flexible after the cure, reducing memory tendencies or the recoil effect and helping the tubing to lay flat.

One way to quantify this effect is to measure the bend force after a given time and compare that to the initial maximum bend force recorded during the bend. The force required to keep the pipe bent is recorded over time and the rate at which it is reduced is a measure of how quickly the pipe material is relaxing, or how quickly it loses its memory. The difference in 0 min and 10 min bend force, expressed as a percentage of the original bend force is called the memory loss % and large negative values represent samples that have the most memory loss and are expected to recoil less, lay flatter and be the easiest to handle. Table 16 shows the magnitude of memory loss for two illustrative examples comparing PEX pipe with and without inventive modifiers.

TABLE 16

Reduction in Memory Using 10 Minute Bend Force Data

| Sample | Description | Bend Force after 10 Minutes (kPa) | % Memory Loss** |
|---|---|---|---|
| Comparative Example C1 | PE2, CS1, No Modifier | 19.6 | — |
| Example 1 | PE2, CS1 and 3% M2 | 8.6 | −56.1 |
| Comparative Example C2 | PE3, CS2, No Modifier | 12.2 | — |
| Example 2 | PE3, CS2 and 3% M2 | 9.6 | −21.2 |

**Calculated as % Memory Loss = $(BF_0 - BF_{10})/BF_0$ where $BF_0$ is the initial Bend Force and $BF_{10}$ is the Bend Force after 10 min.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention. All priority documents are herein fully incorporated by reference for all jurisdictions in which such incorporation is permitted. Further, all documents cited herein, including testing procedures, are herein fully incorporated by reference to the extent they are not inconsistent with the invention herein for all jurisdictions in which such incorporation is permitted.

What is claimed is:

1. A composition comprising crosslinked polyethylene (PEX) prepared by the method comprising:
   blending a polyethylene resin with a flexibilizing amount of a non-functionalized plasticizer (NFP) having a viscosity index greater than 120, kinematic viscosity of from 3 to 3000 cSt at 100° C., pour point less than −20° C., specific gravity less than 0.86, and flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP;
   wherein the blend comprises less than 10 wt % of a propylene polymer having a melting point of 40° C. or more, by weight of the blend;
   processing the blend into a shape of an article;
   crosslinking the blend in the form of the shape.

2. The composition of claim 1 wherein the polyethylene resin comprises an ethylene based polymer comprising at least 50 mole % ethylene units and having less than 20 mole % propylene units.

3. The composition of claim 2 wherein the polyethylene resin is selected from the group consisting of low density polyethylene, high density polyethylene and combinations thereof.

4. The composition of claim 1 wherein the blend in the processing comprises a continuous, homogeneous matrix phase of a mixture of the polyethylene resin and the NFP.

5. A composition comprising crosslinked polyethylene (PEX) prepared by the method comprising:
   blending a polyethylene resin with a flexibilizing amount of a non-functionalized plasticizer (NFP) having a viscosity index greater than 120, kinematic viscosity of from 3 to 300 cSt at 100° C., pour point less than –20° C., specific gravity less than 0.86, and flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP;

wherein the blend comprises at least 90 weight percent of the polyethylene resin by weight of polymer components of the blend;

processing the blend into a shape of an article; and crosslinking the blend in the form of the shape.

6. The composition of claim 1 wherein the NFP comprises from about 0.5 to about 10 weight percent by weight of the polyethylene resin.

7. The composition of claim 1 wherein the NFP is selected from poly-alpha-olefins (PAOs), Group III basestocks, high purity hydrocarbon fluids derived from a gas-to-liquids process (GTLs) and combinations thereof.

8. The composition of claim 1 wherein the NFP comprises oligomers of C5 to C14 olefins.

9. The composition of claim 1 wherein the NFP comprises a Group III basestock and has a kinematic viscosity at 100° C. of 4 to 50 cSt, a number average molecular weight (Mn) of 400 to 1,000 g/mole, or a combination thereof.

10. The composition of claim 1 wherein the NFP comprises a paraffinic composition derived from Fischer-Tropsch hydrocarbons and/or waxes, including wax isomerate lubricant oil basestocks and gas-to-liquids basestocks, having a kinematic viscosity at 100° C. of about 3 cSt to about 500 cSt.

11. The composition of claim 1 wherein the blending comprises blending in a melt stream.

12. The composition of claim 11 wherein the NFP is added to the polyethylene outside a melt stream.

13. The composition of claim 11 wherein the NFP is added to the polyethylene into the melt stream.

14. The composition of claim 11 wherein the melt blending comprises compounding in a single screw extruder.

15. The composition of claim 1 wherein the blending comprises introducing a cure system to the blend.

16. The composition of claim 15 wherein the cure system comprises an organic peroxide introduced into the blend at a temperature below a decomposition point of the peroxide, and the crosslinking comprises heating the blend to a temperature above the decomposition point of the peroxide.

17. The composition of claim 16 wherein the crosslinking comprises a continuous vulcanization process downstream from an extruder.

18. The composition of claim 16 wherein the crosslinking comprises an Engel process wherein after the peroxide is introduced the blend is rammed through a head maintained above the decomposition temperature of the peroxide to form a crosslinked extrudate.

19. The composition of claim 15 wherein the cure system comprises a moisture-curable silane compound and the blend is cured by exposing the shaped article to moisture.

20. The composition of claim 19 wherein the moisture exposure comprises contacting the shaped article with water at a temperature of 15° C. or less.

21. The composition of claim 19 wherein the silane compound is introduced as a copolymerized comonomer in a reactor copolymer in the polyethylene resin.

22. The composition of claim 21 wherein the blending comprises introducing a masterbatch comprising moisture-curing catalyst into the blend.

23. The composition of claim 19 wherein the silane compound is grafted onto the polyethylene resin by reactive extrusion and the graft resin is mixed with a masterbatch comprising moisture-curing catalyst.

24. The composition of claim 19, the method comprising a one step process wherein the silane compound and a crosslinking catalyst are introduced into the blend in a single extruder.

25. The composition of claim 19, the method comprising a two-step process wherein the silane compound and a crosslinking catalyst are serially introduced into the blend in separate extrusions.

26. The composition of claim 1 wherein the crosslinking comprises electron beam irradiation of the shaped article.

27. A crosslinked polyethylene article comprising the composition prepared by the method comprising:

blending a polyethylene resin with a flexibilizing amount of a non-functionalized plasticizer (NFP) having a viscosity index greater than 120, kinematic viscosity of from 3 to 3000 cSt at 100° C., pour point less than –20° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP;

wherein the blend comprises less than 10 wt % of a propylene polymer having a melting point of 40° C. or more, by weight of the blend;

processing the blend into a shape of a tubular article;

crosslinking the blend in the form of the shape.

28. The crosslinked polyethylene article of claim 27 wherein the crosslinked polyethylene article is selected from the group consisting of pipes, conduits, tubes, wire jacketing and insulation, and cable jacketing and insulation.

29. The crosslinked polyethylene article of claim 28 comprising an extrudate.

30. A composition consisting essentially of crosslinked polyethylene (PEX) blended with from about 0.1 to about 10 percent by weight of the composition of a non-functionalized plasticizer (NFP) having a viscosity index greater than 120, kinematic viscosity of from 3 to 300 cSt at 100° C., pour point less than –20° C., specific gravity less than 0.86, flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP.

31. A pipe comprising at least one layer comprising a composition consisting essentially of crosslinked polyethylene (PEX) blended with from about 0.1 to about 10 percent by weight of the composition of a non-functionalized plasticizer (NFP) having a viscosity index greater than 120, kinematic viscosity of from 3 to 300 cSt at 100° C., pour point less than –20° C., specific gravity less than 0.86, flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP.

32. The pipe of claim 31 comprising a plurality of layers wherein the PEX composition comprises one layer.

33. Tubing comprising at least one layer comprising a composition consisting essentially of crosslinked polyethylene (PEX) blended with from about 0.1 to about 10 percent by weight of the composition of a non-functionalized plasticizer (NFP) having a viscosity index greater than 120, kinematic viscosity of from 3 to 300 cSt at 100° C., pour point less than −20° C., specific gravity less than 0.86, flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP.

34. Insulation or jacketing for wire or cable comprising at least one layer comprising a composition consisting essentially of crosslinked polyethylene (PEX) blended with from about 0.1 to about 10 percent by weight of the composition of a non-functionalized plasticizer (NFP) having a viscosity index greater than 120, kinematic viscosity of from 3 to 300 cSt at 100° C., pour point less than −20° C., specific gravity less than 0.86, flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP.

35. A tubular present in a structure selected from the group consisting of hot and cold water plumbing systems, drinking water systems, hydronic radiant heating systems, snow melting equipment, ice rink plumbing and wiring and refrigeration warehouse plumbing and wiring, wherein the tubular comprises at least one layer comprising a composition consisting essentially of crosslinked polyethylene (PEX) blended with from about 0.1 to about 10 percent by weight of the composition of a non-functionalized plasticizer (NFP) having a viscosity index greater than 120, kinematic viscosity of from 3 to 300 cSt at 100° C., pour point less than −20° C., specific gravity less than 0.86, flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP.

36. A tubular comprising at least one layer comprising a composition consisting essentially of crosslinked polyethylene (PEX) blended with from about 0.1 to about 10 percent by weight of the composition of a non-functionalized plasticizer (NFP) having a viscosity index greater than 120, kinematic viscosity of from 3 to 300 cSt at 100° C., pour point less than −20° C., specific gravity less than 0.86, flash point greater than 200° C., and wherein the NFP contains less than 5 weight percent of functional groups selected from hydroxide, aryls, substituted aryls, halogens, alkoxys, carboxylates, esters, acrylates, oxygen, nitrogen, and carboxyl, based upon the weight of the NFP, and wherein the number of carbons of the NFP involved in olefinic bonds is less than 5% of the total number of carbon atoms in the NFP, and having a flexibility at least 5 percent greater than a similar tubular comprising the corresponding non-flexibilized composition without the NFP.

37. The composition of claim 30 wherein the NFP comprises oligomers of C5 to C14 olefins.

38. The composition of claim 30 wherein the NFP comprises a Group III basestock and has a kinematic viscosity at 100° C. of 4 to 50 cSt, a number average molecular weight (Mn) of 400 to 1,000 g/mole, or a combination thereof.

39. The composition of claim 30 wherein the NFP comprises a paraffinic composition derived from Fischer-Tropsch hydrocarbons and/or waxes, including wax isomerate lubricant oil basestocks and gas-to-liquids basestocks, having a kinematic viscosity at 100° C. of about 3 cSt to about 500 cSt.

40. The composition of claim 30 wherein the crosslinked polyethylene is obtained by crosslinking a blend of the NFP in a polyethylene resin comprising an ethylene based polymer comprising at least 50 mole % ethylene units and having less than 20 mole % propylene units.

41. The composition of claim 40 wherein the polyethylene resin is selected from the group consisting of low density polyethylene, high density polyethylene and combinations thereof.

42. The composition of claim 40 wherein the blend comprises a continuous, homogeneous matrix phase of a mixture of the polyethylene resin and the NFP.

43. The composition of claim 40 wherein the blend comprises at least 90 weight percent of the polyethylene resin by weight of polymer components of the blend.

44. The composition of claim 40 wherein the blend is crosslinked with an organic peroxide.

45. The composition of claim 40 wherein the blend is crosslinked with a silane compound and moisture curing.

46. The composition of claim 45 wherein the blend comprises an intimate admixture with a masterbatch comprising moisture-curing catalyst.

47. The composition of claim 40 wherein the polyethylene resin comprises a reactor copolymer comprising a copolymerized silane compound.

48. The composition of claim 40 wherein the blend comprises a silane compound grafted onto the polyethylene resin by reactive extrusion and a masterbatch comprising moisture-curing catalyst in intimate admixture therewith.

49. The composition of claim 40 wherein the blend is crosslinked by electron beam irradiation.

50. The composition of claim 43 wherein the composition comprises a flexibility at least 5 percent greater and a stress at yield of not more than 20 percent less than a corresponding non-flexibilized composition without the NFP.

* * * * *